United States Patent
Bouse

(10) Patent No.: US 11,847,197 B2
(45) Date of Patent: *Dec. 19, 2023

(54) SYSTEM AND METHOD FOR IDENTITY MANAGEMENT

(71) Applicant: Idemia Identity & Security USA LLC, Reston, VA (US)

(72) Inventor: Margaret Bouse, Lexington, MA (US)

(73) Assignee: Idemia Identity & Security USA LLC, Reston, VA (US)

( * ) Notice: Subject to any disclaimer, the term of this patent is extended or adjusted under 35 U.S.C. 154(b) by 245 days.

This patent is subject to a terminal disclaimer.

(21) Appl. No.: 17/359,229

(22) Filed: Jun. 25, 2021

(65) Prior Publication Data
US 2021/0326426 A1    Oct. 21, 2021

Related U.S. Application Data

(63) Continuation of application No. 16/677,534, filed on Nov. 7, 2019, now Pat. No. 11,055,391, which is a (Continued)

(51) Int. Cl.
*G06F 21/32* (2013.01)
*G06F 21/31* (2013.01)
(Continued)

(52) U.S. Cl.
CPC .......... *G06F 21/32* (2013.01); *G06F 16/2228* (2019.01); *G06F 16/2379* (2019.01);
(Continued)

(58) Field of Classification Search
CPC .. G06F 21/32; G06F 16/2379; G06F 16/2228; G06F 21/31; G06F 21/6218; H04L 63/102; H04L 63/205
See application file for complete search history.

(56) References Cited

U.S. PATENT DOCUMENTS

| 846,381 A | 3/1907 | Anderson |
| 6,031,910 A | 2/2000 | Deindl et al. |
| (Continued) | | |

FOREIGN PATENT DOCUMENTS

EP    1349123 A2    10/2003

*Primary Examiner* — Catherine Thiaw
(74) *Attorney, Agent, or Firm* — Armstrong Teasdale LLP

(57) ABSTRACT

A computer-implemented method includes: receiving a request for associating a first index of privileges and permissions with an identity token, the first index specifically encoding the privileges and permissions of a first subscriber in accessing transactional data of the requester, the request including the identity token that identifies a person and has been issued to the requester by a trusted entity through a vetting process; in response to determining that the identity token is valid and verifying that the requester is the person identified by the identity token, associating the first index of privileges and permissions of the first subscriber with the identity token; and providing the identity token associated with the first index of privileges and permissions of the first subscriber, the identity token enabling the first subscriber to access transactional data of the requester in accordance with the first index of privileges and permissions.

20 Claims, 23 Drawing Sheets

Related U.S. Application Data continuation of application No. 16/167,244, filed on Oct. 22, 2018, now abandoned, which is a continuation of application No. 15/355,401, filed on Nov. 18, 2016, now Pat. No. 10,108,794, which is a continuation of application No. 14/466,804, filed on Aug. 22, 2014, now Pat. No. 9,536,065.

(60) Provisional application No. 61/930,884, filed on Jan. 23, 2014, provisional application No. 61/879,390, filed on Sep. 18, 2013, provisional application No. 61/869,176, filed on Aug. 23, 2013.

(51) Int. Cl.
*G06F 21/62* (2013.01)
*G06F 16/22* (2019.01)
*G06F 16/23* (2019.01)
*H04L 9/40* (2022.01)

(52) U.S. Cl.
CPC .......... *G06F 21/31* (2013.01); *G06F 21/6218* (2013.01); *H04L 63/102* (2013.01); *H04L 63/205* (2013.01)

(56) References Cited

U.S. PATENT DOCUMENTS

| | | |
|---|---|---|
| 6,820,059 B2 | 11/2004 | Wood et al. |
| 8,200,980 B1 | 6/2012 | Robinson |
| 8,463,813 B2 | 6/2013 | Siress |
| 8,719,904 B2 | 5/2014 | Bertin |
| 9,076,006 B1 | 7/2015 | Saylor et al. |
| 9,094,360 B1 | 7/2015 | Bapat |
| 9,413,794 B1 * | 8/2016 | Saylor .................. H04L 67/306 |
| 9,495,551 B1 | 11/2016 | Goodspeed et al. |
| 9,536,065 B2 | 1/2017 | Bouse et al. |
| 9,563,757 B1 * | 2/2017 | Boyer .................. H04L 63/104 |
| 9,876,803 B2 | 1/2018 | Miu et al. |
| 10,108,794 B2 | 10/2018 | Bouse |
| 2002/0056043 A1 | 5/2002 | Glass |
| 2003/0154406 A1 | 8/2003 | Honarvar |
| 2004/0068631 A1 | 4/2004 | Ukeda et al. |
| 2004/0083370 A1 | 4/2004 | de Jong |
| 2005/0240779 A1 | 10/2005 | Aull et al. |
| 2006/0050931 A1 | 3/2006 | Oka |
| 2006/0212931 A1 | 9/2006 | Shull et al. |
| 2006/0282670 A1 | 12/2006 | Karchov |
| 2006/0294578 A1 | 12/2006 | Burke et al. |
| 2007/0033397 A1 | 2/2007 | Phillips, II et al. |
| 2007/0288319 A1 | 12/2007 | Robinson et al. |
| 2008/0083025 A1 | 4/2008 | Meijer et al. |
| 2008/0289020 A1 | 11/2008 | Cameron et al. |
| 2009/0265278 A1 | 10/2009 | Wang et al. |
| 2010/0169651 A1 | 7/2010 | Scheidt |
| 2010/0185871 A1 | 7/2010 | Scherrer et al. |
| 2011/0167059 A1 | 7/2011 | Fallah |
| 2012/0144461 A1 | 6/2012 | Rathbun |
| 2012/0198232 A1 | 8/2012 | Hannel et al. |
| 2012/0284776 A1 | 11/2012 | Sundaram et al. |
| 2012/0331529 A1 | 12/2012 | Ibel et al. |
| 2013/0033232 A1 | 2/2013 | Kosugi et al. |
| 2013/0065564 A1 | 3/2013 | Conner et al. |
| 2013/0159021 A1 | 6/2013 | Felsher |
| 2013/0218601 A1 | 8/2013 | Webb |
| 2013/0332324 A1 | 12/2013 | Mischell et al. |
| 2013/0340052 A1 | 12/2013 | Jakobson |
| 2014/0013447 A1 | 1/2014 | Hotti |
| 2014/0283120 A1 * | 9/2014 | Mao .................. G06F 21/6218 726/28 |
| 2014/0289842 A1 | 9/2014 | Cornick et al. |
| 2015/0101032 A1 * | 4/2015 | Shimakawa ............ G06F 21/62 726/8 |
| 2015/0206148 A1 | 7/2015 | Cherry et al. |
| 2017/0116403 A1 | 4/2017 | Bouse et al. |

* cited by examiner

SYSTEM AND METHOD FOR IDENTITY MANAGEMENT

CROSS-REFERENCE TO RELATED APPLICATION(S)

This application is a continuation of U.S. patent application Ser. No. 16/677,534 filed Nov. 7, 2019, now U.S. Pat. No. 11,055,391 issued on Jul. 6, 2021, which is a continuation of U.S. patent application Ser. No. 16/167,244 filed Oct. 22, 2018, which is a continuation of U.S. patent application Ser. No. 15/355,401, filed Nov. 18, 2016, now U.S. Pat. No. 10,108,794, issued Oct. 23, 2018, which is a continuation of U.S. patent application Ser. No. 14/466,804, filed Aug. 22, 2014, now U.S. Pat. No. 9,536,065, issued on Jan. 3, 2017, which claims the benefit of U.S. Provisional Application No. 61/869,176, filed Aug. 23, 2013, U.S. Provisional Application No. 61/879,390, filed Sep. 18, 2013, and U.S. Provisional Application No. 61/930,884, filed Jan. 23, 2014, the contents of which are incorporated by reference in its entirety

TECHNICAL FIELD

This document generally relates to identity management.

BACKGROUND

Transactions between a consumer and a provider may be subject to risks of identity theft, identity fraud, spoofing, phishing, etc., all of which may potentially hinder the flow of commerce.

SUMMARY

In one aspect, some implementations provide a computer-implemented method 1. A machine-assisted method for determining a trustworthiness of a requested transaction, the method including: receiving, from a participant entity, a request to determine a trustworthiness of a transaction request, the transaction request being submitted by a user to access data managed by the participant entity; submitting a first inquiry at an authentication verification engine to determine an authenticity of a purported identity of the user submitting the transaction request; receiving a response from the authentication verification engine, the response including a computed authenticity score quantitatively attesting to the purported identity of the user submitting the transaction request; based on the computed authenticity score, determining the trustworthiness of the transaction request being submitted by the user; and notifying the participant entity of the determined trustworthiness of the transaction request to access data managed by the participant entity.

Implementations may include one or more of the following features. The method may include further submitting a second inquiry at an authentication policy server to determine a scope of right possessed by the participant entity to verify identities of users through the transaction authentication engine; receiving a reply from the authentication policy engine, the reply including a computed validity score indicative of the scope of the right of participant entity to verify identities of users through the transaction authentication engine; based on the computed authenticity score as well as the computed validity score, determining the trustworthiness of the transaction request submitted by the user; and notifying the participant entity of the determined trustworthiness of the transaction request attempting to access data managed by the participant entity.

Additionally, submitting the second inquiry at the authentication policy server may include submitting the second inquiry to determine a scope of right of the participant entity to use a particular identity database; and wherein receiving the reply from the authentication policy engine comprises receive a reply including a computed score indicative of the scope of right of the participant entity to use the particular identity database.

Moreover, receiving a query result obtained from the particular identity database in accordance with the scope of the right for the participant entity to access the particular database, wherein the query result is a response by the identity database to a submitted query at the identity database.

Furthermore, determining the trustworthiness of the transaction request comprises determining the trustworthiness based on the query results as well as the computed authorization score and the computed validity score.

Still, the method may further include storing the received query result and the corresponding query at the transaction authentication engine for temporary storage; and allowing future queries at the particular database to access the temporarily stored query result according to the determined scope of right for the participant entity to access the particular database.

The method may further include obtaining an authentication policy from the authentication policy server, the authentication policy governing communication between the transaction authentication engine and the authentication verification engine. The method may additionally include: configuring a protocol for communication with the authentication verification engine. Moreover, configuring the protocol may further include: configuring the protocol according to the authentication policy as purchased by the participant entity. Furthermore, configuring the protocol for communication may additionally include configuring a first protocol component for encrypting data being transmitted from the transaction authentication engine to the authentication verification engine; and configuring a second protocol component for decrypting data being received by the transaction authentication engine from the authentication verification engine.

In another aspect, some implementations provide a computer system A machine-assisted method, the method including: receiving, at an authentication verification engine and from an transaction authentication engine, an inquiry regarding a user submitting a transaction request to access data managed by the participant entity, the inquiry comprising information identifying the user; based on the information identifying the user, constructing a query to verify an identity of the user who has requested the transaction; submitting the query to an identity database in communication with the authentication verification engine; receiving a reply from the identity database in response to the query; based on the received reply, computing an authenticity score quantitatively attesting to the identity of the user who has requested the transaction; and providing the computed authenticity score as a component to determine a trustworthiness of the transaction request.

Implementations may include the following additional features. The method may further include gathering the information identifying the user by: calling a method individually encapsulated in the transaction request; receiving a return value as a result of calling the method; and retrieving the information identifying the user in the received return value. Additionally, gathering the information identifying the user comprises: gathering information encoding a biometric of the user. Gathering the information identifying the user may include gathering personally identifiable information of the user. Gathering the information may include: gathering information encoding a pair of user-name and password to access an on-line account. Gathering information may include gathering data obtained from an identification document of the user.

The method may further include configuring a protocol for communication with the identity database, the protocol being determined by a authentication policy governing data access rights by the participant entity at the identity database. Configuring the protocol may further include configuring the protocol for communication according to the authentication policy as purchased by the participant entity. Configuring the protocol for communication may further include configuring a first protocol component for encrypting data being transmitted from the authentication verification engine to the identity database; and configuring a second protocol component for decrypting data being received by the authentication verification engine from the identity database.

The method may further include maintaining parameters of the identity database by configuring component fields of identity data of users admitted into the identity database through a vetting process. The method may additionally include managing, based on the protocol, attributes corresponding to the component fields of the identity data; and configuring, in accordance to the protocol, access to the component fields of the identity data stored at the identity database. Configuring the protocol for communication with the identity database may further include configuring the protocol for communication with an identity database provided by a government entity, wherein the government entity administers a vetting process to perform background check of the user before the corresponding identity data of the user is entered into the identity database. Configuring the protocol for communication with the identity database may additionally include: configuring the protocol for communication with an identity database provided by a third party entity, different from a government entity and the participant entity.

In yet another aspect, some implementations may provide a machine-assisted method for controlling access to an identity database by a participant entity, the method including: receiving, from a transaction authentication engine, an inquiry regarding a participant entity attempting to verify an identity of a user submitting a transaction request at the participant entity; determining an authentication policy for the participant entity to verify the identity of the user; based on the determined authentication policy, computing a validity score for the participant entity to verify the identity of the user; and providing the computed validity score to the transaction authentication engine for determining a trustworthiness of the transaction request submitted by the user at the participant entity.

Implementations may include the following features. The method may additionally include: based on the received inquiry, gathering information identifying the participant entity; based on the gathered information identifying the participant entity, determining the authentication policy. The method may further include: based on the receive inquiry, logging verification activities requested by the participant entity; and analyzing the logged verification activities to determine a usage by the participant entity. The method may further include logging queries to access an identity database as part of the verification activities requested by the participant entity; and analyzing the logged queries to determine the usage of the identity database by the participant entity.

The method may additionally include profiling the logged queries to determine a pattern of usage of the identity database by the participant entity. The method may further include based on the determined usage, performing accounting to determine a use fee to be charged to the participant entity for accessing the identity database. Performing accounting may further include measuring at least one of: a number of queries by the participating entity to the identity database; an amount of data sent by the participant entity to access the identity database; a number of responses sent to the participant entity in response to corresponding queries; or an amount of data sent to the participant entity in response to corresponding queries. Computing the validity score may include comparing the determined usage by the participant entity with the authentication policy of the participant entity.

The method may additionally include providing an administrative interface to report the determined usage to a human administrator. The method may further include based on the determined usage, providing feedback information to enable load balancing when submitting future queries to the identity database. The method may additionally include providing an application program interface through which the authentication policy engine extends service for the participant entity to access other identity databases different from the identity database. The method may further include providing the application program interface further comprises: providing the application program interface to allow a different authentication policy engine to access the identity database serviced by the authentication policy engine.

In still another aspect, some implementations provide a machine-assisted method for integrated identity management, the method including: receiving, at a verified identity engine, a request to verify an authorization status in association with a transaction request, the transaction request being submitted by a user attempting to access data managed by a participant entity, the authorization status indicative of a power of the participant entity to verify an identity of the user; determining the identity of the user submitting the transaction request; determining an identity of the participant entity; querying a database at the verified identity engine based on the determined identity of the user and the determined identity of the entity submitting the request to verify; and according to query results, determining the authorization status.

The method may further include in response to determining that the transaction request is originally submitted by the user to the participant entity and that participant entity is not yet an authorized business partner of the user, registering, in the database at the verified identity engine, the participating entity as an authorized business partner of the user.

The method may further include: in response to determining that the transaction request being submitted by the user was solicited by the participant entity, querying the database at the verified identity engine to determine whether the participant entity is an authorized business partner of the user.

The method may additionally include in response to determining that the participant entity is not yet an authorized business partner of the user, alerting the user that the participant entity is not an authorized business partner. The method may further include in response to determining that the participant entity is not yet an authorized business partner of the user, alerting the user that the participant entity is not an authorized business partner; and alerting the entity submitting the request to verify to hold off processing a particular request from the participant entity with regard to the user.

Querying the database at the verified identity engine may further include querying the database at the verified identity engine to determine whether the participant entity, as an authorized business partner of the user, is authorized to engage in the requested transaction between the user and the participant entity.

Moreover, the method may additionally include in response to determining that the participant entity, as an authorized business partner of the user, is authorized to engage in the requested transaction between the user and the participant entity, signaling the participant entity to proceed with the requested transaction. The method may further include in response to determining that the participant entity, as an authorized business partner of the user, is not authorized to engage in the requested transaction between the user and the participant entity, alerting the user and the participant entity that the participant entity is not authorized to engage in the requested transaction.

The method may further include providing a user interface to allow the user to register a specific participating entity as an authorized business partner. Providing the user interface may further include providing the user interface to allow the user to configure one or more types of transactions as permissible transactions between the user and the authorized business partner. Providing the user interface further comprises providing the user interface to allow the user to configure one or more types of permissible queries submitted by the authorized business partner and directed at a particular identity database.

The method may further include: gathering information capable of identifying the user as well as information on authorized business partners of the user; and storing, in the database at the verified identity engine, the identifying information, and information of authorized business partners. Gathering information capable of identifying the user the user may include: gathering identity information to attest to a purported identity of the user before granting access to the database at the verified identity engine. Gathering information on authorized business partners of the user may include: gathering information on permissible transactions between the user and each authorized business partner. Gathering information on authorized business partners of the user may include gathering information on permissible queries at a particular identity database by each authorized business partner of the user.

Gathering information on authorized business partners of the user may include gathering information on permissible data responses from a particular identity database to each authorized business partner of the user.

In one aspect, some implementations provide a method for generating a token set that associate permissions and privileges with an identity, the method including: receiving, from a requester and at a computing device of a certification authority, a request for associating a first index of privileges and permissions with a foundation token, the first index specifically encoding the privileges and permissions of a first subscriber in accessing transactional data of the requester, the request including the digital biometric that identifies a person and has been issued to the requester by a trusted entity through a vetting process; extracting, from the request, the foundation token; determining that the extracted foundation token is valid; verifying that the requester is the person identified by the foundation token based on a biometric of the requester matching the extracted digital biometric; in response to determining that the foundation token is valid and verifying that the requester is the person identified by the foundation token, associating the first index of privileges and permissions of the first subscriber with the foundation token; and providing, to the requester, the foundation token associated with the first index of privileges and permissions of the first subscriber, the foundation token enabling the first subscriber to access transactional data of the requester in accordance with the first index of privileges and permissions.

Implementations may include one or more of the following features. The method may additionally include: receiving, from a requester and at the computing device of the certification authority, a request for associating a second index of privileges and permissions with the foundation token, the second index specifically encoding the privileges and permissions of a second subscriber, different from the first subscriber, in accessing transactional data of the requester, the request including the foundation token that identifies the person and has been issued to the requester by the trusted entity through the vetting process; extracting, from the request, the foundation token; determining that the extracted foundation token is valid; verifying that the requester is the person identified by the foundation token based on a biometric of the requester matching the foundation token; in response to determining that the foundation token is valid and verifying that the requester is the person identified by the foundation token, associating the second index of privileges and permissions with the foundation token of the second subscriber with the foundation token; and providing to the requester, the foundation token associated with the first index and second index of privileges and permissions, enabling the first subscriber and the second subscriber to access transactional data of the requester, respectively in accordance with the first index and the second index of privileges and permissions.

Determining that the foundation token is valid may include: verifying that the foundation token is issued by the trusted entity based on a digital characteristic of the foundation token uniquely identifying the trusted entity. Determining that the foundation token is valid may additionally include: verifying that the person identified by the foundation token is not listed in a negative-indicator database. Verifying that the requester is the person identified by the foundation token may additionally include: confirming that the requester is the person identified by the foundation token by inquiring at a third-party certification authority, different from the trusted entity, that the requester is the person identified by the foundation token.

Determining that the foundation token is valid may include: verifying that the foundation token has not expired or been revoked. Determining that the foundation token is valid may include: determining a score of trustworthiness of the foundation token.

Providing the foundation token associated with the first index of privileges and permissions may include: transmitting data encoding the foundation token associated with the first index of privileges and permissions to the requester. Providing the foundation token associated with the first index of privileges and permissions may additionally include: signing the foundation token with a signature of the certification authority. Signing the foundation token may further include: watermarking the credential token with information uniquely identifying the certification authority.

Providing the foundation token associated with the first index of privileges and permissions may further include:

encrypting the foundation token with a digital key of the certification authority. Providing the foundation token associated with the first index of privileges and permissions may further include: generating additional data attesting to the integrity of the data encoding the foundation token.

Receiving the request may further include: receiving a foundation token issued by a government entity to the requester, the foundation token being a primary identity certificate that is issued after a vetting process conducted by the government entity on the person identified by the foundation token.

In one aspect, some implementations provide a computer-implemented method for determining a trustworthiness of a requested transaction, the method including: receiving, from a relying party, a request to determine a trustworthiness of a particular transaction request, the transaction request initially submitted by a user to access data managed by the relying party; based on the transaction request, summarizing the particular transaction request into transactional characteristics, the transactional characteristics devoid of source assets of the transaction, the source assets including credential information of the user, the credential information of the relying party, or information content of the requested transaction; generating first machine-readable data encoding transactional characteristics of the underlying transaction as requested, the transactional characteristics unique to the particular transaction request; submitting a first inquiry at a first engine to determine an access eligibility of the user submitting the transaction request, the first inquiry including the credential information of the submitting user, as well as the summarized transactional characteristics that is applicable only once to the underlying transaction request; and receiving the access eligibility determination from the first engine.

Implementations may include one or more of the following features. The method may additionally include: causing a second inquiry to be submitted at a second engine to validate the particular transaction request based on the summarized transactional characteristics, wherein the access eligibility determination factors in the determined validity of the particular transaction request.

The method may further include: logging, at a transaction database associated with a second engine, an entry for the particular transaction request by storing the first machine-readable data encoding the transactional characteristics of the particular transaction request. Storing the first machine-readable data encoding the transactional characteristics of the particular transaction request may include receiving confirmation that the first machine-readable data has been stored at the transaction database associated with the second engine. Receiving confirmation may include receiving the confirmation that the first machine-readable data has been stored at the transaction database associated with the second engine before submitting the first inquiry at the first engine.

Storing the first machine-readable data encoding the transactional characteristics of the particular transaction request may include storing the first machine-readable data for only one retrieval query at the transaction database. Storing the first machine-readable data encoding the transactional characteristics of the particular transaction request includes storing the first machine-readable data for a retrieval query within a time window at the transaction database.

The method may further comprise: determining the trustworthiness of the transaction request initially submitted by the user based on the determined access eligibility of the submitting user; and notifying the relying party of the determined trustworthiness of the transaction request.

The method may further comprise: logging, at an identity database associated with the transaction authentication engine, an entry of the received access eligibility determination as well as the determined trustworthiness of the transaction request.

The method may further comprise: in response to the relying party proceeding with the requested particular transaction, generating second machine-readable data encoding transactional characteristics of the particular transaction as consummated, the transactional characteristics of the particular consummated transaction devoid of source assets of the consummated transaction, the source assets including credential information of the user, the credential information of the relying party, or information content of the transaction as consummated. The method may additionally comprise: logging, at an identity database associated with the transaction authentication engine, an entry of the particular consummated transaction by storing the second machine-readable data encoding the transactional characteristics of the particular consummated transaction.

The method may further comprise: obtaining, from the received trustworthiness determination request, credential information attesting to an identity of the submitting user; and generating an electronic credential of the submitting user that is unique to the particular transaction request initially submitted by the user. The method may further include: causing the electronic credential to be stored at an identity database associated with a first engine. The method of claim 13, wherein causing the second inquiry to be submitted may further include: submitting data encoding the electronic credential at a second engine. The method may further include: causing the second engine to render the access eligibility determination by verifying the electronic credential at the identity database associated with the first engine.

Generating the first machine-readable data may further include: generating a bar code, an alphanumeric string, or a QR code encoding the transactional characteristics.

The method may further include: prior to submitting the first inquiry, submitting an initial query at a second engine to establish a status of the relying party in processing transaction requests submitted by the user. Submitting the initial query to establish the status may include submitting the initial query to determine if the transaction request is permitted between the user and the relying party. Submitting the initial query to establish the status includes submitting the initial query to determine if the relying party is permitted to access identity databases on behalf of the user. The method may additionally include: in response to query results from the initial query, placing the relying party on a whitelist of the first engine. The method may additionally include: in response to query results from the initial query, placing the relying party on a review status.

In another aspect, some implementations may provide a machine-assisted method for a transaction database, the method including: receiving, from a first engine, machine-readable data encoding transactional characteristics unique to a particular transaction request initially submitted by a user at relying party, the machine-readable data applicable only once to the particular transaction request; receiving, from a second engine, an inquiry to validate the particular transaction request as well as to verify an identity of the user submitting the particular transaction request at the relying party, the query including transactional characteristics of the transaction request, the transactional characteristic unique to the particular transaction request; receiving, from a third engine, an authentication policy for the relying party to validate the transaction request and to verify the identity of the user; and based on the determined authentication policy, determining, by the authentication policy server, the validity of the submitted transaction request.

Implementations may include one or more of the following features. Determining the validity of the submitted transaction request may include: comparing the received transactional characteristics against data contents of the machine-readable data. Comparing the received transactional characteristics against data contents of the machine-readable data may include: retrieving the data contents of the machine-readable data stored at a transaction database for one-time retrieval. Comparing the received transactional characteristics against data contents of the machine-readable data may include: retrieving the data contents of the machine-readable data stored at a transaction database for retrieval within a time window.

Determining the validity of the submitted transaction request may include: verifying the identity of the user. Receiving the machine-readable data encoding the transactional characteristics includes receiving a bar code, an alphanumeric string, or a QR code.

The method may further include: based on the received inquiry, gathering information identifying the relying party; and based on the gathered information identifying the relying party, determining the corresponding authentication policy.

The method may further include: based on the received inquiry, logging verification activities requested by the relying party; and analyzing the logged verification activities to determine usage statistics. Analyzing the logged verification activities to determine usage statistics may further include: analyzing the logged verification activities to determine user behavior on an aggregate level. Analyzing the logged verification activities to determine usage statistics may further include: analyzing the logged verification activities to determine user behavior on an individual level without comprising identity information of the user.

Some implementations may provide a machine-assisted method for an authentication verification engine, the method including: receiving, from a first engine, an inquiry to determine an access eligibility of a transaction request submitted by a user to access data managed by a relying party, the inquiry comprising credential information of the user as well as machine-readable data encoding transactional characteristics of the transaction request, the transactional characteristics unique to the transaction request; based on the credential information of the user, constructing a first query to validate the transaction request, the first query including the transactional characteristics unique to the transaction request; submitting the first query to a transaction database where transactional characteristics of transaction requests initially generated by the first engine are stored; and receiving validation results from the transaction database in response to the first query, the validation results determined based on, at least in part, the transactional characteristics.

Implementations may include one or more of the following features. Constructing the first query may include: constructing the first query to include the machine-readable data encoding transactional characteristics of the transaction request, the machine-readable data applicable only once to the transaction request. Constructing the first query may include: constructing the first query to include the machine-readable data encoding transactional characteristics of the transaction request, the machine-readable data valid for retrieval query at the transaction database within a time window.

The method may further include: determining access eligibility based on, at least in part, the received validation results. The method may further include: submitting the second query at an identity database in communication with the authentication verification engine. The method may further include: verifying the identity of the user submitting the transaction request based, at least in part, on query results from the identity database.

The method may further include: configuring a protocol for communication with the identity database, the protocol being determined by a second engine prescribing data access rights by the relying party at the identity database. The method may further include: prior to submitting the first query, submitting an initial query at a second engine to establish a status of the relying party in processing transaction requests submitted by the user. Submitting the initial query to establish the status includes submitting the initial query to determine if the transaction request is permitted between the user and the relying party. Submitting the initial query to establish the status may include submitting the initial query to determine if the relying party is permitted to access identity databases on behalf of the user.

The method may further include: in response to query results from the initial query, placing the relying party on a whitelist of the first engine. The method may further include: in response to query results from the initial query, placing the relying party on a review status. The method may further including gathering the information identifying the user by: calling a method individually encapsulated in the transaction request; receiving a return value as a result of calling the method; and retrieving the information identifying the user in the received return value. The method may further include: based on the gathered information, constructing a second query to verify an identity of the user submitting the transaction request.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Countless risks associated with identities may be present in transactions being conducted on a daily basis. With the advent of the Internet, comes the age of e-commerce in which on-line transactions may replace face-to-face transactions. The sheer volume and complexity of these on-line transactions may give rise to a digital world fraught with peril, including, for example, identity theft, identity fraud, spoofing, phishing, etc. Notably, such risks may not be new in the Internet age, although the Internet may have amplified such risks. As the society moves towards cloud computing, more and more identity databases may become available. Identity data in some databases may be more reliable and robust than others, based on history or tradition. In some implementations, identity data in identity databases administered by a department of motor vehicles (DMV) may be leveraged to verify an identity of a recipient party engaged in, for example, a financial transaction. Additional identity databases may provide collaborative confirmation attesting to the authenticity of a purported identity. Some implementations as disclosed herein may provide servers and engines to power an integrated identity management system, in which the servers or engines act in concert with each other to verify the authenticity of an identity. For example, the system may provide access control so that a consumer can prescribe the parties authorized to verify the identity of the consumer as well as the scope of the authorized power. The envisioned identity management system may include fee for service arrangements to enforce business rules for accessing to the system. For example, business may purchase a subscription plan that provides various levels of access with a commensurate fee. The identity management system may provide application interfaces to interconnect with other identity management systems to extend services to consumers and providers. At the same time, consumers and providers may opt-in or opt-out of the system. Deployment of the integrated identity management system may enhance confidence in the transactions being conducted between parties and hence, promote commerce.

Figure 1:
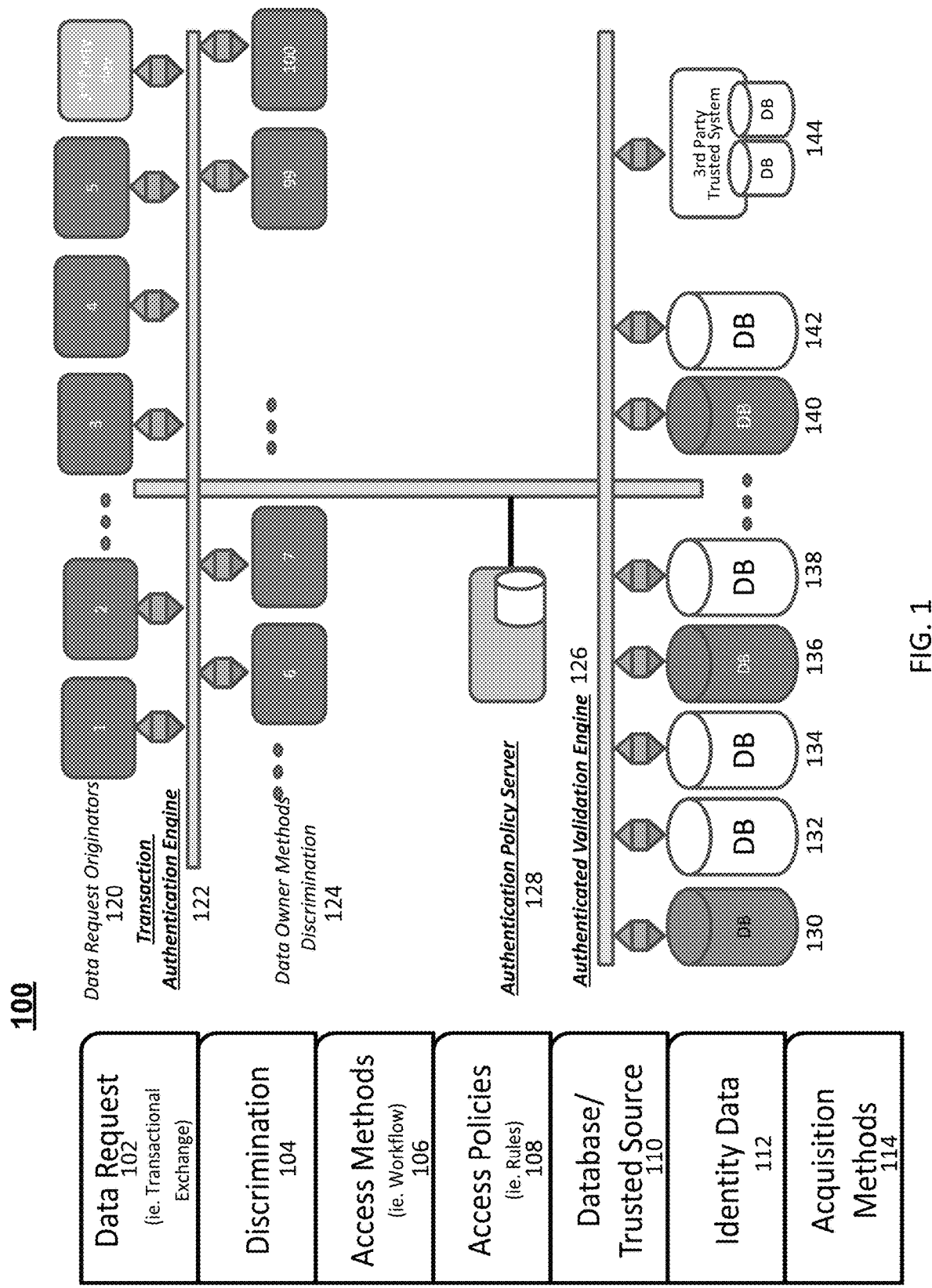
FIG. 1 is a diagram showing an example integrated identity management system according to some implementations.

FIG. 1 is a diagram showing an example integrated identity management system according to some implementations. An identity management system may be implemented to determine the trustworthiness of a transaction request submitted by a user at, for example, a financial institution. The transaction requested may include an electronic transaction and the request may be submitted on-line. In one analogy, the identity management system disclosed herein may function as a hierarchy of layers, similar to a layered communications protocol for packet switching communications network. Each layer in the hierarchy may engage one stage of verification in reaching a final disposition of trustworthiness.

As shown in FIG. 1, data request 102 may represent a transaction request submitted by a user in the capacity of a consumer. The consumer may include an individual consumer or an organizational entity. Example organizational entities may include a corporation, a bank, a government agency, etc. The transaction request may be submitted at a variety of places, including, for example, a financial institution, a merchant, a service provider, a government agency, etc. Indeed, the Internet may allow a consumer to conduct virtually all commercial, business, and social transactions on-line.

The requested on-line transaction may access data owned by the recipient of the request. The recipient of the requested on-line transaction may include financial institutions, merchants, service providers, as well as government agencies. Example financial institutions may include any organization engaged in financial transactions, banks, securities brokerage firms, trust administrators, retirement plan administrators, college saving plans administrators, etc. The recipient merchant may include any vendor attempting to sell merchandise on-line. The recipient service provider may include any entity that charges a fee for a service, including, for example, accounting firms, consulting firms, etc. The recipient government agency may include any government agency or commission at the state or federal level, including, for example, social security agency, unemployment agency, taxation agency, department of human and health services and its state counterparts, department of motor vehicles, etc.

In response to the received data request, the recipient entity may conduct a due diligence verification to determine the trustworthiness of the submitted transaction request. The due diligence verification may include verifying that the user submitting the transaction request is the person he or she purports to be. The due diligence verification may also include verifying whether the transaction requested is permissible between the recipient entity and the user. Unless the due diligence verification proves that the submitted transaction request is trustworthy, the recipient entity may not allow access to the data being requested.

To conduct the due diligence verification of a received transaction request, the recipient entity may submit inquiries to the disclosed identity management system. In submitting the verification inquiries, the recipient entities become participant entities in the identity management system. Pictorially, the participant entities are represented by data request originators 1 to 5 shown in FIG. 1. For each transaction request received at data request originators 1 to 5, inquiries may be submitted, via respective interfaces, to transaction authentication engine (TAE) 122. The inquiries may elicit respective responses from the TAE 122 regarding a trustworthiness disposition of the requested transaction.

For the TAE 122 to process the submitted inquiries from data originators 1-5, the respective data owner may provide discrimination methods for the TAE 122. The discrimination methods may enable context-dependent processing of the transaction request for which the trustworthiness is being investigated. In some configurations, the trustworthiness investigation may be performed in accordance with varying threshold level requirements that are commensurate with the character of the underlying transaction, trust level of each electronic proof of identity, as well as the custom policies of the participant entities managing the data targeted by the transaction being requested. For example, discrimination method may include threshold level of the transaction amount to trigger increased scrutiny. As an illustration, financial transaction over the amount of $500 may automatically trigger increased scrutiny and if the amount is over $100,000, then more than one source may be consulted to verify the identity of the requestor. Such discrimination method may correspond to the discrimination layer 104 illustrated in the hierarchy in FIG. 1.

Thus, TAE 122 may function as an infrastructure apparatus to determine whether the transaction request is sufficiently trustworthy for the recipient entity to process the requested transaction.

The determination of trustworthiness of the transaction request may incorporate validating electronic proof of identity accompanying the submitted transaction request. The electronic proof of identity may be compared against an identity database during the validation process. In general, the identity proof may become available only after a vetting process at an authoritative institution, such as the department of motor vehicles (DMV), the state department, etc. The vetting process may additionally comply with legislative directives, such as the REAL ID Act or the PASS ID Act, to boost secure identity documentation. Examples electronic proof of identity may include a digital identification document, such as, for example, a digital driver's license, a digital passport, a digital social security card, a digital medicare/Medicaid card, etc. The electronic proof of identity may also include a biometric in digital form, such as an electronic signature, a digital finger print, a digital palm print, a digital iris scan, a digital retina scan, or even a DNA digitally captured. The electronic proof of identity may be subject to additional encryption (for example, by the holder's private key) to further prevent tampering. Moreover, revocation or replacement of lost/stolen electronic proof of identity may be instantly effective at the identity database of the authoritative source. Hence, lost/stolen electronic proof of identity can be recognized during verification once the authoritative source has been updated. As a result, possession of a verifiable electronic proof of identity may establish a prima facie showing that the holder is the person identified by the electronic proof of identity.

The next layer is the access methods layer 106. The access methods layer 106 generally refers to a work flow including protocols for verifying, for example, the electronic proof of identity, identity databases to compare against, as well as user authorization of business partners to query an identity database to verify the user's identity. As disclosed herein, access methods layer 106 may be interchangeably referred to as the work flow layer 106.

The next layer is the access policies layer 108 which generally includes macroscopic and microscopic policies for participant entities to query an identity database. The access policies may include a subscription status of a particular participant entity to query a specific identity database, usage metering of a particular participant entity to query a specific identity database, accounting for accessing a specific identity database by a particular participant entity, load balancing of servers associated with querying a specific identity database, etc.

In one configuration, an authentication policy server 128 may host a database to track the subscription status of participant entities. Depending on the underlying identity databases, the subscription database may include the current subscription status of a particular participant entity. The current subscription status may reflect the levels of access to a particular identity database that a participant entity has paid for. For example, participant entities may pay for a regular access that provides a monthly access quota. The regular access may include a labeled access bandwidth guarantee that may include (i) a floor level of the number of queries to the identity database submitted within a quantum of time, such as, for example, per minute; or (ii) a floor level of the number of responses received from the identity database per quantum of time, such as, for example, per minute.

In comparison, a basic access may include a labeled access bandwidth guarantee that includes (i) a ceiling level of the number of queries to the identity database submitted within a quantum of time, such as, for example, per minute; or (ii) a ceiling level of the number of responses received from the identity database per quantum of time, such as, for example, per minute. Not surprisingly, the subscription fee is reduced for basic access.

Similarly, a premium access may be a step upward from the regular access. For example, the premium access may include a labeled access bandwidth guarantee with higher floor levels in the number of queries to the identity database submitted by the paying participant entity or higher floor levels in the number of responses to be received by the paying participant entity from a particular identity database.

In a way, the labeled access bandwidth guarantee may be similar to advertised access bandwidth as provided by cable or phone companies. Indeed, the labeled access bandwidth guarantee may be listed in such metrics as the amount of information or data to or from a particular identity database for each payment level. In short, the participant entities each get what they paid for. A non-paying participant entity may not have the identity management system to submit query to the identity database and may not receive responses from the identity database either.

The level of access may be measured in metrics other than a mere bandwidth. For example, the level of access may also be measured in throughput terms. The throughput terms may track the total amount of information, e.g., number of bytes, transmitted between a participant entity and an identity database. The throughput terms can be more fine-grained than the total data in bidirectional communication. For example, the throughput terms may include the number of queries (or the amount of data encoding such queries) submitted by a participant entity to an identity database, the number of responses (or the amount of data encoding such responses) received by a participant entity from an identity database, etc. Hence, the level of access according to some implementations disclosed herein may be measured in terms similar to the metrics adopted by water, sewage, gas, or electricity companies.

Moreover, the level access may include duration of connection time. Connection time may include the period of time during which a participant entity is engaged in actual communication with an identity database. The connection time metrics may be enforced by simple timers installed on the authentication policy server 128. The connection time metric according to some implementations may resemble the metrics used by phone companies or internet café. For example, if an access plan according to some implementations may allocate a time quota for a paying participant entity to access the identity database during a peak-time, for example, between 9 am and 5 pm local time where the identity database. During off-peak time, however, the paying participant entity may be given more time quota to communicate with the identity database. In some instances, the paying participant entity may even communicate constantly during off-peak time, much like unlimited access during off-peak time as used by certain phone companies.

To enforce a subscription plan, the authentication policy server 128 may meter the usage of a particular database by counting the number of queries transmitted to the identity database, the amount of data transmitted to the identity database in association with the queries, the number of responses received by the participant entity, the amount of data received from the identity database in association with the responses to queries.

Participant entities may choose a plan based on actual usage. Actual usage of a particular participant entity may be determined by metering as discussed above. Based on the metered usage, accounting may be performed to determine a monetary cost to the particular participant entity. For participant entities on a plan with a cost quota, the determined monetary cost may be compared against the quota in real-time, as the queries and responses are being communicated back and forth. When the cost incurred from actual usage approaches the cost quota, an alert may be sent to the participant entity to inform the entity of the status. If the cost incurred reaches the quota and no additional subscription payment is received from the participant entity, the participant may no long receive service from the transaction authentication engine 122.

The next layer is the database trusted source layer 110, which may correspond to authenticated verification engine (AVE) 128 in some implementations. AVE 128 may interface directly to identity databases maintained at authoritative sources. The identity data layer 112 may correspond to databases 130-144. As shown in FIG. 1, the identity databases 130-142 administered by authoritative sources such as a government agencies. A government agency mandated to provide service to individual citizens may be an authoritative source in maintaining an identity database hosting identity information of the individual citizens being served. Example government agencies may include the Department of State, the Department of Homeland Security/US Citizenship and Immigration Services, the Department of Health and Human Services, the Internal Revenue Service, the Social Security Administration, the Department of Motor Vehicles at each state, etc. Sovereign nations other than the US may have comparable agencies or administrations or commissions that function similarly to the US counterparts in serving individual citizens.

Moreover, identity database could be from a non-government authoritative source. As illustrated in FIG. 1, third party trusted system 144 may house additional identity databases which may be queries by AVE 126. In some implementations, third party trusted system may include non-government entities that may be trusted by history or tradition in serving consumers. Example non-government entities may include quasi-government agencies such as professional organizations of individual members and membership may require a thorough application process to check the applicant's background (e.g., credit history, employment history, educational background, criminal record, etc.). Example professional organization may include the American Bar Association, the state bar of each jurisdiction, a professional trade association, a professional sport association, an alumni association, etc. Example non-government entities that may house identity databases may additionally include financial institutions with a long history of serving average consumers, such as mortgage institutions, banks, credit unions, credit card companies, etc. More recently, on-line social networking entities may also house identity databases with a qualified degree of authority. Such on-line social networking entities may include LinkedIn, MySpace, Twitter, Facebook, etc.

The identity data stored in databases 130-142 and third-party trusted system 144 may be acquired after a vetting process, corresponding to acquisition methods layer 114. The vetting process for a government entity may include a lengthy application process to verify an applicant's identity. For example, when applying for a driver's license, a state DMV typically require the applicant to present a valid driver's license from another jurisdiction, or a valid passport, or a valid permanent resident card. The applicant may be further required to provide proof of residence, including utility bills, cable bills, phone bills, etc. to show that the applicant indeed resides in the intended jurisdiction. Sometimes, the applicant may need to provide proof of employment as well. The applicant may be additionally required to pass vision test or a driving test. Once the applicant has passed the tests, biometric information identifying the applicant may be taken from the applicant, including, for example, a portrait of the applicant, a finger print of the applicant, a signature of the applicant, etc. Other personally identifiable information, such as hair color, eye color, blood type, birth date, etc., may also be collected from the applicant. The vetting process may include authenticating the applicant and performing background check on the applicant. Successful completion of the vetting process may establish a prima facie presumption of the applicant's identity as recorded in the identity database.

As to the non-government entities housing identity databases, a comparable vetting process may be instituted to establish a prima facie presumption of the member's identity. For example, profession organizations may require applicant to complete a thorough screening process before the applicant can be admitted as a member. Additionally, annual membership dues and compliance with professional conduct may be required to maintain membership. The screening process, along with membership obligations, may filter out unqualified individuals or members not in good standing. In doing so, the trustworthiness quality of the identity data of the active members may be maintained.

User 202 may desire to engage in a transaction with participant entity 204. The transaction may be a financial transaction, such as, transferring funds between financial accounts, making on-line payments, viewing account balance, etc. The transaction may be administrative, such as, for example, updating contact information, updating residential address, updating employment history, updating employment status, updating insurance coverage information, updating educational background, etc. The transaction request may be submitted (220) in a variety of ways. The transaction may be submitted on-line through a computer of user 202 or a mobile device of user 202. The transaction request may also be submitted at a branch office of the participant entity (e.g., a financial institution, a government agency, etc.) and may be processed by a machine apparatus at the branch office (e.g., a kiosk, an automatic teller machine, etc.)

User 202 may include an individual user, an organizational user (e.g., a corporation, a non-profit organization, a government agency, etc.). Participant entity 204 may be any entity subscribing to the integrated identity management system as disclosed herein. Participant entity 204 may include a business entity (e.g., a person, a corporation, a partnership, a sole proprietary, etc.), a non-profit entity (e.g., professional organizations, educational institutions, etc.), a government entity (e.g., a government entity at the state or federal level, etc.).

The requested transaction may attempt to access data managed by the participant entity 204. When participant entity 204 receives the transaction request, participant entity 204 may need to authenticate that user 202 submitting the request is who user 202 purports to be. In the Internet age, simple authentication based on user name and password may not suffice with the advent of Cloud computing and the trend towards the Big Data. In fact, simple on-line identities including user name and password may be subject to identity theft and identity fraud. A recent survey revealed that identity theft in the United States rose to a three-year high in 2012, with more than 5 percent of the adult population, or 12.6 million people, falling victim to such crimes. The numbers are up from 4.9 percent in 2011 and 4.35 percent in 2010. The incidence of identity theft is only expected to rise. To mitigate the risks arising from identity theft in the context of e-commerce, some implementations, as disclosed herein, function towards an integrated identity management system in which participant entities, as subscribers, may leverage the identity information at identity databases located elsewhere. A vetting process may be in place as a gatekeeper to allow verified identity information of individual users to enter the identity databases. For example, by history and tradition, identity databases at the Department of Motor Vehicles may serve as the authoritative source of identity information because the identity information in the identity database of the DMV have been verified and validated during the background checking and on-site application process. The ubiquitous internet may provide a unique opportunity to leverage the authority of identity information in the identity database to validate user-submitted transaction requests.

As illustrated in FIG. 2, participant entity 204 may submit a request to validate (221). The request to validate may be submitted at the transaction authentication engine 122. The request to validate may be submitted by participant entity 204 in response to a transaction request received from user 202. The purpose of the request to validate is to get an opinion as to the trustworthiness of the transaction request as submitted by user 202. To reach a disposition on the trustworthiness, as requested, TAE may conduct two inquiries. First, whether the user 202 submitting the transaction request is indeed what user 202 purports to be. Second, whether participant entity 202 is entitled to submit the request to validate.

TAE 122 may submit the first inquiry to authentication verification engine 126 (222). The first inquiry may include identity information of user 202. Such identity information may be obtained from user 202 when submitting the transaction request at participant entity 204. In some implementations, user 202 may present an identification document at the time of submitting the transaction request. For example, user 202 may show a driver's license to a reader device, such as a scanning device attached to a mobile device of the 202. Other forms of identification document, such as a passport, a national identification card, a social security card, a medicare/Medicaid card etc. The identification document may also be a digital identification document, issued by a government agency through the same rigorous vetting process. The digital identification document may or may not be scanned by a reader device. In some implementations, data encoding the digital identification document may be beamed to a reader device. In some implementations, data encoding the digital identification document may be received along with the transaction request at the participant entity 204. Watermarking features may be present in the identification document to deter counterfeiting or tampering.

AVE 126 may interface to an authoritative identity database, such as an identity database at a department of motor vehicles, the state department, the social administration, the department of human and health services, etc. AVE 126 may submit a query (223) to identity database 210 in an effort to compare the identity information of user 202 against identity database 210. AVE 126 may compute an authenticity score indicating the relative authenticity of the identity information of user 202. In other words, the authenticity score may numerically attest to the identity of user 202. Query results may be received from identity database. In some implementations, a 1 to 1 mapping result may be returned from the identity database in response to the query. The query results may also be relayed by AVE 126 to TAE 122, along with the computed authenticity score.

Either subsequently or concurrently, TAE 122 may submit a second inquiry at authentication policy engine 128 (226) to ascertain whether participant entity 204 is entitled to submit the request to validate. APS 128 may maintain a database to track the subscription status of each participant entity. If participant entity 204 has not subscribed to the service or if the participant entity 204 has an expired subscription, then participant 204 may not have the currency to support the request to validate. Moreover, the database at APS 128 may also include the subscription plan for each subscribing participant entity. As discussed above, the subscription plan may impact the time and manner in which a participant entity may access a particular identity database. Furthermore, APS 128 may enforce a set of business rules for each subscribing participant entity. For example, a participant entity may only submit request to validate and access the identity database during specified times, from specific IP addresses, etc. The business rules may prescribe the scope of services that each participant entity may obtain from a particular identity database. APS 128 may enforce the business rules.

Based on the subscription status of the participant entity 204 and the prescribed business rules associated with the participant entity 204, APS 128 may compute a validity score for the participant entity 204 to access the identity database. By submitting the request to validate a transaction request, participant entity may attempt to access a particular identity database. In response to the second inquiry submitted by TAE 122 to APS 128, the computed validity score may be returned to TAE 122 (227). The validity score may reflect numerically the relative degree of validity for the participant entity 204 to access the identity database when the participant entity 204 requested TAE 122 to, for example, verify the identity of the user requesting a transaction at the participant entity.

Based on the computed authenticity score and the validity score, TAE 122 may reach a disposition on the trustworthiness of the transaction request. The determination may also factor in the specific query results received from the identity database in response to the submitted query. The disposition results may be relayed to participant entity 204 (228). If the disposition of trustworthiness is favorable, then participant entity 204 may proceed with the requested transaction and provide user 202 with the transaction results (229). If, however, the disposition of trustworthiness is not favorable, then participant entity 204 may not proceed with the requested transaction. Instead, participant entity 204 may provide an error message to user 202 indicating that the requested transaction failed to go through.

Figure 2A:
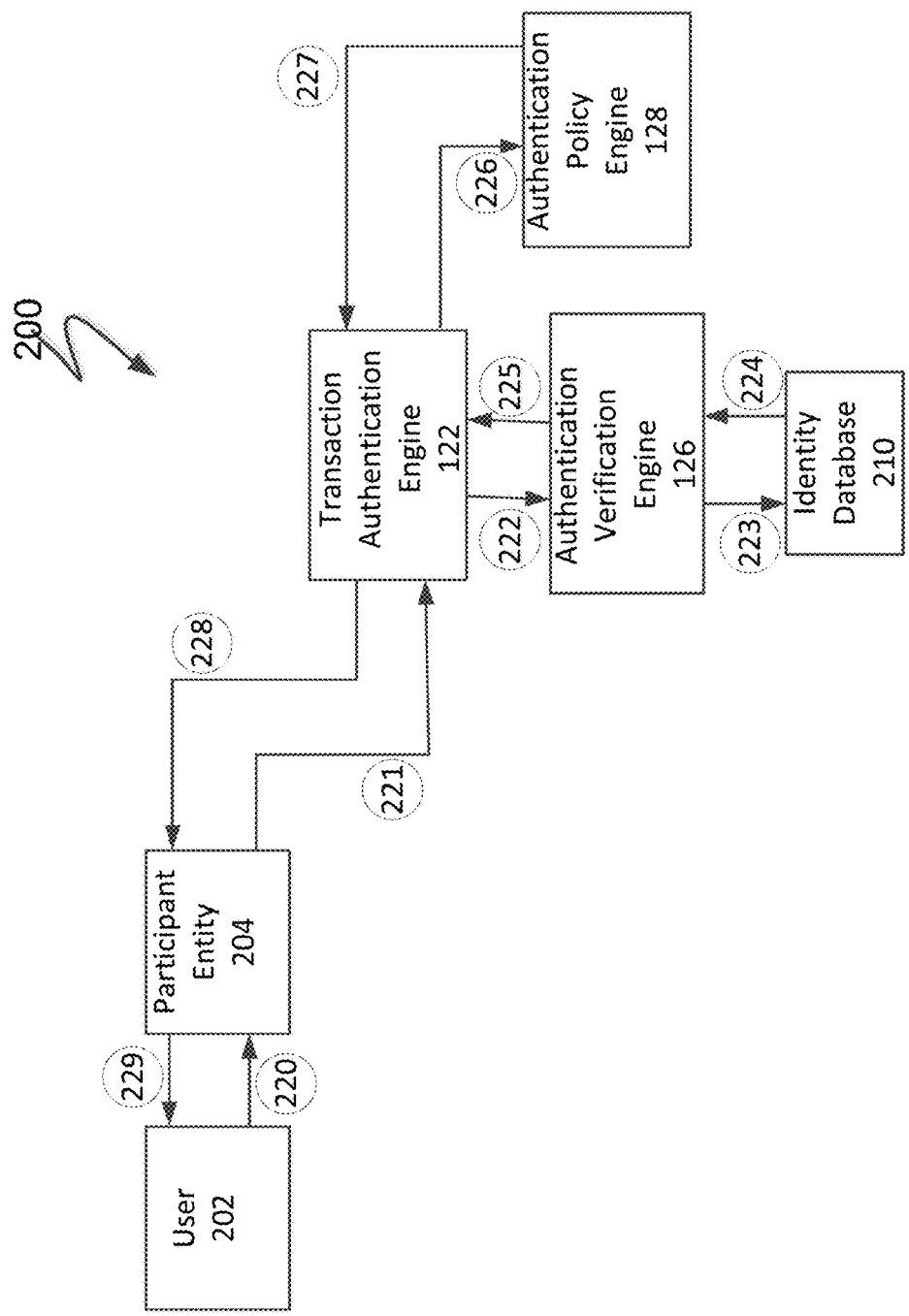
FIG. 2A shows an example workflow for determining a trustworthiness of a transaction request submitted by a user at a participant entity according to some implementations.
Figure 2B:
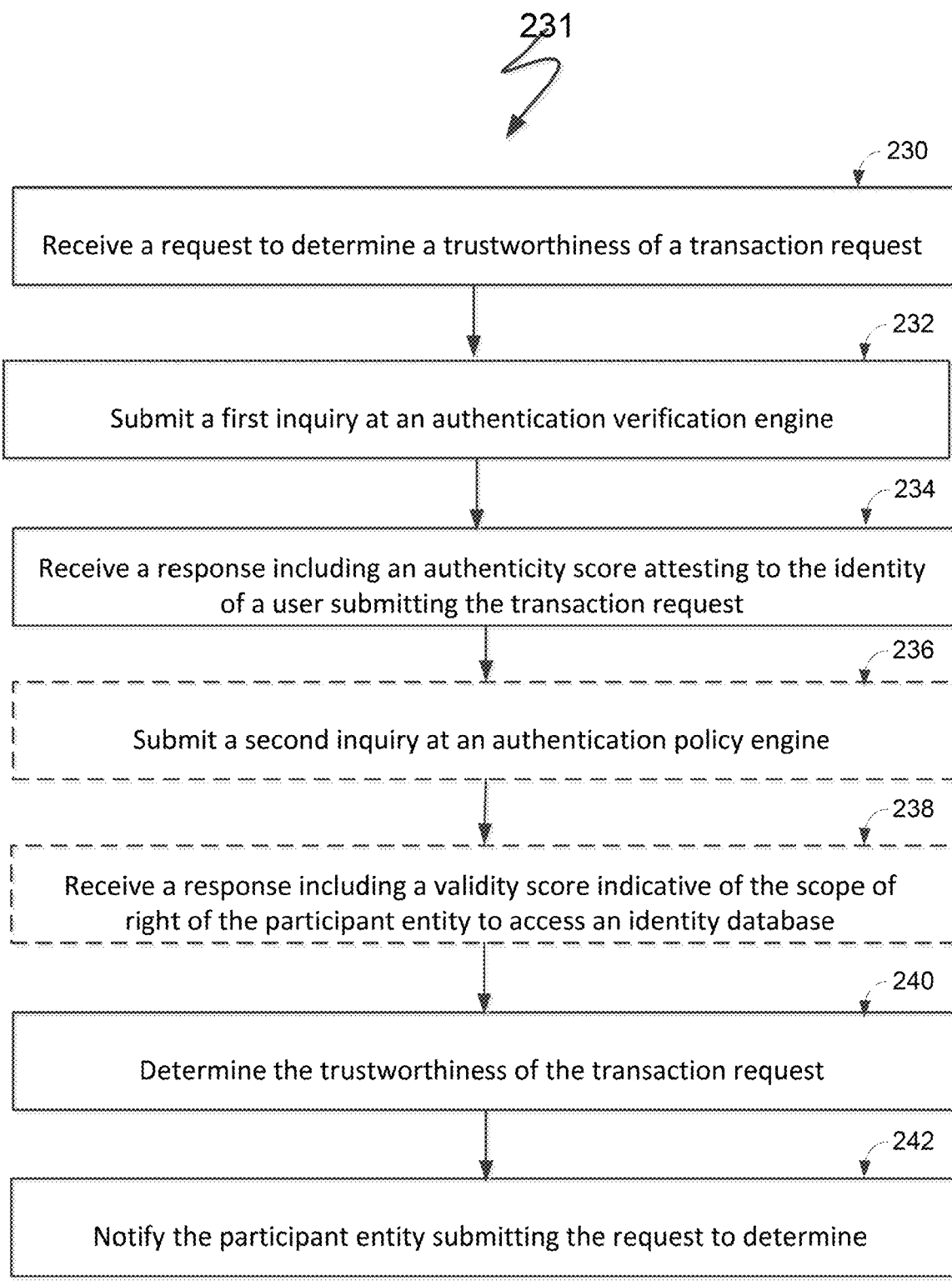
FIGS. 2B to 2D are flow charts showing example workflows for determining a trustworthiness of a transaction request.
Figure 2C:
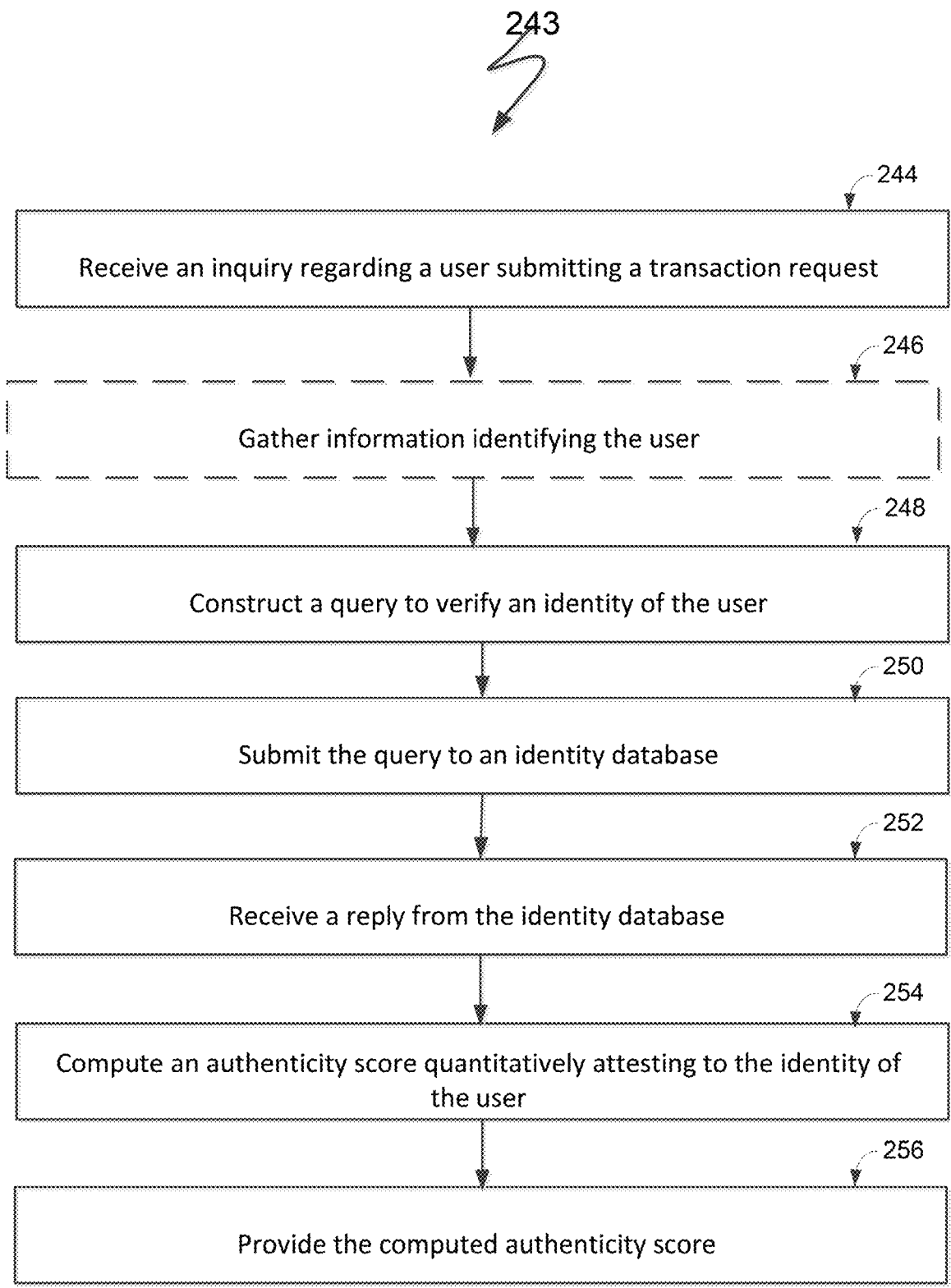
Figure 2D:
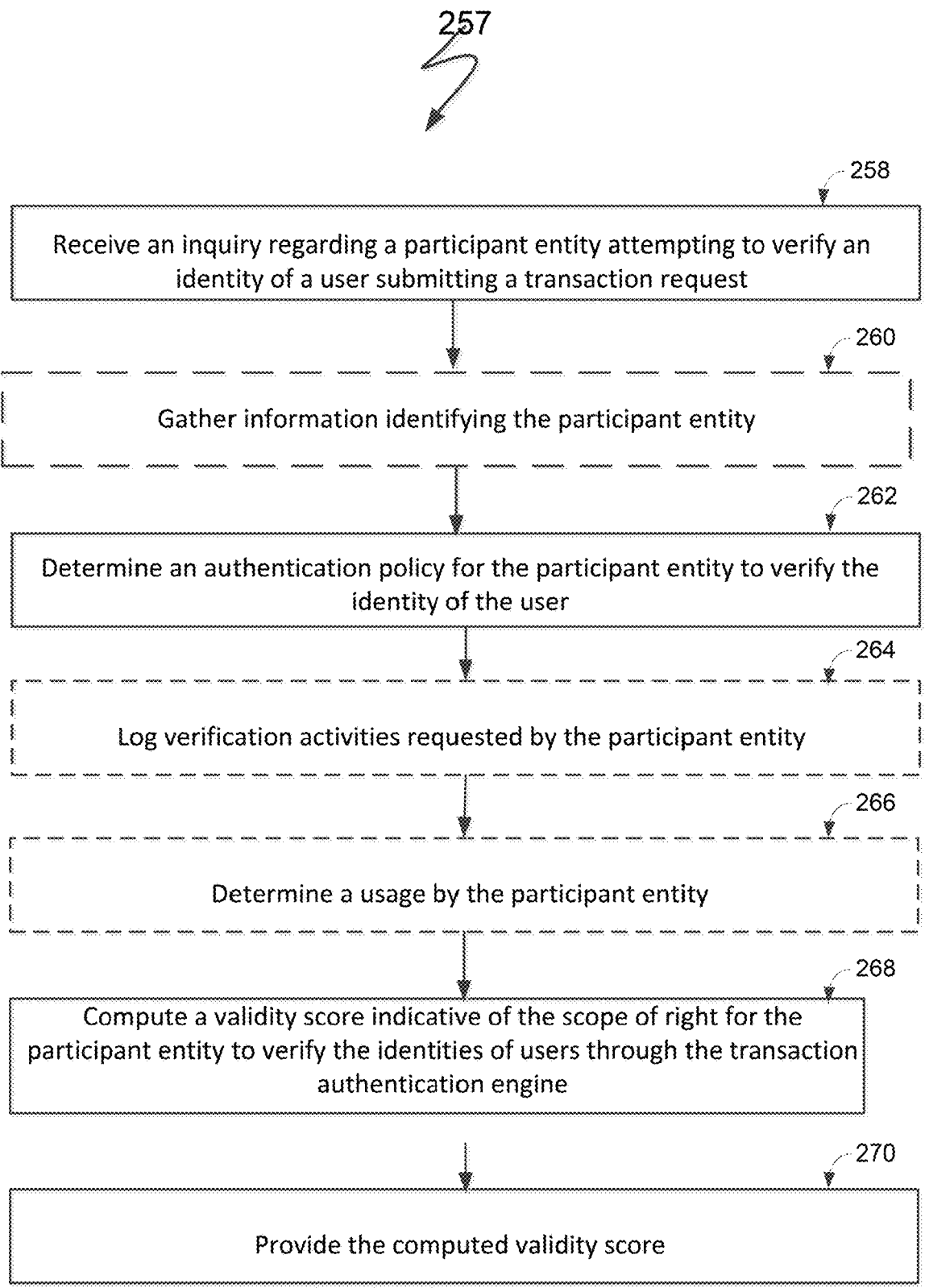

FIGS. 2B to 2D show respective example flow charts for TAE 122, AVE 126, and APS 128 according to some implementations. The engines illustrated by TAE 122, AVE 126 and APS 128 may include a server computer having at least one processor and memories. The engines may also include a server process on a computer. The process may have at least one thread and may engage in inter-process or inter-thread communications.

In FIG. 2B, an example TAE 122, according to some implementations, may receive, from a participant entity, a request to determine a trustworthiness of a transaction request (230). As discussed above, the transaction request may be submitted by a user in an attempt to access data managed by the participant entity.

In response, TAE 122 may submit a first inquiry at an authentication verification engine (AVE) 128 to determine an authenticity status attesting to a purported identity of the user (232). Thereafter, TAE 122 may receive a response from AVE 126 (234). The response may include a computed authenticity score indicative of the relative authenticity of the purported identity of the user.

In some implementations, based on the computed authenticity score, TAE 122 may determine the trustworthiness of the transaction request being submitted by the user (240). For example, when the participant entity 204 merely seeks a second identity proof of user 202 at an identity database and participant entity 204 has access right to eventually query at the identity database, then a response from TAE 122 either confirming or refuting the user's identity may be sufficient. An example scenario may be when user 202 submits a transaction request to purchase alcohol from participant entity 204. In addition to take payment for the alcohol product, local regulations may require participant entity to confirm that user 202 is indeed over, for example, 21 years of age. An identification document of user 202 may be presented by user 202 along with the transaction request. The identification document may include, for example, a driver's license, a passport, a national identification card, etc. The transaction request may include an on-line transaction request. A copy of the identification document may be may be forwarded to the TAE 122. In turn, TAE 122 may query identity database, through AVE 126, based on the identification document. If query results confirm that the identification document is authentic and has not been tampered with, and that user 202 is over 21 years of age, AVE 126 may return a full authenticity score to TAE 122. TAE 122 may subsequently determine that the transaction request is trustworthy, as submitted by user 202. Thereafter, TAE 122 may notify the participant entity 204 of the determined trustworthiness of the transaction request (242).

Similar example scenarios may include the purchase of guns, controlled substances, etc. In these example scenarios, identity databases may be queried to ascertain whether user 202, as the requestor, may have criminal record that may impact the requestor's ability to buy such items. Example identity databases to be queried may include, for example, the registered sex offender registry.

Generally, the authenticity score may amount to a matter of degree of confidence as to the authenticity of a purported identity. The requisite authenticity score may vary, depending on the application underneath. For example, for transactions involving a financial sum of under $500, a lower degree of match authentication level may be sufficient. While for applications involving any purchase of controlled substances, a higher degree of confidence may be needed.

In some implementations, TAE 122 may submit a second inquiry at authentication policy engine (APS) 128 to determine a scope of right possessed by the participant entity 204 to access a particular identity database (236). As discussed herein, the participant entity may attempt to verify the user's identity by querying, for example, through AVE 126, an identity database as an authoritative source. Subsequent to submitting the second inquiry, TAE 122 may receive a reply from APS 128 (238). The reply including a computed validity score indicative of the scope of the right to access the particular identity database.

TAE 122 may also receive query results from a particular identity database, for example, through AVE 126 in accordance with the scope of right for the participant entity to access the particular identity database. The query results may be in response to a query about the identity of a user submitting a transaction request at the participant entity. APS 128 may administer business rules to regulate the manner in which such query results may be received by TAE 122. These business rules may be entity specific and may be at various granularity levels. In one configuration, the business rules may have special provisions for insurance companies to access a user's medical history. Some business rules may limit query results (in response to queries on employment history) to employment data of the user during the past three years. Other business rules may prescribe the quantity of received query results depending on when or where queries are submitted. For example, during busy times, the prescribed quantity may be more limited. If the queries are submitted from geographically more distant addresses, the query results may be more limited in content or quantity.

In implementations where the TAE 122 submits a second inquiry to APS 128 to determine a scope of right possessed by the participant entity 204, the second inquiry may be submitted simultaneously along with the first inquiry, or sequentially. The second inquiry may be submitted ahead of the first inquiry and if participant entity is not entitled to use the integrated system to query a particular identity database, the first inquiry may not need to be submitted. In return for the submitted second inquiry, TAE 122 may receive a computed validity score from APS 128. TAE 122 may make a determination of trustworthiness of the transaction request being submitted (240) and may factor in both the authenticity score and the validity score in the determination.

After making the determination, TAE 122 may notify the participant entity 204 of the determined trustworthiness of the transaction request (240). If the determination is unfavorable, TAE 122 may also notify participant 204 of the reasons behind the unfavorable determination, including, for example, subscription expired, quota exceeded, etc.

The contents of the query results, when received at TAE 122, may be considered by TAE 122 during the determination of the trustworthiness of the transaction request. As discussed, the determination may also factor in the authenticity score quantitatively attesting to the purported identity of the user submitting the transaction request as well as the validity score indicative of the right possessed by the participant entity to use the integrated identity management system to verify the identity of the user. For example, user 202 may submit a transaction request to obtain a homestead tax exemption in the jurisdiction to which user 202 is transferring. In the illustrative example, the transaction request may be submitted at the department of taxation of the jurisdiction, which may operate in the capacity of participant entity 204. The department of taxation may use the integrated identity management system to query, for example, an identity database at the DMV of the jurisdiction to ascertain the current residential address of user 202. TAE 122 may coordinate the verification process by submitting an inquiry at AVE 126, which may interface with an identity database administered by the DMV of the jurisdiction. Through coordination of TAE 122, AVE 126 may submit query into the identity database at the DMV. The returned query results may be forwarded by AVE 126 to TAE 122. In determining the trustworthiness of the requested transaction to obtain an tax exemption status, TAE 122 may review the residential address as returned from the DMV identity database to ascertain, for example, whether user 202 may qualify for the applied-for exemption status, whether user 202 has been residing for any requisite time, whether the address is within an exemption zone, etc. Thus, the determination on the trustworthiness of the exemption status application, as requested, may hinge on the combined factors of the query results, the authenticity score, and the validity score. The results of the trustworthiness may be returned to the department of taxation, along with the residential address from the query results. In some cases, TAE 122 may query DMVs of several jurisdictions to obtain a residential history of user 202. The trustworthiness determination may factor in the entire residential history. The department of taxation receiving the homestead status application may receive both the trustworthiness determination and the residential history.

In another illustrative example, user 202 may request a transaction to bid for a job opening at a hiring employer. User 202 may submit a proof of identity, such as, for example, an identification document, along with the job application. In this illustrative example, the hiring employer, be it a private corporation or government entity, may operate in the capacity of participant entity. Hiring employer may use the integrated identity management system to query, for example, an identity database at the department of labor to obtain the employment history of user 202. If the obtained employment history matches the data as disclosed by user 202, as the applicant, full credit of trustworthiness may be issued by TAE 122. If, however, the obtained employment history does not match the data disclosed by user 202, the trustworthiness determination may become more nuanced. In some cases, if there are undisclosed gaps in the employment history from department of labor, then the trustworthiness determination may become unfavorable. In some cases, if the discrepancies appear as minor spelling variations, the trustworthiness may be considered intact. In some cases, when the trustworthiness becomes difficult to determine, then TAE 122 may cause the AVE 126 to submit further queries at other identity databases, such as, for example, income tax record at the internal revenue service (or an equivalent foreign agency, such as Revenue Canada). Income tax record, such as, W2 forms or 1099 forms for user 202 may be obtained from the taxation agencies as a surrogate of the employment history data. If the income tax record, as the returned query results, can demonstrate that user 202 has paid income taxes commensurate with the disclosed employment history data during the questionable years, then the trustworthiness of the application may still receive almost full credit. If no commensurate tax record may be found in the returned query results, the trustworthiness may be deemed low. As discussed herein, the determined trustworthiness and the query results returned from one or more identity databases, may be communicated to user 202.

In some implementations, the received query results may be stored temporally at TAE 122. The temporary storage may amount to a form of caching such that TAE 122 may look up the temporarily stored query results before querying, through AVE 126, the particular identity database. The temporarily stored query results may be accessed in accordance with the business rules regulating the scope of access right as discussed above. Further, the business rules may allow a participant entity to use the temporarily stored query results for a specific time period during which the temporarily stored copy may be considered current (as compared to stale). Moreover, TAE 122 may institute caching policies to coordinate with the particular identity database regarding updates in the identity data for user 202. For example, TAE 122 may establish an update status list for the identity data for each user queried before. TAE 122 may then receive a notification from the particular identity database when the identity data for one of the listed user has been updated.

Further, TAE 122 may obtain an authentication policy from the authentication policy engine 128 functioning as a server. The authentication policy may govern communication between the transaction authentication engine and the authentication verification engine. For example, the authentication policy may include prescribed communications protocols between TAE 122 and AVE 126 as well as between AVE 126 and identity database 210. The communication protocols may be session specific or subscription dependent. TAE 122 may then configure and set up the agreed-on communication protocol to engage in data communication with AVE 126, and through AVE 126 to identity database 210. For example, TAE 122 may configure the communication protocol according to the subscription of the participant entity. In other words, TAE 122 may enable a participant entity to obtain as much as access to database 210 through AVE 126 as the participant entity has paid for. Furthermore, TAE 122 may set up the encryption protocol to transmit data from TAE 122 to AVE 126 as well as the decryption protocol to decode data received from AVE 126.

Turing to FIG. 2C, an example flow char for AVE 126 is shown. AVE 126 may receive, from TVE 122, an inquiry regarding a user submitting a transaction request to access data managed by the participant entity (244). The inquiry may include information identifying the user. AVE may gather the information identifying the user (246). For example, to gather the information from the transaction request, AVE 126 may call a method individually encapsulated in the transaction request. The encapsulation may mitigate the risk for AVE 126, or other components of the integrated identity management system, to leak the identifying information, even inadvertently. The encapsulation may be consistent with, for example, object oriented programming (OO) paradigm and may be implemented in a variety of programming languages, such as, for example JAVA, C++, or any scripting language with compatible with the OO paradigm. AVE 126 may then receive a return value as a result of calling the method and the information identifying the user may be retrieved from the return value.

The information identifying the user may include information encoding a biometric of user 202, such as, for example, a finger print, a palm print, a written signature, etc. The information identifying the user may also include personally identifiable information of user 202. Example personally identifiable information may include name, birth date, address, height, weight, eye color, hair color, marital status, etc. Information identifying the user 202 may also include user-name and password pair for user 202 to access an on-line account. Information identifying user 202 may be obtained from an identification document of the user. In some implementations, user 202 may attach a copy of an identification document along with the transaction request. The attached identification document may include a copy of the driver's license scanned by a reader device when user 202 was submitting the transaction request. In one configuration, the attached identification document may include a digital identification document, such as, for example, a digital driver's license. Information encoding the digital identification document may be beamed in when user 202 was submitting the transaction request.

Based on the information identifying the user, AVE 126 may construct a query to verify an identity of the user who has requested the transaction (248). AVE 126 may then submit the query to a particular identity database in communication with AVE 126 (250). As disclosed herein, the identity database may be administered by an authoritative source, such as the department of motor vehicles, the department of state, etc. Each of the authoritative sources may administer a rigorous vetting process to check the background of an individual before the identity data of the individual can be entered into the identity database. In some implementations, third party identity databases may be resorted to. These third party identity databases may have a qualified degree of authority. For example, social networking sites like Facebook or Linked-in may have an identity database for each user. Identity data in these databases may be less reliable than comparable identity data maintained at traditionally authoritative sources, such as the DMV. Identity data in less reliable identity databases may be treated with more scrutiny.

AVE 126 may then receive a reply from the identity database in response to the query (252). In some implementations, the reply may be a 1:1 mapping in which the top match is returned. In other implementations, the reply may be a 1:n mapping in which the top n matches are returned.

Based on the received reply, AVE 126 may compute an authenticity score quantitatively attesting to the identity of the user who has requested the transaction (254). AVE 126 may then provide the computed authenticity score useful for determining a trustworthiness of the transaction request.

When engaging a particular identity database, AVE 126 may configure a protocol for communication with the identity database. In some implementations, the protocol may be determined by an authentication policy governing data access rights by participant entity 204 at the identity database. The authentication policy may be administered by APS 128 of the integrated identity management system, as disclosed herein. Each participant entity may purchase a subscription plan to the integrated identity management system. The subscription plan may cover an authentication policy. In some implementations, AVE 126 may configure the protocol for communication according to the authentication policy as purchased by the participant entity. The authentication policy may cover communication between the AVE 126 and a particular identity database. The detailed protocols may include a encryption component as well as a decryption component. AVE 126 may configure a first protocol component for encrypting data being transmitted from the AVE 126 to the particular identity database. Concurrently, AVE 126 may configure a second protocol component for decrypting data being received by the AVE 126 from the particular identity database. AVE 126 may further maintain parameters of the identity database by: configuring component fields of identity data of users admitted into the identity database through a vetting process. Additionally AVE 126 may manage, based on the protocol, attributes corresponding to the component fields of the identity data. Subsequently, AVE 126 may configure, in accordance to the protocol, access to the component fields of the identity data stored at the identity database. Furthermore, AVE 126 may configure the protocol for communication with an identity database provided by a government entity. As noted herein, the government entity may administer a vetting process to perform background check of the user before the corresponding identity data of the user is entered into the identity database. AVE 126 may additionally configure the protocol for communication with an identity database provided by a third party entity, different from a government entity and the participant entity. As disclosed herein, identity database maintained by third party entities may serve as a surrogate identity database. To the extent that identity data in such third party identity database may not be as reliable as identity data in traditionally authoritative identity databases, identity data in such third party identity databases may be treated with additional scrutiny. Examples of such third party identity database may include databases maintained by social media enterprises, such as, for example, Linked-in or Facebook.

Turning to FIG. 2D, an example APS 128 according to some implementations is being shown. As illustrated, APS 128 may receive, from a transaction authentication engine 112, an inquiry regarding a participant entity 204 attempting to verify an identity of a user 202 (258). As disclosed herein, user 202 may be submitting a transaction request at the participant entity 204.

Based on the received inquiry, APS 128 may gather information identifying the participant entity 204 (260). The information identifying the participant entity may be embedded in the inquiry received. In some implementations, the information identifying the participant entity may be obtained from the transaction request being ascertained for the trustworthiness. TAE 122 may indicate the identifying information to APS 128 with no need for retrieval or extraction.

Based on the information identifying, APS 128 may determine an authentication policy for the participant entity to verify the identity of the user. This authentication policy may apply to all users who may submit transaction request at participant entity 204. In other words, this authentication policy may be a systematic policy for a particular participant entity and may not vary with regard to the identity of each individual user who may interact with particular participant entity.

Based on the determined authentication policy, APS 128 may compute a validity score for the participant entity 204 to verify the identity of the user 202. As discussed herein, the validity score may depend on a valid subscription status. For example, participant entity 204 may need a current subscription to the integrated identity managements system in order to receive a passing validity score.

Additionally, the subscription may be qualified in terms of the manner in which participant entity 204 may access the integrated identity management system, the components thereof, identity databases in communication to the integrated identity management system, or, as discussed herein, similar or sibling identity management system in communication thereto. As an illustration, the authentication policy may provide an access plan for participant entity 204 to use, for example, transaction authentication engine 122 of the integrated identity management system. The access plan may provide, for example, a time quota, a bandwidth quota, or a throughput quota for participant entity 204 to submit requests to validate to the transaction authentication engine 122. In accordance with provisions of the subscription plan, the time quota, the bandwidth quota, or the throughput quota for the participant 204 may vary as a function of when the requests to validate are being submitted (e.g., peak time or off-peak time), where the requests to validate are being submitted (e.g., more proximal or more distal to the transaction authentication engine), etc.

Moreover, the available subscription plans may depend on the nature of the business conducted by participant entity 204. As an illustration, insurance companies may never obtain records of certain medical tests for any individual patient. For example, legislative directives in many jurisdictions may not allow insurance companies to access results of genetic tests. Likewise, federal HIPPA (The Health Insurance Portability and Accountability Act of 1996) regulations may prohibit healthcare providers from disclosing medical information of individual patients, especially when the medical information may be sensitive.

Furthermore, subscription plans may prescribe the extent to which identity information may be accessible during a verification activity. As an illustration, some subscription plans may reveal only the last four digitals of the social security number for verification purposes within transaction authentication engine 122. Likewise, some subscriptions plans may only disclose the street number or zip code of where user 202 resides, without revealing the entire residential address.

The validity score may be computed in accordance with the subscription status of entity 204. APS 128 may then provide the computed validity score to TAE 122 for TAE 122 to determine a trustworthiness of the transaction request submitted by the user at the participant entity. As discussed herein, in determining the trustworthiness of the transaction request, TAE 122 may factor in other considerations, such as, for example, authenticity scores attesting to the purported identity of the user or query results from identity databases.

Notably, APS 128 may log verification activities requested by the participant entity 204 based on the received inquiry (264). Logging may be a book-keeping activity to keep a record, which may be used for a variety of purposes, such as, for example, auditing. APS 128 may then analyze the logged verification activities to determine a usage by the participant entity. The verification activities may refer to any activity taking place anywhere in the integrated identity management system or any identity database in connection with the integrated identity system. As an illustration, APS 128 may log queries to access an identity database as part of the verification activities requested by the participant entity 204. As noted herein, the queries may be submitted by AVE 126 to a particular identity database. The queries may be submitted to verify or obtain identity data. APS 128 may analyze the logged queries to determine the usage of the identity database by the participant entity. In some implementations, APS 128 may further profile the logged queries to determine a pattern of usage of the identity database by the participant entity.

Based on the determined usage of, for example, the identity database, APS 128 may perform accounting to determine a use fee to be charged to the participant entity for accessing the identity database. In some implementations, APS 128 may perform accounting by measuring in terms of the number of queries submitted to the identity database on behalf of the participant entity. The accounting may also be measured in terms of the number of responses sent to the participant entity in response to corresponding queries. In some implementations, the accounting may be performed to measure the data amount transmitted or received. For example, the accounting may measure an amount of data sent by AVE 126 to query the identity database on behalf of participant entity 204. Similar, the accounting may also be measured by the amount of data received at AVE 126 on behalf of participant entity 204 from the particular identity database. Based on the determined usage, APS 128 may provide feedback information to enable load balancing for any component of the integrated identity managements system or a particular identity database in communication with the identity management system. For example, the load balancing may be applied on AVE 126 when submitting future queries to the particular identity database.

When computing the validity score, APS 128 may compare the determined usage of, for example, the identity database by the participant entity with the authentication policy of the participant entity. Inconsistencies between the determined usage and provisions of the authentication policy may cause a reduction of the validity score. Additionally, APS 128 may provide an administrative interface to report the determined usage to a human administrator. The reported usage may provide feedback information to elucidate the reasons behind a validity score.

Interestingly, APS 128 may also provide an application program interface through which APS 128 may extend service for the participant entity 204 to access other identity databases different from the particular identity database. More specifically, the application program interface may allow APS 128 to communicate with other authentication policy engines different from APS 128 to access the identity database serviced by those authentication policy engines. Conversely, the application program interface may also allow the other authentication policy engines to access the particular identity database, access to which is being logged by APS 128.

APS 128 may administer an access right that is systematic for a particular participant entity to submit inquires about the identity of users. The users may be requesting transactions to access data managed by the participant entity. A concern may arise about self-initiated queries by a participant entity. In particular, the participant entities may engage in spoofing activities to query the identity information of users who may not be requesting a transaction with the participant entity in the first place. Such spoofing activities may lead to unwarranted accesses to identity databases. In certain cases, repeated polling of an identity database at a credit agency may negatively impact a user's credit score. In other cases, intensive and indiscriminate polling of a particular identity database may lead to slower responses from the identity database for genuine queries. In other words, unwarranted accesses to the identity database could amount to a denial of service attack for legitimate queries to verify user identities. Generally speaking, the concern of unwarranted access to identity database may be a privacy concern. Each user may have an arguably reasonable expectation of privacy of his or her identity data as stored in an identity database at the DMV. To address the privacy concern, a validated individual engine (VIE) may be introduced to administer an access right that is specific for a particular participant entity to submit queries to verify a particular user's identity. In other words, the VIE may implement an access right control at an individual level, rather than a systematic control (as administered by APS 128).

A user may submit a transaction request at a relying party. The relying party may include, for example, a financial institution, a healthcare provider, an insurance carrier, a merchant. In the context of relying party serving the user's transaction request, the user may also be known as the requesting party. The transaction request may include, for example, a request to access an account managed by the relying party. In some instances, the account may include a financial account and the access may include monetary withdrawal. The transaction request may also include, for example, a request to download media contents from a storage facility managed by the relying party. In some instances, the transaction request may be accompanied with credential information of the user, such as, for example, a password, a personal identification number (PIN), an encryption key, or a digital certificate of the user.

The relying party may rely on the identity resources within a federated system of transaction authentication and verification. Generally, a relying party may include a participant entity who has, for example, subscribed to a service of a federated system including the transaction authentication engine 122, the authentication policy engine 128, and the authentication verification engine 126. In other words, the relying party may rely on the providing party within the federated system. By way of illustration, when the verification request from the relying party is received by the providing party, the providing party (e.g., owner/keeper of the identity information) checks login/transaction credentials against a database in order to determine access eligibility and then returns results of the verification request to the relying party. Within the above context, the providing party may be the most attractive location for launching on-line attacks, and thus can be the most likely root cause of identity thefts.

Implementations of perishable symbology may enhance confidence that (i) a user submitting a transaction request is the person he or she claims to be, and (ii) the user is authorized to engage in the requested transaction at the time of submission. FIG. 3A is a diagram showing an example process flow for using perishable symbology to foil, for example, replay attacks or spoofing attempts.

In some implementations, to determine the trustworthiness of the submitted transaction request, the relying party may submit a verification request to transaction authentication engine 122 (301). This request is for the relying party to tap into the resources of a federated system so that database information from discrete identity databases can be leveraged. In the context of on-line authentication in a distributed network environment, a common theme of attack includes replay attacks, or spoofing attacks, in which the attacker attempts to reuse a captured message between the parties in later communications with the attacker assuming a forged identity.

Figure 3:
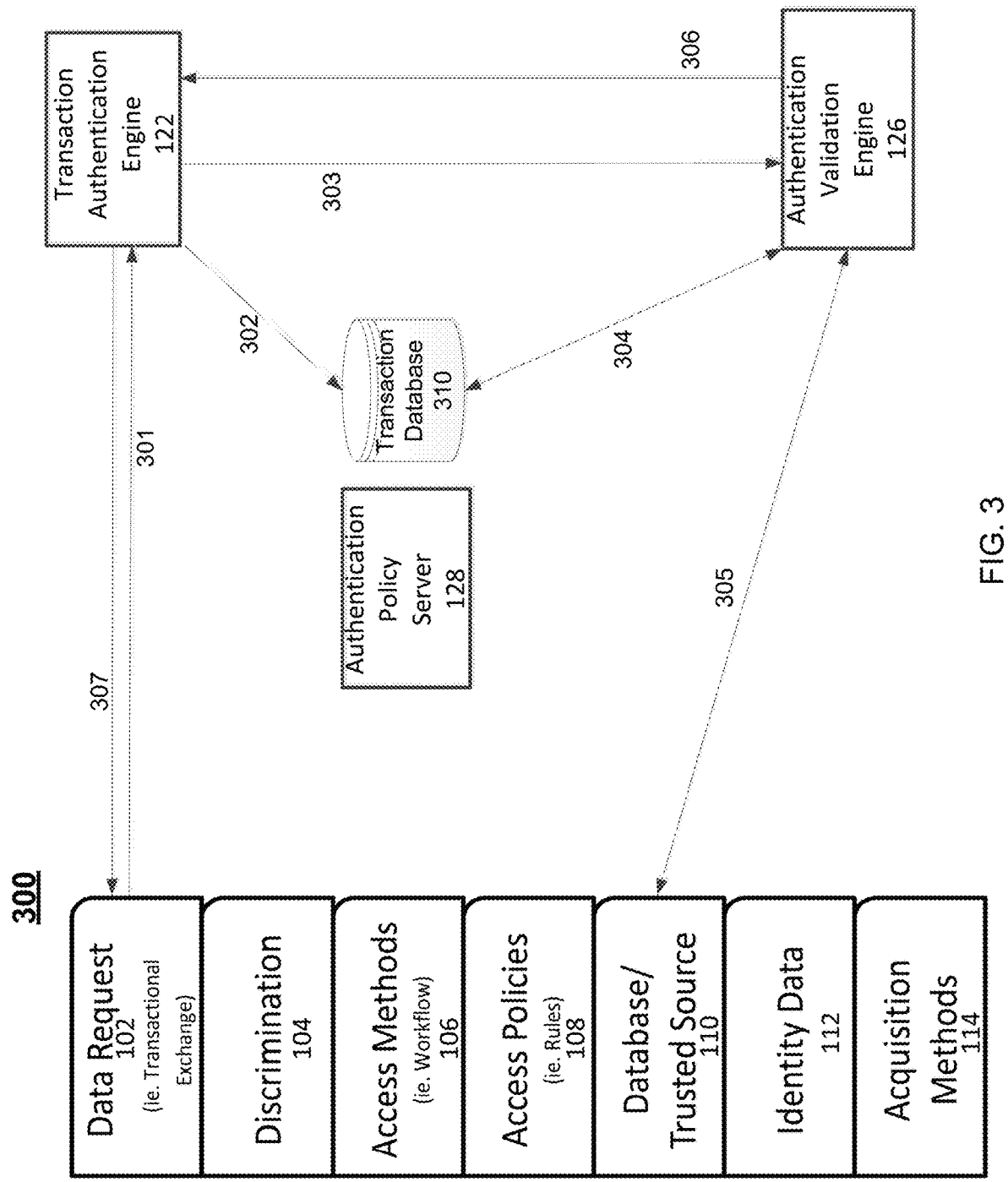
FIG. 3 is a diagram showing an example integrated identity management system constructed to perform perishable symbology.

FIG. 3 is a diagram showing an example integrated identity management system with perishable symbology capabilities. Similar to the depiction in FIG. 1, data request 102 may represent a transaction request submitted by a consumer user. The consumer may submit a variety of transaction requests for financial, business, enterprise, or social transactions. The transaction authentication engine 122 may conduct a due diligence verification to determine the trustworthiness of the submitted transaction request. To conduct the due diligence verification of a received transaction request, the relying party may submit inquiries to the disclosed identity management system. Inquiries may be submitted, via respective interfaces, to transaction authentication engine (TAE) 122. A due diligence verification inquiry concerning the transaction request may be transmitted to transaction engine 122 (301). As disclosed herein, the verification may be processed in a context-dependent manner according discrimination methods 104. Furthermore, such processing may follow access methods 106 that include protocols for verification in a given context. When the verification inquiry is received at transaction authentication engine 122, the due diligence verification may particularly include verifying whether the transaction request itself is not a replay attack, as disclosed in further detail below.

In some implementations, data characterizing the transaction requested may be generated at transaction authentication engine. The data characterizing the transaction may be unique to the transaction request. Such characterizing data may include, for example, identity of the requesting party, network and geographical origination of this party; identity of the providing party, network and geographical origination of this party; tokenization data from the participating parties including the requesting party and the providing party; type of transaction; amount of transaction; time of transaction origination; permitted time window for communication requests acknowledgement; timestamp of the data access; the actual payload data and accompanying metadata of payload; network carrier identity and routers/repeaters (and their locations) that handle the transaction information; and communication and security protocols used to enable the communication. The time stamp can be a unified time stamp within the federated system. In some implementations, the time stamp may originate from a network time server within the federated system running a network time protocol (NTP). By incorporating one or more of these associated characteristics, the chances of the characterizing data of two underlying transactions to be the same are greatly reduced. In some instances, the characterizing data can be smaller or substantially smaller in size than the transaction request or the underlying transaction. For example, the characterizing data for a transaction request to download a large media file would be a fraction of the size of the media content. In one instance, the characterizing data may be known as the pre-transactional characteristics. In this context, the characterizing data may also be referred to as metadata. The metadata can support the authenticity of the transaction request. The different types of data that could be captured to support the transaction would merely have to be unique. Each data element, on its own, would not be considered "individually identifiable", but altogether, might provide better definition of its authenticity The characterizing data is devoid of source assets of the transaction. Source assets of a transaction, within this disclosure, generally refer to the information used for identifying a user, such as the credential information manifested by a password, a PIN, a security word, a digital certificate, or an encryption key.

In one instance, the characterizing data is generated in the form of machine-readable data, for example, symbology data. Example symbology may include, a QR code, a 1-D bar code, or a 2-D bar code. In this instance, the symbology data may be pushed to a transaction database engine 310 (302). Once stored at transaction database engine 310, this symbology data may be retrieved on a limited time basis to effectively foil spoofing or replay attacks. In one instance, the symbology data may be retrievable only once for verification and once retrieved, the symbology data may no longer be accessible to a relying party. In another instance, the symbology data may be retrievable within a time-window and retrieval requests outside the time-window may not be honored. For example, if a retrieval request is received outside the time-window, transaction database 310 may ignore the retrieval request. In some instances, transaction data base 310 may drop or punt the retrieval request. In other instances, transaction database 310 may respond with a message that the record is not available.

Transaction database 310 is accessible for retrieval by transaction authentication engine 122 and authentication verification engine 126. In some instances, transaction database 310 can be collocated with authentication policy engine 128. In other instances, transaction database 310 may be at a location separate from authentication policy engine 128.

In some implementations, transaction authentication engine 122 may wait for confirmation that the characterizing data has been received by transaction database 310 and saved to the database for subsequent access. This wait may be part of a mechanism to synchronize the receipt of the characterizing data (as pre-transactional characteristics) at transaction database 310 with subsequent transmission of data from transaction authentication engine 122. In this mechanism, a time-out wait can be implemented so that transaction authentication engine 122 will not wait indefinitely for the confirmation that the characterizing data has been received. In one example, authentication engine 122 may retransmit the characterizing data to transaction database 310 when no confirmation is received at authentication engine 122 after the time-out period has elapsed. In some instances, the retransmitted characterizing data may be different from the earlier transmitted characterizing data because, for example, the time that the characterizing data is generated has been updated. Noteworthy is that some implementations may incorporate time stamps encoding both the time the verification request has arrived and the time the characteristics (e.g., pre-transactional) are summarized. In fact, the configuration of what time stamps to keep can be maintained by software programming and the configuration can affect a "formula" defining perishability. The time-out and retransmission in these instances are implemented at the application level and are supplementary to existing TCP/IP retransmission mechanisms.

Thereafter, transaction authentication engine 122 may submit an inquiry to authentication verification engine 126 to authenticate that the user submitting transaction request is who he or she claims to be and to verify that transaction requested is permissible between the requesting party and the providing party (303). The inquiry may include the credential information of the requesting party as well as the characterizing data (including the summarized transactional characteristics). The characterizing data is applicable only once to the underlying transaction request.

While verifying that the user submitting transaction request is who he or she claims to be, the authentication verification engine 126 may rely on identity data 112 as stored in database of trusted sources 110 (305). Authentication verification engine (AVE) 126 may rely on access policies 108 to determine whether the requesting party or the providing party may query an identity database. Access policies 108 may include macroscopic and microscopic policies for participant entities to query a particular identity database.

While verifying the identity of the requesting party by querying identity databases 110 according to access policies 108, AVE 126 may generally verify the credential information submitted in the first inquiry from TAE 122. In some instances, verifying the credential information includes verifying a password, a PIN, a security word, or an encryption. The requesting party (for example, the user submitting the transaction request at the relying party) can prove his or her identity by presenting the credential information that can be verified successfully.

Meanwhile, authentication verification engine 126 may verify that the transaction request from the requesting party is a freshly submitted request and not a replay. To this end, authentication verification engine 126 may query transaction database 310, per arrow 304, to correlate the inquiry received at the verification engine 126 with characterizing data stored at transaction database 310. In one instance, the inquiry submitted from transaction authentication engine 122 includes the characterizing data. In this instance, the characterizing data stored on transaction database can be machine-readable data, for example, in the form of symbology data. In another instance, the characterizing data included in the inquiry submitted from transaction authentication engine 122 may also be in the form of symbology data. Retrieval of the characterizing data from transaction database 310 can succeed before expiration (and hence the characterizing data is perishable). In some examples, retrieval query is allowed only once. This one-time use example can render replay or spoofing attacks moot as the characterizing data is single-use only. In other examples, retrieval query may only be allowed within a time window to enforce freshness of the characterizing data. As disclosed below, such characterizing data may be compared to determine the liveness of a transaction request. The characterizing data may also be used to log the transaction requests for forensic analysis.

Successful correlation within the time limit can confirm the summarized characteristics of the transaction, thereby validating the transaction request as freshly submitted and not a replay of an earlier submitted transaction request. A transaction request submitted as a replay will have, for example, a different time stamp at the transaction authentication engine 122. The different time stamp would lead to different characterizing data. The machine-readable data generated and stored per the earlier transaction request would not match the characteristics of the replayed request. If, however, a replay is launched on arrow 302 to insert characterizing data from an earlier transaction request, this characterizing data would not match the summarized characteristics of later transactions and therefore would not confirm the legitimacy of later submitted transaction requests.

In a related note, the TAE (relying party side) and the AVE (trusted source) side communicate and authorize the transaction. However the APS governs that "route request". If the APS is programmed to not permit re-use of a particular transaction authorization, then a reuse attempt does not get routed. This feature is part of the utilitarian value of perishable symbology to deter spoofing or replay attempts. Perishable symbology provides a manner by which each transaction is unique and segregated by the "time" of the request. A hacker would need to replicate the timestamp of a transaction, and that fraudulent transaction request would have to have the identical timestamp on all components of the transaction validation and verification system through the request workflow, which would be very difficult and virtually impossible.

In some instances, the characterizing data stored as machine-readable data on transaction database 310 may be used to log transaction requests received at transaction authentication engine (TAE) 122. The logged entries may be encrypted to further enhance data protection. These logged entries may enable data analytics, for example, to study consumer behavior on an aggregated level in response to external advertising campaigns. These logged entries may also enable data analytics to track consumer behavior on an individual basis without compromising the credential information of the individual consumer (also known as the source assets of each transaction). The statistical analysis on the aggregate level and at the individual level may record number of transaction requests, type of transaction requests, distribution of the logged transaction request per month, per type, etc. In time of a breach at transaction authentication engine (TAE) 122, the logged transaction request in the form of machine readable data stored on transaction database 310 may be used to reconstruct the transaction request received at (TAE) 122 as well as the sequence in which the transaction requests were received. Such reconstructed sequence of transactions request received may assist in tracing the transpired events that led to the breach. In some instances, the machine-readable data may include characteristics such as submission time of the transaction requests.

In one example, the correlation with characterizing data stored on transaction database 310 may be performed before the verification with identity database 110. In other words, when the characteristics of the transaction may be confirmed first, before the access eligibility can be determined. In this example, a breach at the authentication verification engine 126 may not expose the identity database 110. This is because the breach would be revealed based on the comparison pre-transactional characteristics and the verification with identity database 110 would not even proceed. Stated in another way, the TAE and the AVE are gathering "environmental" characteristics of an actual transaction, which then get stored in the Transactional database. An algorithm uses these characteristics to build a "perishable" or "temporary" mark representing that particular and specific actual transaction. If a hacking party tries to use past characteristics to spoof the authenticity, the time-stamp element of the unique perishable mark, flags the replay as possibly fraudulent, and does not let the recycling proceed. Furthermore, a breach at the transaction authentication engine 122 alone may lead to a more rapid forensic reconstruction of the infarction. This is because the breach would be detected earlier on based on the comparison of pre-transactional characteristics. In another example, the verification with identity database 110 may be performed before the confirmation with characterizing data stored on transaction database 310.

Figure 4:
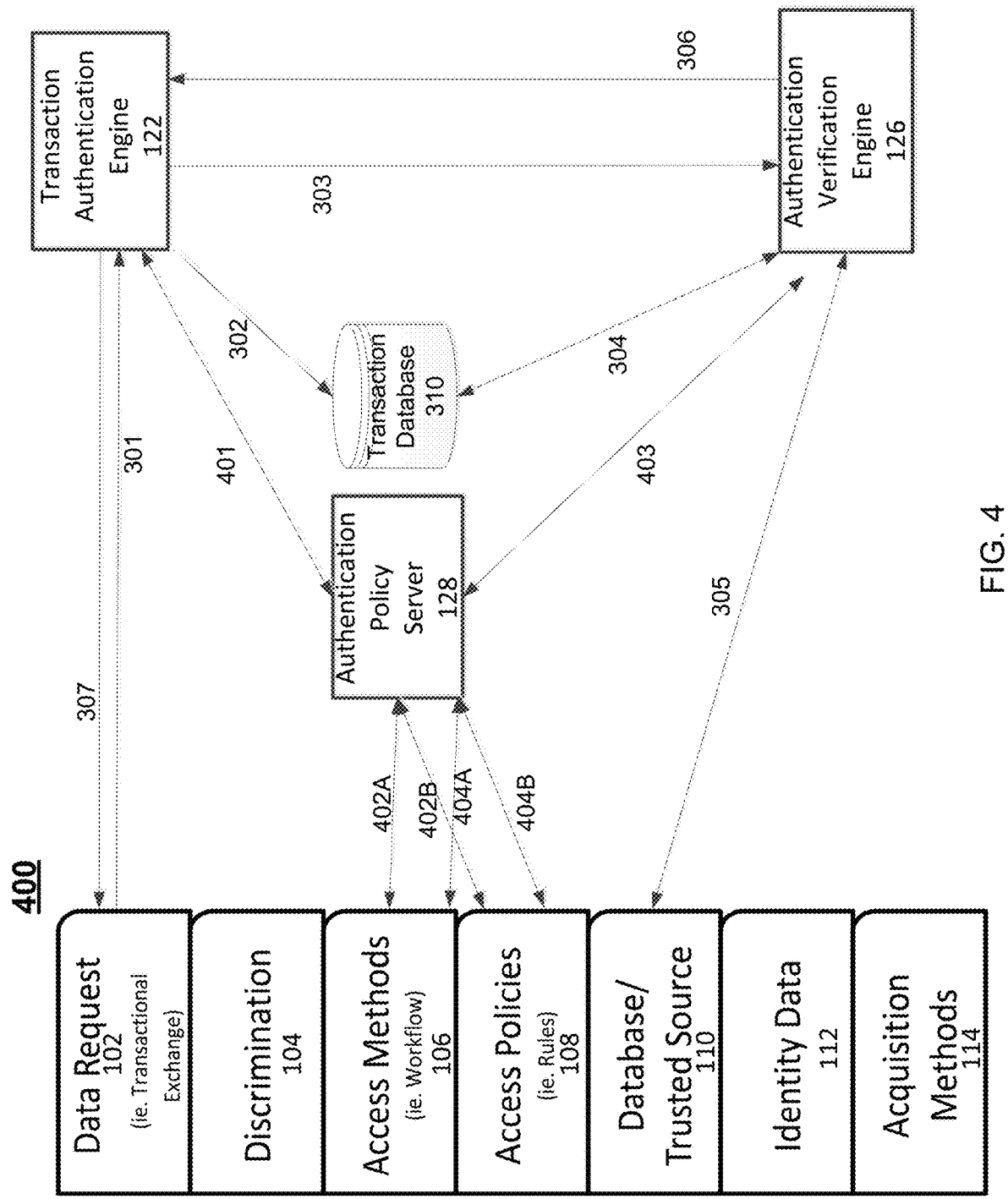
FIG. 4 is a diagram showing another example integrated identity management system constructed to perform perishable symbology.

In the context of the transaction database in FIG. 4 and "perishable symbology," there is the need to store the computed transactional results of the transaction and presents the stored transactional results as a unique string for purposes of access or forensic audit. The policy server determination results can be used as part of the computation of this unique string/hash to characterize the transactional results. As envisioned in the context of perishable symbology, the database is not an "identity engine," like the TAE or AVE, but rather a data warehouse to store characteristics, which can incorporate symbology data.

If the verifications from transaction database 310 and identity database 110 are both satisfactory according to the access policies that govern the type of transaction between the requesting party and the relying party, authentication verification engine 126 may signal transaction authentication engine 122 to proceed with the requested transaction (306). Otherwise, authentication verification engine 126 may signal transaction authentication engine 122 not to proceed with the requested transaction. In some instances, if the verifications from either the transaction database 310 or the identity database 110 is unsatisfactory, authentication verification engine 126 may choose not to send any signal to transaction authentication engine 122. In these instances, after a time-out period, transaction authentication engine 126 may retransmit inquires or may treat the verifications as unsuccessful.

Thereafter, transaction authentication engine 126 may signal, over arrow 307, the relying party to proceed with the requested transaction if the verifications succeeded. Otherwise, transaction authentication engine 126 may signal, over arrow 307, the relying party not to proceed with the requested transaction. In some instances, if the verifications did not succeed, the transaction authentication engine 126 may choose not to respond further to the relying party.

FIG. 4 is a diagram showing another example integrated identity management system with perishable symbology capabilities. In this example, the authentication policy server 126 may play a larger role in the federated system by first pre-clearing the relying party and the providing party, and then perform transactional disposition according to pre-defined risk profiles.

As discussed above, after a relying party receives a transaction request (e.g., from a consumer), the relying party may submit a verification inquiry to transaction authentication engine 122 (301). Before the transaction authentication engine (TAE) 122 generates the pre-transactional characteristics summarizing the transaction request, TAE 122 may first inquire at authentication policy server (APS) 126 to confirm any business relationship between the relying party and the providing parties (such as TAE 122) offering the verification service (401). In particular, relying parties, as users of the federated eco-system, may first subscribe to the ecosystem, and declare which providing parties they have a relationship with, the nature of the relationship (e.g., the type of identity data being sought). In some instances, this information is stored in a business rules (biz rules) repository, for example, associated with access policies 108. In other instances, technical information is also declared (e.g. mutually agreed upon communication and authentication protocols, and allowable contact windows) and stored in a workflow database, for example, associated with access methods 106. As illustrated in FIG. 4, APS 128 may then confirm each relationship and the terms stored in the business rules repository (402B). The technical information including protocols can be similarly verified (402A). When the business rules and work flow information are acceptable and reconciled, APS 128 may place the relying party on the "cleared" list (e.g. a whitelist) of the providing party (such as TAE 122). When a relying party is on the providing party's whitelist, additional verification inquiries from the relying party may be processed automatically and without additional confirmation of the business rules and work flow protocols by APS 128. On the other hand, if elements of business rules or work flow information cannot be verified, or is otherwise problematic, then the relying party may be placed in a "review" status, for further disposition. This means "automatic" processing of verification inquiries may be inhibited and additional verification inquiries from the relying party may still be processed by APS 128 confirming the business rules and work flow protocols. When the business rules and specified work-flow protocols are satisfied, then the transaction request may be processed further within the federated system.

Subsequently, transaction authentication engine (TAE) 122 may push pre-transactional characteristics to transaction database 310 (302). As discussed above, the pre-transactional characteristics may be in the form of perishable symbology data. Thereafter, transaction authentication engine 122 may submit a inquiry to authentication verification engine 126 to authenticate that the user submitting transaction request is who he or she claims to be and to verify that transaction requested is permissible between the requesting party and the providing party (303). Here, APS 128 may play a similar role. Authentication verification engine (AVE) 126 can confirm any business relationship between the relying party and the providing parties (such as AVE 128) offering the verification service (403). As illustrated in FIG. 4, APS 128 may then confirm each relationship and the terms stored in the business rules repository (404B). The technical information including protocols can be similarly verified (404A). When the business rules and work flow information are acceptable and reconciled, APS 128 may place the relying party on the "cleared" list (e.g. a whitelist) of the providing party (such as TAE 122). When a relying party is on the whitelist of AVE 126, additional verification inquiries from the relying party may be processed automatically and without additional confirmation of the business rules and work flow protocols by APS 128. On the other hand, if elements of business rules or work flow information cannot not be verified, or is otherwise problematic, then the relying party may be placed in a "review" status, which means "automatic" processing of verification inquiries may be inhibited and additional verification inquiries from the relying party may still be processed by APS 128 confirming the business rules and work flow protocols. When the business rules and specified work-flow protocols are satisfied, then the transaction request may be processed further within the federated system (304-307).

In the above illustration, tiers of access rights may be created, based on different subscription classifications. Such tiered access rights may then be updated in the business rules repository database. For example, in addition to the breach protection discussed earlier, other situational protections, such a "spoof" and "clock override" protections, can be added by configuring the APS 128 to authenticate the transaction requests against the pre-defined times, methods and rules.

In the illustration, APS 128, though shown as a single instance proxy, may be configured as a federated set of servers or virtual machines, synchronized and dedicated to the functional protection of request compliance checking.

Figure 5:
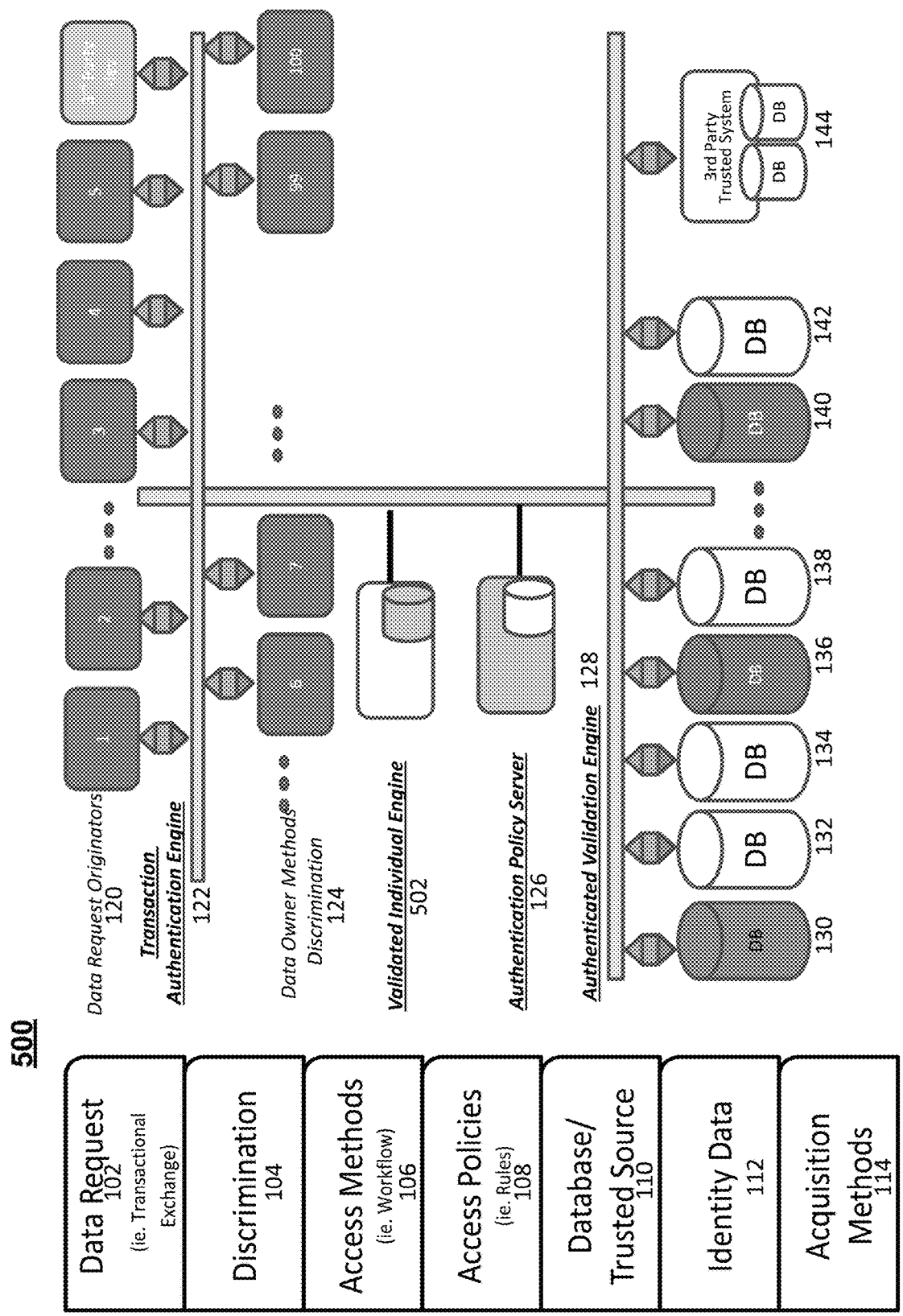
FIG. 5 is a diagram showing another example integrated identity management system according to some implementations.

FIG. 5 is a diagram showing another example integrated identity management system according to some implementations. In the example shown, VIE 502 may be implemented at a level corresponding to the workflow layer 106. As disclosed herein, workflow layer 106 may be interchangeably referred to as the access methods layer 106. VIE 502 may maintain a database including access control data for each user. In some implementations, the access control data may include a list of authorized business partner permitted by an individual user to query identity database(s) to verify the individual user's identity. As disclosed herein, the individual user may operate in the capacity of an average consumer who may request transaction with a provider. The provider may be providing goods, service, land access, etc. The provider may also be known as a participant entity of the integrated identity management system as disclosed herein. The access control data may be updated by the individual user to include newly authorized business partners or remove existing authorized business partners. The list of authorized business partners may operate like a reverse national do-not-call list, as mandated by the Federal Trade Commission (FTC) to curb unscrupulous telemarketing. Here, a participant entity may only verify the identity of a user if the participant entity is on the list of authorized business partners.

Figure 6A:
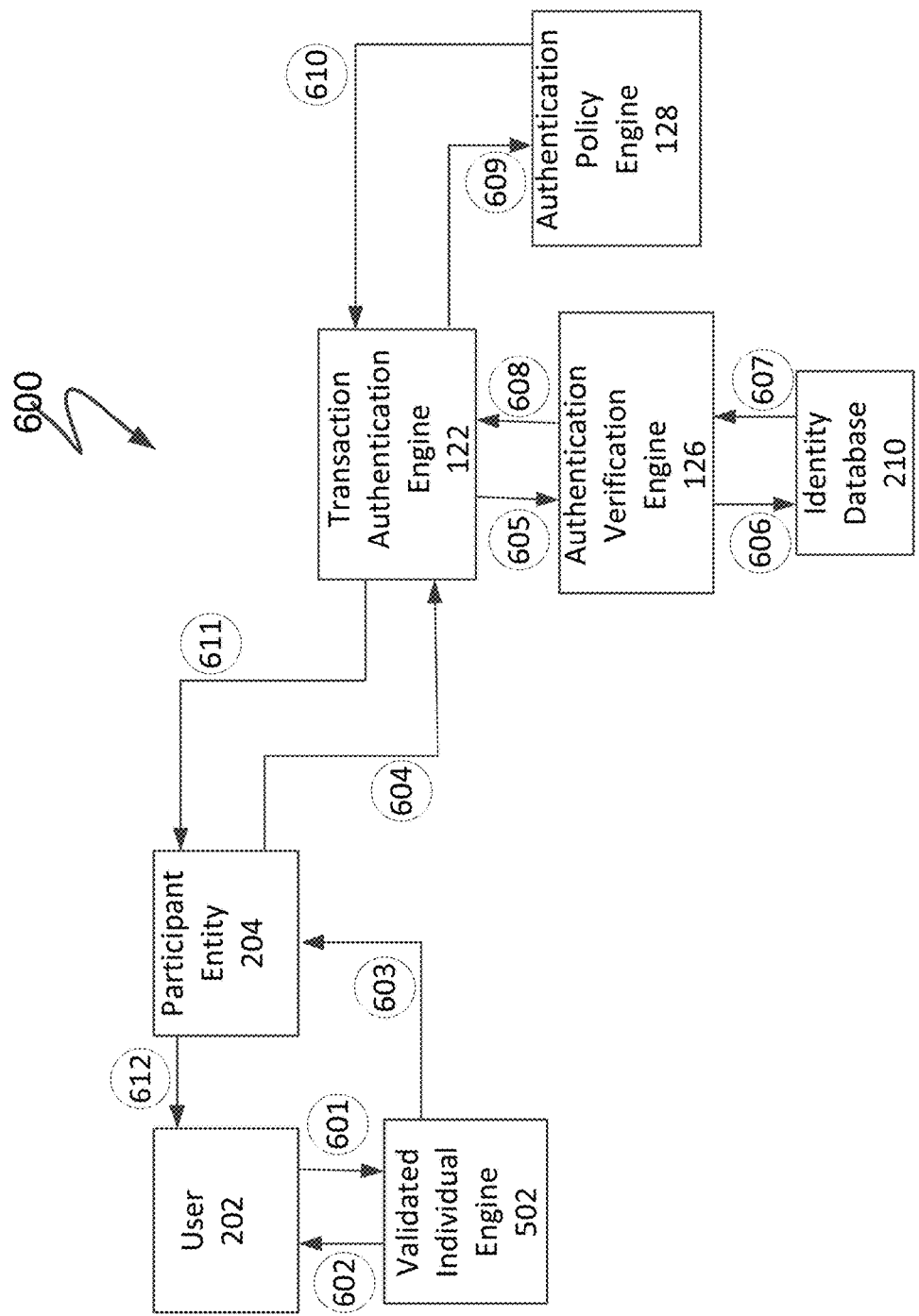
FIGS. 6A and 6B show another example workflow for determining a trustworthiness of a transaction request submitted by a user at a participant entity according to some implementations.

FIG. 6A shows another example workflow for determining a trustworthiness of a transaction request submitted by a user at a participant entity according to some implementations. User 202 may register participant entity 204 at VIE 502 as an authorized business partner of user 202 in the integrated identity management system (601). VIE 502 may provide feedback to user 202 indicating status change (602). In some implementations, VIE 502 may detect an unauthorized participant entity attempting to verify an identity of user 202. VIE 502 may promptly block the attempted verification by, for example, instructing TAE 122 to drop the verification request. VIE 502 may then notify user 202 of the unsuccessful intrusion. In one configuration, the report may be generated on a per incident basis. In another configuration, the report may be generated per time period, for example, weekly, monthly, etc.

Once participant entity 204 has been registered as an authorized business partner of user 202, participant 204 may request the integrated identity management system to validate a transaction request submitted by user 202 at participant entity in a manner consistent with discussions above, for example, in association with FIG. 2A. Work flow illustrated by arrows 604-612 are similar to work flow illustrated by arrows 221 to 229.

The following provides an example workflow of signing a mortgage refinance document to highlight nuances that may be introduced by adding VIE 502 to the integrated identity management system. Initially, a mortgage institution, such as a bank, may send a web-link to an individual consumer. The web-link points to a secure web-site for the consumer (a homeowner) to review the refinance paperwork electronically. In this example, the mortgage institution may operate in the capacity of participant entity 204 with the consumer in the capacity of user 202.

Upon receipt of the web-link, the homeowner may follow the web-link to the secure web-site using credential information based on, for example, the recipient email address. The homeowner may complete the application paperwork and may then prepare to sign. The homeowner may utilize VIE 502 to assist in the signing process. For example, the homeowner may have an account at VIE 502. In logging into the homeowner's VIE account, the home owner may present credential information. VIE 502 may run a local query to verify the presented credential information. If the user authentication is unsuccessful, the home owner's attempt to use VIE 502 may be aborted. If the user authentication is successful, VIE 502 may proceed to provide identity functionalities for the homeowner to sign off the mortgage refinance application. For example, VIE 502 may send the transaction request of the refinance application to the bank.

The refinance application is now waiting for an e-signature of the homeowner. The transaction request may be processed by TAE 122 in communication with the bank. TAE 122 may consult APS 128 to determine, for example, the subscription status of the bank to use the integrated identity management system or to query an authoritative identity database. As discussed herein, APS 128 may administer the systematic right of access for a participant entity, such as the bank, to inquire about the authenticity of user identities through the integrated identity management system. If the bank has adequate subscription status to verify identities of users, then APS 128 may allow TAE 122 to proceed further. TAE 122 may then engage in a dialog with VIE 502. If the transaction request is originated by user 202, for example, if the user submitted the transaction request sua sponte and without directives from participant entity 204, VIE 502 may register the participant entity 204 as an authorized business partner of user 202. In this particular example, the bank initiated the work flow and hence the transaction request, in the form of the refinance application, may not be deemed to be originated by the homeowner. Instead, in this example, the refinance application was solicited by the bank. In a situation in which the transaction request is not originated by user 202 (for example, solicited by participant entity 204 or even faked by participant entity 204 in a spoofing effort), then VIE 502 may check the list of authorized business partners to determine whether participant 204 is authorized to use the integrated identity management system to query an identity information for user 202.

As discussed herein, such access control is on an individual level and specific to each user 202, as compared to a systematic control of access right by APS 128. VIE 502 may return a numerical score indicating the level of authorization possessed by a participant entity with regard to a specific user, or even the level of authorization possessed by the participant entity with regard to a specific transaction request from the specific user. For example, corporations may have a hierarchical structure. After merger and acquisition activities, company A may become a subsidiary of company B. If company A was an authorized business partner of user 202 and company B was not, the power of company A may be carried upward to company B per the merger and acquisition agreements. Conversely, if company B was an authorized business partner of user 202 and company A was not, the power may be carried downward to company A per the merger and acquisition agreements. In cases where merger and acquisition is a result of bankruptcy proceedings, the merger and acquisition agreements may provide more qualified carry-over of the authorization power. A numerical score may quantify the extent of power carry-over in a hierarchical structure that is context specific. In other examples, the numerical score may also indicate the attenuation of the authorized power if user 202 provides negative reviews with regard to services or goods received from an authorized business partner of user 202. If the negative reviews reached a threshold level (for example, the number of negative reviews or the amount negativity posted), the particular authorized business partner may be automatically removed from the list of authorized business partners. Conversely, the reduced power may be cured if user 202 posts positive reviews regarding more recent transactions with the authorized business partner.

Additionally, VIE 502 may provide a user interface to allow user 202 to register a chosen participant entity as an authorized business partner. The user interface may also allow user 202 to remove a current authorized business partner from the list. In a way, the list of authorized users may function as a reverse do-not-call list, as mandated by the FTC to curb unsolicited telemarketing calls.

Notably, however, the user interface as disclosed herein may allow a user to assert more fine-grained access control. For example, the user may authorize finance institutions to verify the user's identity with a prescribed set of identity databases. In other words, the authorized identity database for a finance institution (e.g., an insurance company) may include identity databases administered by a DMV, but may not include identity databases administered by hospitals. Moreover, the user may authorize a particular business partner to access identity data in prescribed format. For example, the user may, by default, authorize the particular business partner to obtain residential address only at the granularity of zip code, or at the granularity of city and state, without the street address or house number. Furthermore, the user may prescribe the type of queries that might be submitted at a particular identity database in order for an authorized business partner to verify the user's identity. For example, the user may limit insurance companies to be query only about identity records at hospitals in the past three years. Similarly, the user may limit insurance companies to receive responses from identity databases administered by a hospital. For example, the received responses may be limited to identity data during the past three years, etc. Hence, the user interface may enable a variety of individualized access control over the manner in which the particular user's identity data may accessed by authorized business partners.

Figure 6B:
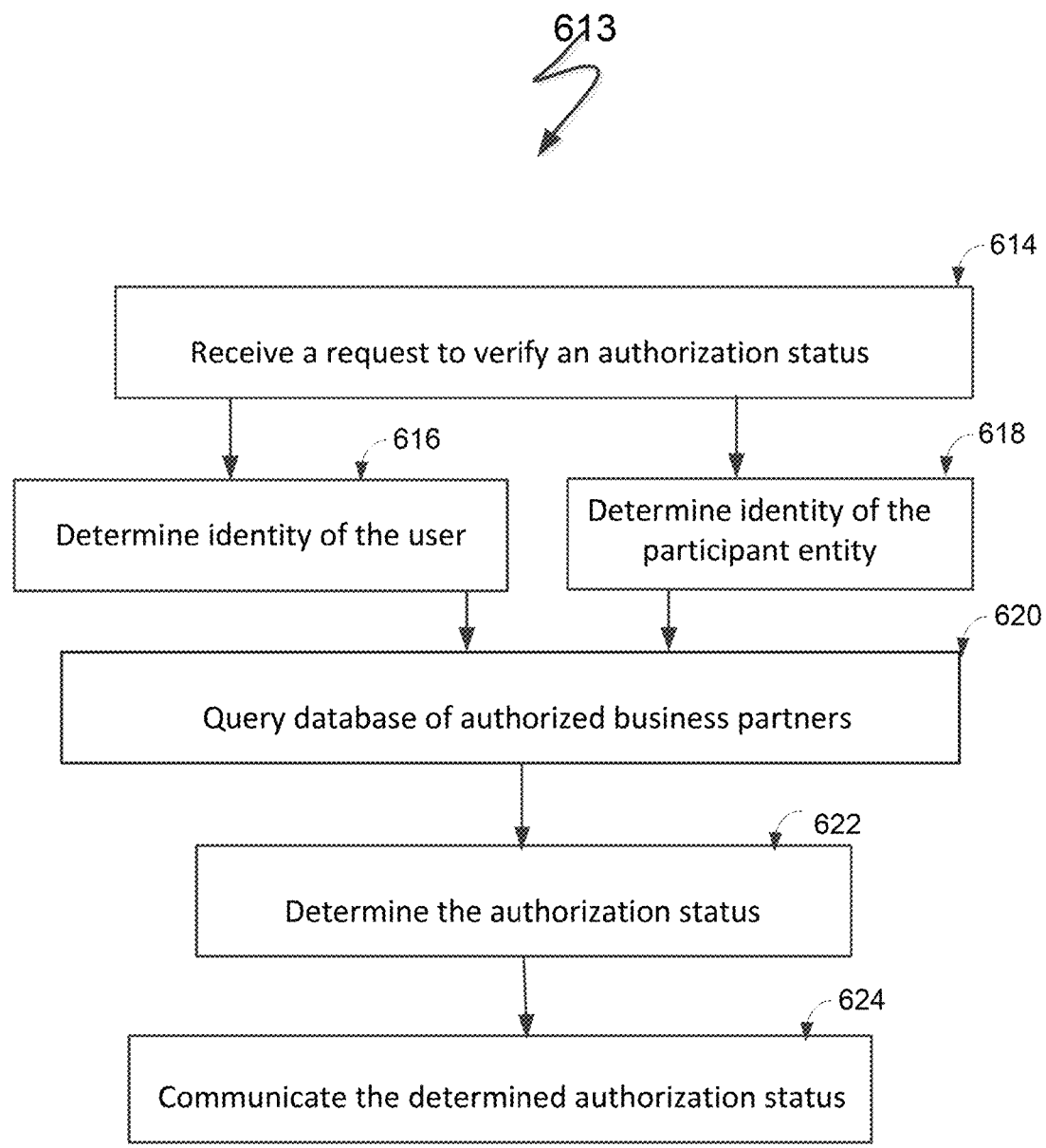

FIG. 6B shows an example flow chart performed by VIE 502 according to some implementations. VIE 502 may receive a request to verify an authorization status in association with a transaction request (614). As disclosed herein, the transaction request may include a variety of activities and may not be limited to financial or monetary transactions only. The transaction request may be submitted by a user attempting to access data managed by a participating entity. The participant entity may employ the integrated identity management system as discussed herein to verify an identity of the user before proceeding with the requested transaction. In the context of verifying the user's identity, the authorization status may be indicative of a power of the participant entity to verify, on the integrated identity management system, the identity of the user.

Based on the request to verify, VIE 502 may determine the identity of the user submitting the transaction request (616). VIE 502 may also determine the identity of the participant entity (618). The identities of the user and the participant entity may be determined in parallel or in serial.

Based on the determined identities of the user and the participant entity, VIE 502 may query a database at VIE 502 (620). As discussed herein, the database administered at VIE 502 may include a list of authorized business partners for the particular user. An authorized business partner is a participant entity that is permitted by the user to query identity data associated with the user. The database may also include more fine-grained access control over the manner in which such identity data may be accessed by a particular authorized business parent.

According to results from the querying, VIE 502 may determine the authorization status (622). As discussed herein, the authorization status may be determined as a numerical score to indicate the relative power possessed by the participant entity to verify the user's identity. The determined authorization status may be communicated (624) to the participant entity, the transaction authentication engine engaged by the participant entity, etc.

In some implementations, VIE 502 may query the database at the verified identity engine to determine whether the participant entity, as an authorized business partner of the user, is authorized to engage in the requested transaction between the user and the participant entity. In response to determining that the participant entity, as an authorized business partner of the user, is authorized to engage in the requested transaction between the user and the participant entity, signaling the participant entity to proceed with the requested transaction. In response to determining that the participant entity, as an authorized business partner of the user, is not authorized to engage in the requested transaction between the user and the participant entity, altering the user and the participant entity that the participant entity is not authorized to engage in the requested transaction.

In some other implementations, if the transaction request was originally submitted by the user to the participant entity and that participant entity is not yet an authorized business partner of the user, VIE 502 may treat the submission as an implied authorization for the participant entity to verify the user's identity. In response, VIE 502 may register, in the database, the participating entity as an authorized business partner of the user. If the transaction request being submitted by the user was solicited by the participant entity, VIE 502 may query the database to determine whether the participant entity is an authorized business partner of the user. If the participant entity is not yet an authorized business partner of the user, VIE 502 may alert the user that the participant entity is not an authorized business partner. In one configuration, VIE 502 may further alert a transaction authentication engine engaged by the participant entity to hold off further processing of the request submitted by the participant entity to verify identity of the user. Similarly, if the participant entity is not yet an authorized business partner of the user, alerting the user that the participant entity is not an authorized business partner; and alerting the entity submitting the request to verify to hold off processing a particular request from the participant entity with regard to the user.

In still some other implementations, VIE 502 may provide a user interface to allow the user to register a specific participating entity as an authorized business partner. The user interface may allow the user to configure one or more types of transactions as permissible transactions between the user and the authorized business partner. The user interface to allow the user to configure one or more types of permissible queries submitted by the authorized business partner and directed at a particular identity database.

In yet other implementations, VIE 502 may gather information capable of identifying the user as well as information on authorized business partners of the user. VIE 502 may then store, in the database at the verified identity engine, the identifying information, and information of authorized business partners. VIE 502 may gather identity information to attest to a purported identity of the user before granting access to the database at the verified identity engine. Additionally, VIE 502 may gather information on permissible queries at a particular identity database by each authorized business partner of the user. Furthermore, VIE 502 may also gather information on permissible data responses from a particular identity database to each authorized business partner of the user.

Figure 7:
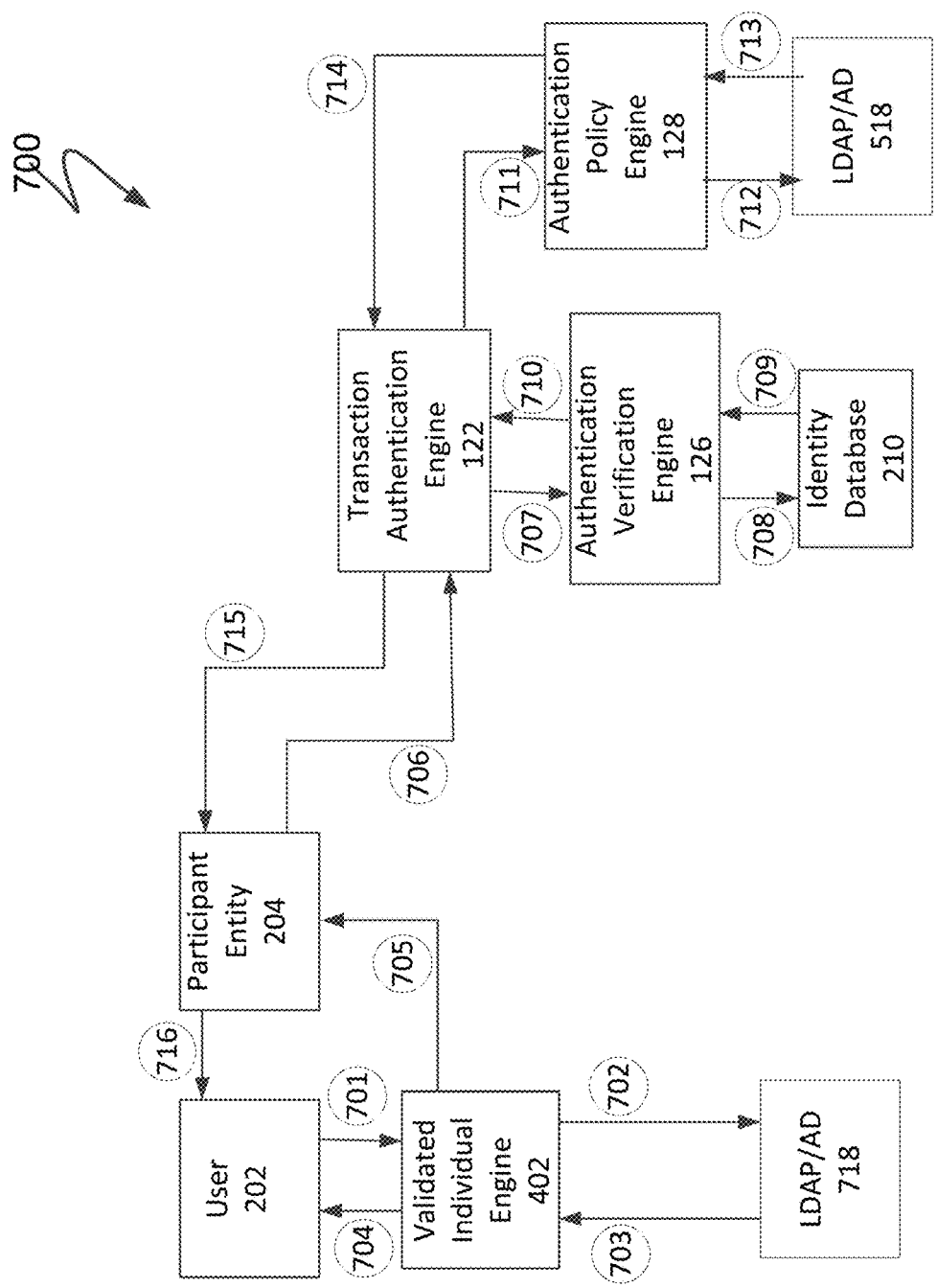
FIG. 7 shows yet another example workflow for determining a trustworthiness of a transaction request submitted by a user at a participant entity according to some implementations.

FIG. 7 shows yet another example workflow for determining a trustworthiness of a transaction request submitted by a user at a participant entity according to some implementations. The improvement may include the envisioned interfaces to directory services to further enrich the type of identity data that may be accessed through the integrated identity management system, as disclosed herein. In some implementations, VIE 502 may query directory service 718 (702). Directory service 718 may then provide the query results back to VIE 702 (703). Likewise, APS 128 may interface with directory service, as illustrated by arrows 711 and 713.

Directory service 718 may include active directory (AD) service. The directory service may be based on, for example, Lightweight Directory Access Protocol (LDAP). The directory service may generally administer and maintain distributed directory information, much like Yellow Pages or White Pages for listing residential address or telephone of each subscriber of the telephone network. The directory service may likewise provide such consumer information as name and address (residential and email). The directory service may similarly provide provider information such as vendor name, type of business, address, web-site, etc. The directory service may also provide links to consumer reviews for a particular vendor opting into the integrated identity management system. In some implementations, the directory service 518 may be maintained and administered by the integrated identity management system to include information of participating consumers and subscribing participant entities. In some other implementations, the directory service may be administered by an organizational entity, for example, an academic institution such as a university, a research institute, a hospital, etc. The organizational entity may opt in the integrated identity management system through the application programming interface at, for example, the authentication policy server (APS 128). Thereafter, the employee or student information may be accessible by VIE 502 or APS 128. Inclusion of the directory service may further improve the amount and quality of the identity data accessible on the envisioned integrated identity system.

Figure 8:
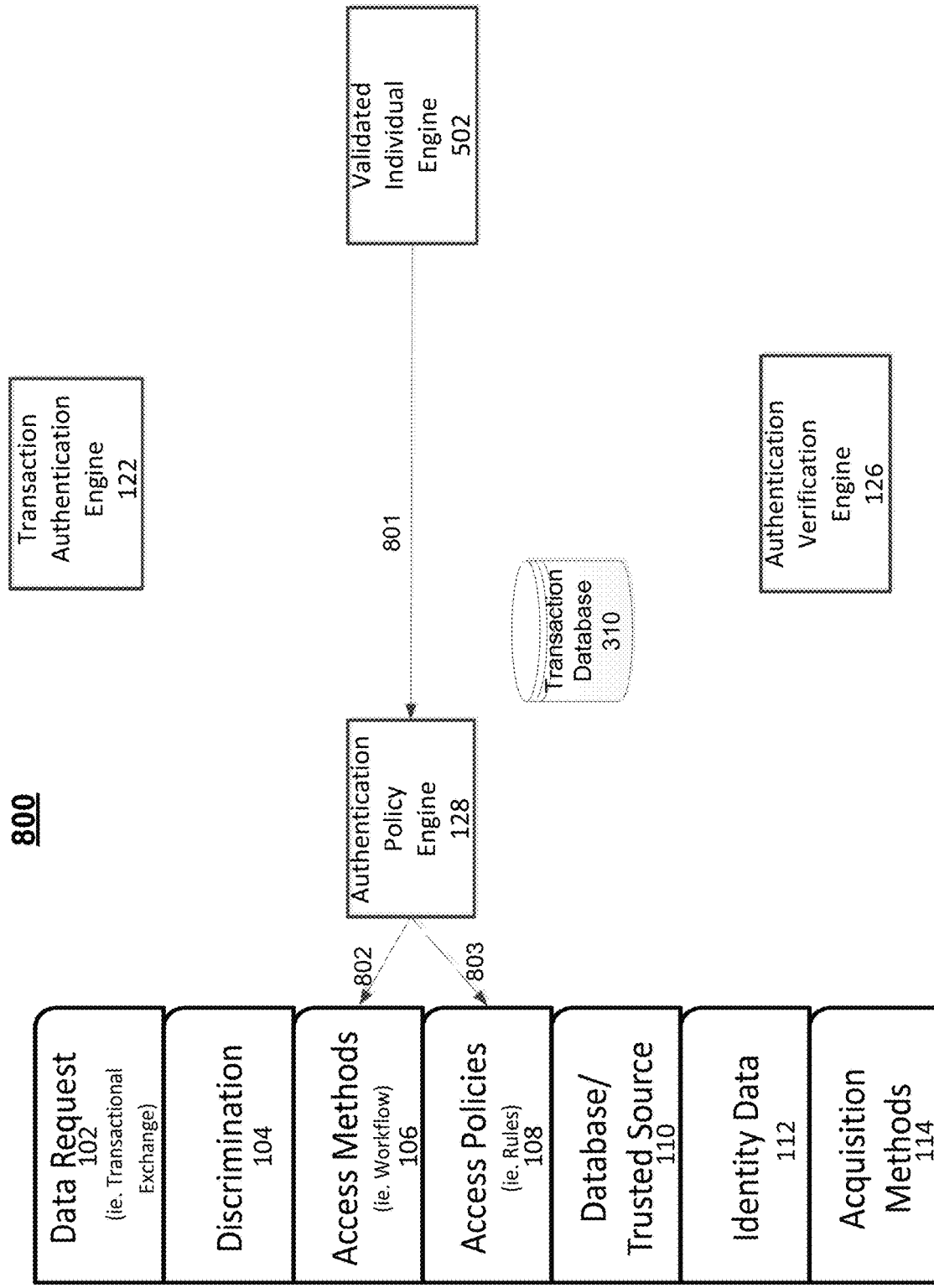
FIG. 8 is a diagram showing yet another example integrated identity management system constructed to perform perishable symbology.

FIG. 8 is a diagram showing yet another example integrated identity management system with perishable symbology capabilities. This example includes an individual mechanism for an individual participant to self-declare his or her identity, and make an assertion to participate, or limit participation in the ecosystem. Additionally, the individual user can limit how third-party data requestors (e.g., relying parties) can make inquiries on the individual's behalf at identity databases within the federated transaction authentication and verification system.

In some implementations, an individual user may self-declare one's identity by utilizing a "biometric core platform". Initially, the individual user may create a digital abstraction to represent an identity of the individual user. In some instances, the digital abstraction may be created to incorporate biometrics of the individual user as well as a series of "personal trust." For example, biometric can be in a digital form, such as an electronic signature, a digital finger print, a digital palm print, a digital iris scan, a digital retina scan, a digital facial portrait, a digital skin texture, a vice print, a gait characteristic, or even a DNA digitally captured. The biometric represents unique personal traits of the individual user, which still uniquely describes this individual. In one instance, the electronic proof of identity may be subject to additional encryption (for example, by the holder's private key) to further prevent tampering. In another instance, a digital biometric may be embedded as digital watermark in a digital portrait of the individual user. In yet another instance, one biometric can be embedded in another biometric to provide enhanced authenticity. For example, a digital finger print may be embedded as a watermark in the digital portrait of the same individual. In some implementations, the digital biometric may be self-captured by the individual. For example, the digital portrait of the user may be taken by the user himself. By way of illustration, after the digital abstraction is created to represent a digital identity of the user, the digital identity may be lost or stolen and the individual may revoke the breached digital identity. The revocation can be immediately effective within the federated eco-system. Hence, lost/stolen electronic proof of identity can be readily recognized during verification.

The individual can then declare himself or herself to the ecosystem using validated individual engine (VIE) 502 to configure access right control to identity databases of the federated ecosystem. In declaring himself, the actual biometrics of the individual user may not be stored in the eco-system. Only a unique representation of an identity "mash up" from the individual may be stored.

As illustrated in FIG. 8, when the individual user presents a digital identity to VIE 502, VIE 502 may engage APS 128 (801) and databases encoding access methods (802) as well as databases encoding access policies (803). As noted above, VIE 502 implements access right control at an individual level, rather than a systematic control (as administered by APS 128). Through a predefined set of negotiations with APS 128 and the appropriate databases, the individual user can implement access rights control so that providing parties may obtain commensurate access rights to identity data of the individual user. Transactional elements that are definable may include, for example: parties with whom the individual has a relationship with; primary and alternative locations where ecosystem access is requested/performed; and transaction characteristics such as defined monetary limits or transaction types that are permitted, by certain relying parties and/or certain providing parties. In some implementations, APS 128 may consolidate the input configurations from VIE 502 and stores the configurations into the corresponding accessible databases. Subsequently, when a relying party initiates a verification request regarding a transaction request, APS 128 will run the verification steps, not only for business to business (B2B) situations, but also for the context of individual interactions, functionally limiting or curtailing the transaction constraints as specified.

In the examples enumerated above, no single point of failure exists. No actual transactional data is preserved or monitored by the components of the eco-system, except the transaction characteristics and constraints. Actual data may only be passed between relying and providing parties. Thus, vulnerability to replay attacks may be greatly reduced and forensic reconstruction enabled by virtue of the unique transactional characteristics and constraints.

Some implementations may provide methods to characterize a disposition of individual identity based on physical credentials and biometric data. In these implementations, a portable computing device may be used. Some implementations may be employed to vet an individual identity, and can enable that identity for enrollment and use in a data transaction where individual identity matters. Such enrollment and use may promote corporate adoption and industry growth.

For context, the biometrics market is estimated to grow from $4.2 billion in 2010 to $11.2 billion in 2015, at an estimated CAGR of 21.6%. The growth of the biometrics market is mainly due to increasing concerns of the countries in terms of strengthening national security. Amongst all the biometrics modalities, automated fingerprint Identification System (AFIS) market was estimated to generate the highest revenue of $1.4 billion in 2010 and is expected to reach $3.3 billion in 2015, a CAGR of 19%. Adoption of AFIS in national IDs and civil identification is the prime reason behind the growth of AFIS market. However, the IRIS vein and face market is expected to grow with at a CAGR of 19.9% from $1.4 B to $3.5 B.

Despite the announcement of a biometric data standard by National Institute Standard & Technology, adoption of biometrics data remain limited. This may be attributed a myriad of legacy technical standards proliferated from the many established biometric device companies and the lack of local computing power. Compounding the chaos, a sea of new software-based biometric algorithm and analysis companies also attempted to seize this market opportunity. As a result, the adoption of biometric data is low and many implementations around identity management may be limited to physical credentials—most typically a physical, government-issued ID travel papers, or a key or security token.

Some implementations may incorporate advances in biometric data capture as well as algorithm computation and storage of the data with purpose-designed hardware. Such storage may be optimized for a specific class of biometric data, and may require interpretation and authentication approval performed in conjunction with server computers to run the analysis algorithms. In some instances, access to such systems can be limited, and typically done as a forensic or audit event after criminal or fraudulent activity has been performed. Such methods can impair the broad adoption by limiting each stage of the process to dedicated hardware or custom software, which is very expensive to manufacture, procure and complicated to use.

Some implementations may enable a more secure manner to vet personal identity to a secure portable computing devices (including but not limited to laptop and portable computers, smartphones, tablets, wireless medical or health and wellness devices, GPS, or pedometer and wearable computing accessories, such as electronically-enhanced glasses, wristwatches and helmets. Some implementations may enable secure data transactions into a trusted transaction ecosystem, by enhancing identity verification through incorporating the possession of a physical credential with multi-modal biometric authentication on a portable computing device. Some implementations may create a standards-neutral "platform" to simplify the capture, enrollment, comparison and interpretation of biometric data by resorting to a general-purpose consumer device. Some implementations can broaden adoption for biometrically-enabled transactions by using readily available, commercial hardware device. Some implementations may provide the software and methods to extend the utility of different types of biometric data, within the context of the general purpose portable computing device. Some implementations may create opportunities for integrating other biometric and personal identity-related data methods into the platform, as dictated by a consumer user.

Figure 9A:
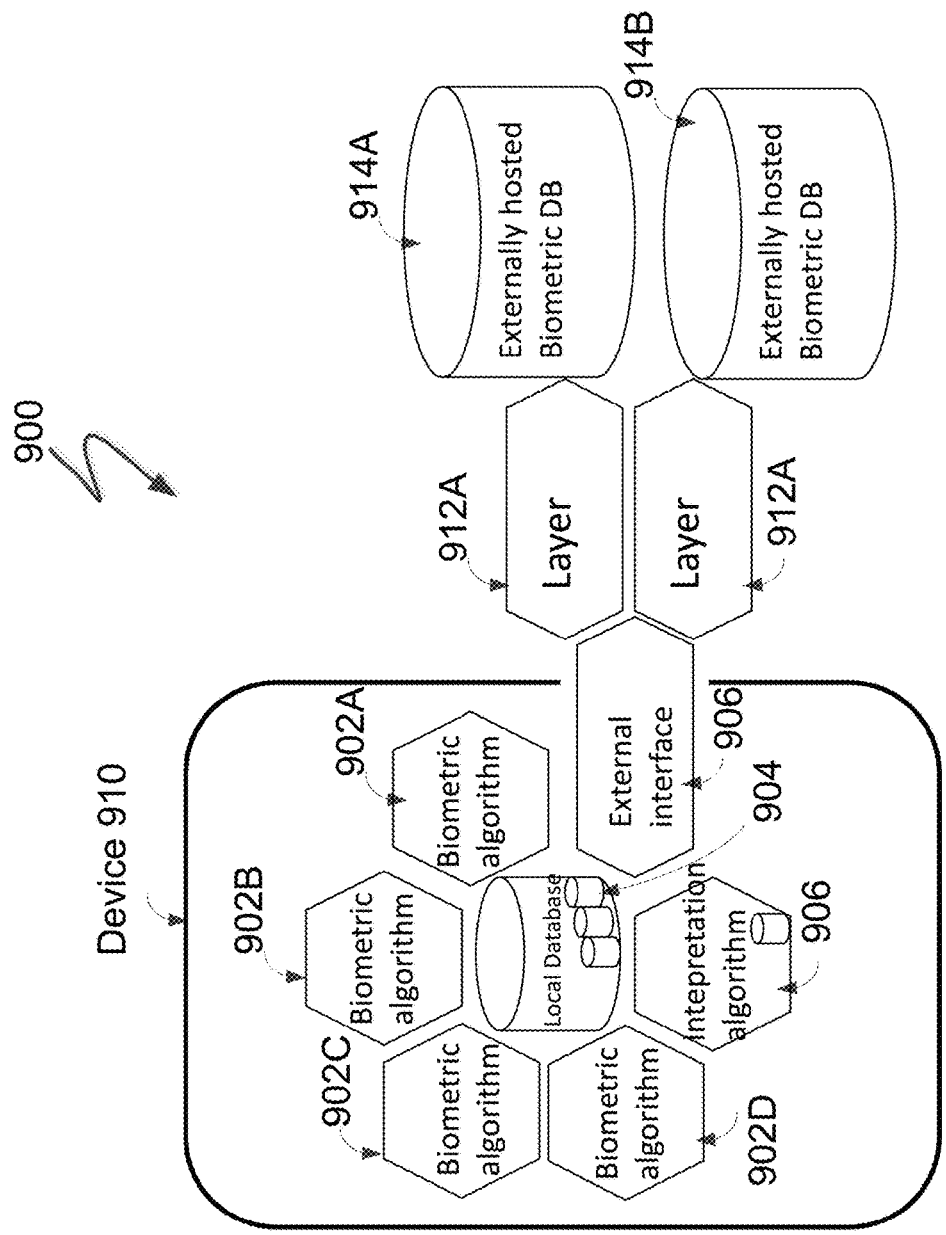
FIG. 9A is a diagram illustrating examples of a biometric core platform according to some implementations.

Referring to FIG. 9A, the Biometric Core Platform (BCP) 900 may facilitate create a secure, unique electronic identity that combines a physical or machine-readable identity credential with the parallel capture, processing, storage and disposition of multiple types of biometric data. This multimodal biometric capability, for example, when applied along with a physical identity credential, can allow the user to more confidently assert their unique identity when performing an electronic transaction. In some implementations, the "enhanced identity profile" may be enabled by using algorithmic methods to combine specific biometric data with the electronic representation and validation of a physical credential. Events or data transactions which may require increased security could require multiple challenge/response iterations, or additional individuals' biometric data, such as in the case of monetary transactions or identity inclusion into a trusted transaction ecosystem. The BCP would execute and disposition this challenge/response cycle, and contain the individual's biometric profiles—including but not limited to: facial map, fingerprint, skin texture, iris, body scent, movement gait, dental topology, etc.

Some implementations may additionally include configurable computational engine 910 to perform multiple functions pertaining to the capture, storage, caching, and disposition of biometric data. Engine 910 may provide a multi-processor system with multiple processing threads capability. In some instances, the data management process can be parallelized to enable parallel comparisons and threshold mappings. Engine 910 may include, for example, a consumer mobile device, a portable device, or a desktop device.

Some implementations may provide a threaded computational engine configured to digitize and capture the demographic information of a physical identity credential or document. The computation engine may process the receipt of identity credentials and biometric enrollment data from third party stores and providers. Examples of identity providers may include, for example, an IdentiGO center. In some instances, the computation engine may encrypt and store the physical demographics information for use in subsequent data transaction events. The computation engine may further create and proliferate the "enhanced identity profile" and exchanges the profile with other services to which the individual has an active subscription.

Some implementations may provide a multi-tenancy environment where comparisons and computations can be performed upon data stored in multiple identity databases, the computational engine will prioritize and queue the requests, cache the interim results, and present results of the disposition. The identity databases may include local identity database 904, which may be located on device 910. Some implementations may provide configurable mobile databases as an aggregation point for the biometric data captured locally. In some cases, the mobile database may include raw data from the biometric data capture. The mobile database can also store a results hash, which obfuscates the quality and physical accuracy of the raw data. In this manner, loss of the commercial device, for example engine 910, may not lead to a loss of electronic identity. Some implementations may provide multiple mobile databases to provide response to type-specific data requests, or enable query load balancing among the multiple databases. In some cases, multi-tenant databases may be accessed. In these cases, the local database will retain location and access methods, in order to process the raw data or computational request. Some implementations may incorporate a commercially-available consumer device, with or without direct integration of biometric capture devices.

The identity databases may also include externally hosted biometric databases 914A and 914B. Externally hosted databases 914A and 914B may include, for example, a Lexis-Nexis identity database, an Equifax identity database, or an authoritative DMV database. As illustrated in FIG. 9A, engine 910 tap into not only local database 904 but also externally hosted biometric databases 914A and 914B. Some implementations may provide a variety of biometric algorithms 902A to 902D. Each biometric algorithm may correspond to a particular biometric identity modality, for example, facial recognition, finger print, palm-print, or iris-scan. In some implementations, a biometric algorithm may include a biometric template for matching purposes. The biometric template may be specific and unique to each subject, much like a password or a PIN. Some implementations may include interpretation algorithm 906 to blend verification results from querying multiple identity databases. Particularly, implementation algorithm 906 may include calculation of trustworthiness based on disposition results from more than one identity databases. For example, an interpretation algorithm 906 may engage a facial recognition biometric algorithm with an assurance of 80% or better, while another may engage the facial recognition biometric algorithm with a finger print recognition biometric algorithm.

Some implementations may provide a communication layer. As illustrated in FIG. 9A, engine 910 may include an external interface 908 coupling engine 910, via layers 912A and 912B, to the example externally hosted biometric databases 914A and 914B. Layers 912A and 912B may include virtual or physical communication links customized for the transportation of identity-related data. For example, such links may be customized to transfer only a hash of data requests versus the actual data. In some implementations, the BCP system can pass a unique representation, such as a hash of biometric data, in lieu of the actual physical biometric data. Under this approach, engine 910 may query externally hosted databases 914A and 914B to obtain a hashed biometric template to be transferred over layers 912A or 912B. Engine 910 may also transmit a hashed version of a captured biometric over layers 912A or 912B to externally hosted databases 914A or 914B. This approach can protect the trusted biometric data and individual identity by never revealing the actual biometric data, or computational methods for verifying biometric data over layers 912A and 912B. This approach may provide immunity to replay attacks if the hash is incorporated into a transactional characteristic being transferred over layers 912A and 912B.

Some implementations may enable use of transactional data within a closed network, when embodied as a discrete instance. Other implementations may be established within a virtual private network (VPN) or may have an application programming interface (API) and sufficient system access to facilitate the system connections to asset(s) within the VPN. These implementations may additionally include the use of transactional data across general purpose IP networks such as cellular, WiFi, or wired access to the internet. In these implementations, communication and identity presentation can be through cloud environments, or through hybrid server environments. These implementations may also incorporate single or multi-tenancy algorithmic and computational services as well as data management at various steps of physical data capture, data storage, computational query and identity disposition.

Figure 9B:
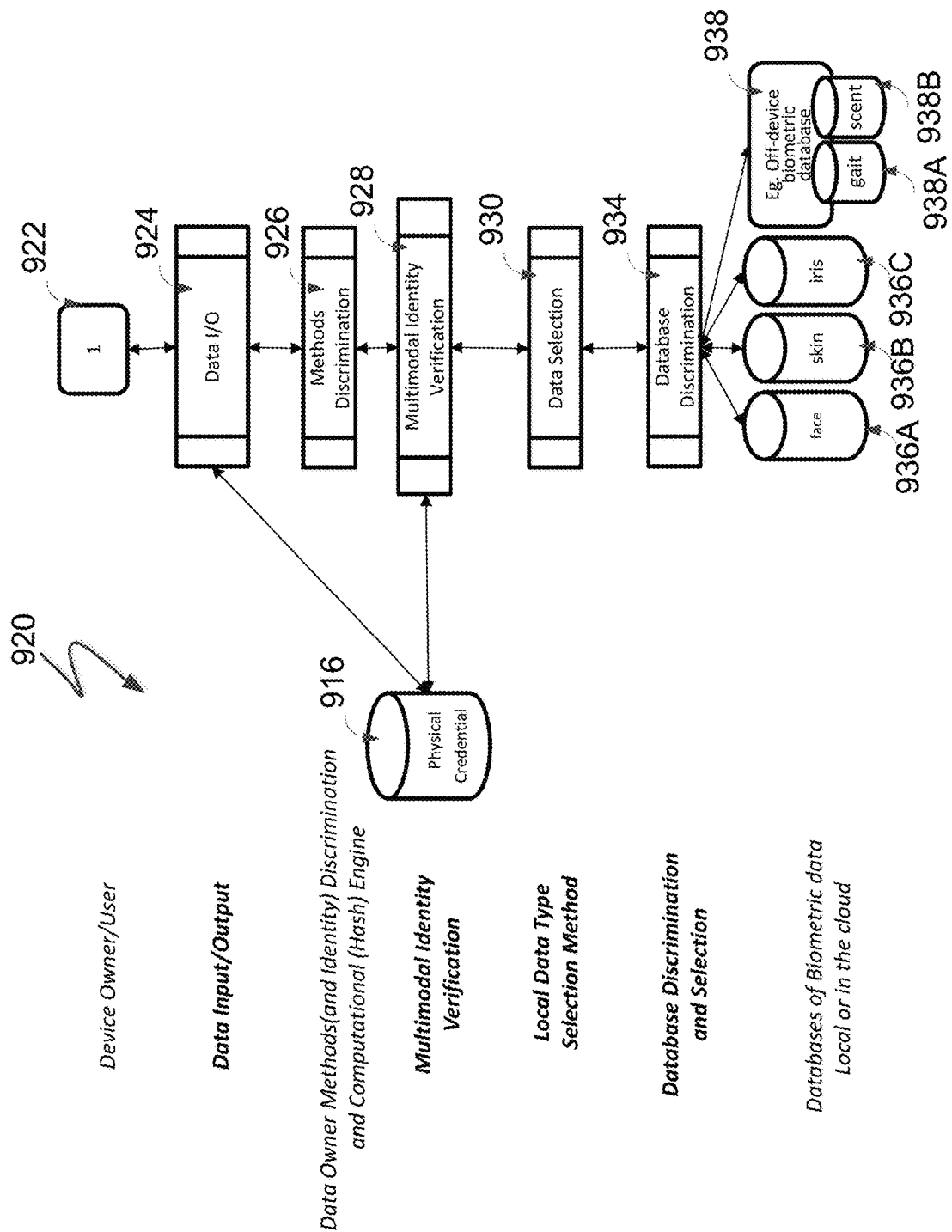
FIG. 9B is a diagram illustrating example methods of system interoperability and compatibility according to some implementations.

FIG. 9B illustrates an example hierarchical data flow in an identity data transaction system 920. User/device 922 may present a consumer device such as a smart phone, a tablet, a laptop, a kiosk, or a desktop device. Data I/O 924 may represent a user interface (e.g., user interface 908). Data I/O 924 may read data from physical credential 916. The data may be obtained by, for example, scanning a machine readable code of a physical identification document, decoding payload information from the watermark on the physical identification document, reading information by optical character recognition, scanning biometric information (such as a facial portrait) from the physical identification document. In some implementations, the physical credential may be presented in the form of a digital identification on the touch screen of a user device.

Data I/O 924 may further engage a communication channel (e.g., communication layers 912A and 912B). In some implementations, a user selection may be made via data I/O 924 with regard to methods discrimination 926. For example, a user may choose a computation method, or a threshold level for verifying an identity (digital, physical, or combined). Methods discrimination may apply to multi-modal identity verification 928. For example, the identity verification may include multiple modalities including various biometrics (such as facial recognition, finger print, palm print, etc.) as well as physical identification documents. A particular modality may have a corresponding verification template algorithm or an associated threshold level for determining a successful match. As illustrated, the multi-modal identification verification 928 may include determination contributions based on a physical credential 916.

Multimodal identity verification 928 may engage data selection 930 to choose from the available database discrimination 934. As illustrated, the available identity databases may include a variety digital biometric databases, including facial portrait database 936A, skin texture database 936B, iris pattern database 936C, as well as off-device biometric databases 938 (such as gait pattern database 938A and scent pattern database 938B). Here, the biometric data can be captured by user device 922.

Figure 9C:
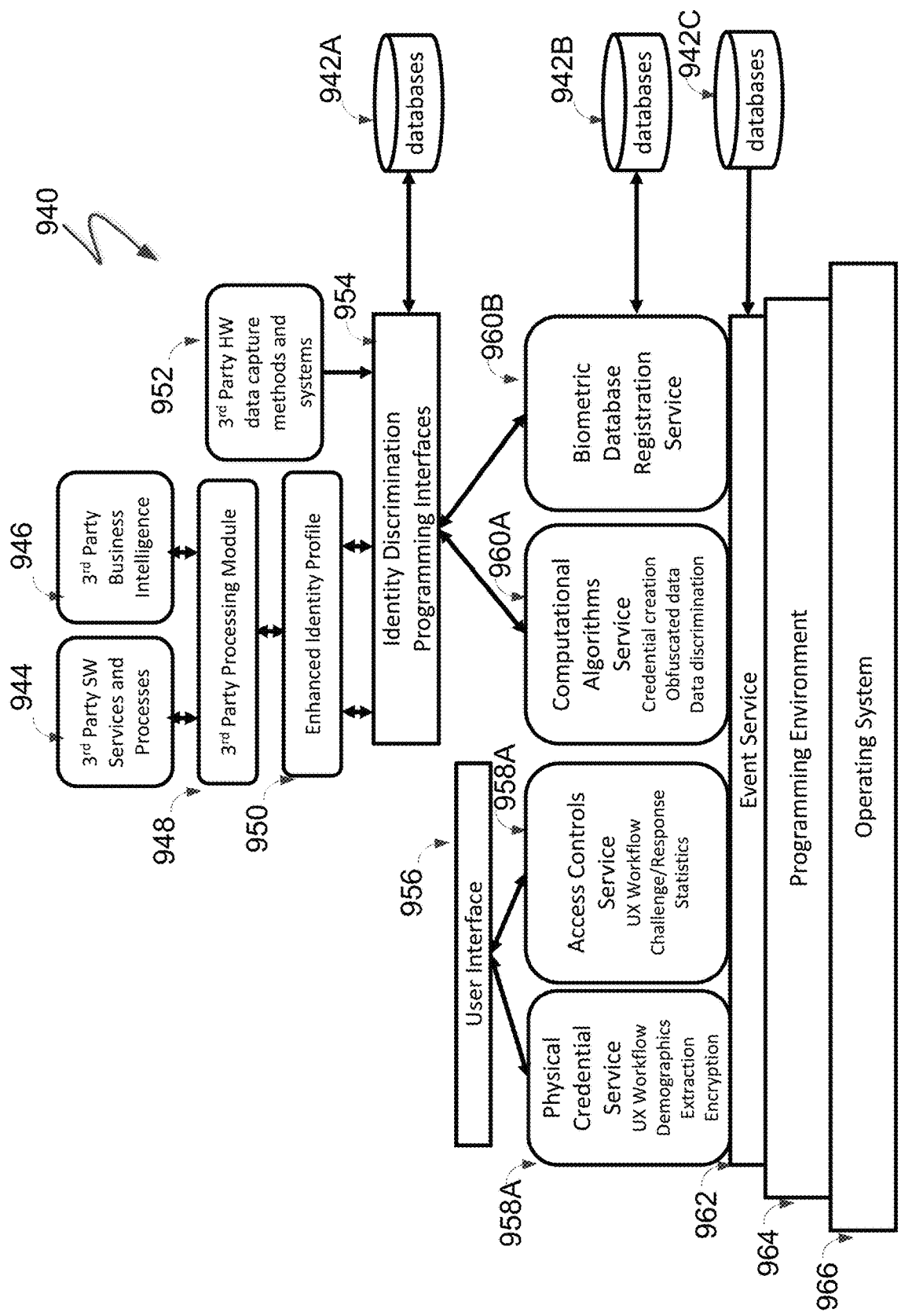
FIG. 9C is a diagram illustrating interface architecture according to some implementations.

FIG. 9C illustrates another example hierarchical data flow in an identity data transaction system 940 that leverages identity databases 942A, 942B, and 942C at various levels. System 940 includes a user interface 956 to process and analyze identity data provided by system 940. System 940 also includes an identity discrimination programming interface to blend in identity data from third parties.

User interface 956 may engage physical credential service 958A. An example physical credential service may include work flow to obtain demographic information from a physical identification document, such as a driver's license, a passport, a student ID, a member ID, or an employee ID. The work flow through user interface 956 may include a user experience aspect, as annotated as UX. The work flow may include extraction methodologies to extract demographic information of the holder of the physical credential from a presented physical credential. The extraction methodologies can read encrypted information from the presented physical credential. In some cases, such encrypted information may be embedded in digital watermarks on the physical credential. In some cases, such encrypted information may be located in a machine-readable zone of the physical credential.

User interface 956 may interact with access controls service 958B. An example access control service 958B may refer to workflow that includes presenting challenges to an end user whose identity is being verified, and receiving responses from the end user. Access may be conditioned on matches (or substantial matches). Statistics of number of matches, number of trials, and complexity of challenges/responses may be recorded and analyzed.

Third party processing module 948 may utilize third party software and/or services 944 and third party business intelligence 946. Third party software and/or services 944 may include software services and processes from a third-party neutral with regard to a particular transaction being conducted between a consumer user and an underlying identity data transaction system, such as identity data eco-system 940. Third-party business intelligence 946 may include statistics, rules, or analytics of the third party neutral. The third-party business intelligence 946 may be analyzed by third party software and/or services 944 to generate enhanced identity profile 950. An example enhanced identity profile 950 may incorporate the identity data from the related third-party neutral according to the applicable software services and processes as well as the corresponding business intelligence.

As illustrated, an identity discrimination programming interface 954 may leverage identity data from database 942A. In analyzing such identity data, identity discrimination programming interface 954 may utilize third-party hardware data capture methods and systems to supplement additional identity data from third parties. In some instances, an enhanced identity profile 950 may additionally provide algorithms and threshold levels for querying databases 942A.

Identity discrimination programming interface 954 leverage computational algorithms service 960A and biometric database registration service 960B. Computational algorithms service 960A may provide credential creation (such as the generation of digital biometric information), the obfuscated data (e.g., providing hashes of digital biometric data for transportation over a communication layer), database discrimination (e.g., selection of database(s) for a particular application). Biometric database registration service 960B may interface with database 942B so that identity data transaction system 940 may leverage identity data on database 942B.

The above described components may be implemented as software layers residing on event service layer 962. The event service layer 962 may generate software events corresponding to prescribed conditions (such as assurance determination reaching a threshold level) or detected real-world events (such as leveraging identity data from a third party). The event layer 962 is provided over programming environment 964 provided for a particular underlying operating system 968.

The transaction authentication engine according to some implementations may electronically enable data exchanges among multiple interested parties. Such data exchanges may allow each party to vet the identity of the other parties in a manner that is secure so that the vetted identities may be "trusted." These data exchanges may include for example, commercial transactions as well as non-financial communications (such as healthcare records).

In 2012, 12.6M individuals were victims of identity theft—mainly from data breaches of sensitive account information (social security, bank accounts, etc.), attributing to approximately 5.3M man-days spent to rectify the breach. Financial fraud accounted for $21 B in losses throughout the financial services industries, and $41.3 B in losses in healthcare due to medical identity theft.

This issue plagues, for example, financial institutions. Some may create their own proprietary, in-house networks and databases and business rules schemas to handle their particular requirements, and create financial reserves to account for instances of fraud that may slip through. Such measures may protect the institution, but ignore the individual end user who may be denied access or suffer from identity theft. As each institution has its own requirements on quality of identity data, the institution is unable to share the identity verification information with other interested parties in a programmatic manner. Relying on human intervention general becomes less feasible or economical when the volume of identity data increases.

Some implementations may support the creation of a trusted identity ecosystem. In these implementations, software, systems and methods may be provided to extend institutional data requirements and trust-levels to support programmatic automation and trust-level standardization within the identity ecosystem. Some implementations may handle growing identity-related problems in the commercial markets by improving the technological quality and commercial viability of trusted identities while simplifying the process of individual-initiated and bulk-automation steps towards mitigating crime and fraud related to identities. Some implementations may be integrated into the ecosystem of identity data transaction. In some cases, identity-related security technologies such as: Smart Card/Token based security systems, public/private software key combinations, and thick client biometric software and hardware peripherals, may be integrated.

The Transaction Authentication Engine (TAE) may provide a set of database rules and computational algorithms prescribing the electronic means and workflow rules by which the participating entity is permitted to interact with the trusted transaction ecosystem and its "agents of functionality." Additionally, the TAE may define a set of intermediary algorithms necessary to compute the "minimum level of trustworthiness" acceptable to the participating entity in the ecosystem. For instance, the TAE may include sessions from data requestors from within a common participant subscription (e.g., a company with a centralized policy management hierarchy, but with distributed decision-making and identity verification needs for a multitude of purposes). Each instance of a requesting event can dictate the software application, security environment, communications protocol, originating domain name server (DNS) and subnet, infrastructure such as transmission control protocol/internet protocol (TCP/IP), one or more security protocols such as secure sockets layer (SSL) or a virtual private network (VPN) or public key infrastructure (PKI), a centralized permissions/subscription enforcement engine, one or more centralized business rules expected for the transaction, a minimum computed threshold of trustworthiness, a single or a plurality of participating trusted identity Databases, a custom system configuration instance for each database, system administration functionality, and any required hardware or devices required to perform these actions.

In an example implementation, commercial businesses, such as a bank, may desire to verify the identity of an individual for a trusted transaction. Here, the data requestor uses their configured application to initiate a data query transaction at the bank. The application configures the query based on specifications such as configurations for dataset, methods, expected response type, and security tokens. By using secured communications, the system may verify the subscription of the data requestor, process the request against business rules, and send the query to the trusted identity database. The trusted identity database in turn is configured to accept and reply to data query transactions based on a custom configuration. The data query transactions may include, for example, verifying that the data requestor is not on a black list, the data requester has submitted a compliant query, and that the request is in a proper format. Once validated as a compliant transaction, the query is performed and the database response is formatted for reply and sent back through the system, and to the data requestor.

Features of the TAE subsystem may include a scalable configuration engine. The configuration engine may function as a "local" compliance engine—initiate data requests upon the trusted transaction ecosystem (TTE), per their subscription status. The TTE may also be referred to as the identity data transaction system, or the identity data ecosystem. The configuration engine may provide mapping-defined "connectors" in a multi-tenancy environment, combining local rules and requirements with the gaps of knowledge in order to determine programmatically which pieces of information are missing, and which sources of data to query. The configuration engine may present (e.g., in a multi-tenancy environment) the defining protocols, security, and data parameters for the bidirectional data transaction to take place, to determine whether the authenticity of the transaction is trustworthy. As deployed in a multi-tenancy, multi-instance solution, the configuration engine may decentralize the business rules and data transaction elements of the data requesting entity of the ecosystem. This decentralization may reduce the impact of negative events such as outages, while spreading the computational and data burden across other TAEs deployed by the corporate request originator. The configuration engine may also provide an access "gate" by leveraging biometric (or biometrically fused data, alone), or in combination with real-time data-hashing algorithms to ensure the data request is authentic (and not hacked or spoofed).

In some implementations, the TAE can be deployed on a single server instance or across a federation of server instances. This engine then passes a "hash" of the request, the communication codes, and the target of requesting data providers. These elements may be archived for reconciliation and may provide a method for audit as well as reconciliation of requests and their status. This approach can protect the participating data requestor/subscriber by providing a discrete hierarchy of authentication within their business to ensure that the data request is authentic, and the requesting party is authorized to do so. Data being handled may conform to the related data handling and security policies, and the actual data may not be exposed. By scaling the TAE deployments throughout their organizational points-of-presence, the participating data requestor may also provide for redundancy to protect business operations against functional outages.

The TAE may be configured and deployed for a variety of network settings, including virtual private networks, closed networks, cloud environments, or hybrid server environments. The TAE may be single or multi-tenancy at both the data request originator level and the databases of identity level. A participating entity for the identity data transaction system may choose to configure (or customer/data owner may configure) the connectors and profiles on the configuration engines. Databases/engines and additional systems may be hosted in disparate, networked or single server environments. Computational logic may take place in a decentralized manner consistent with the implementation described envisioned in these embodiments.

Figure 10A:
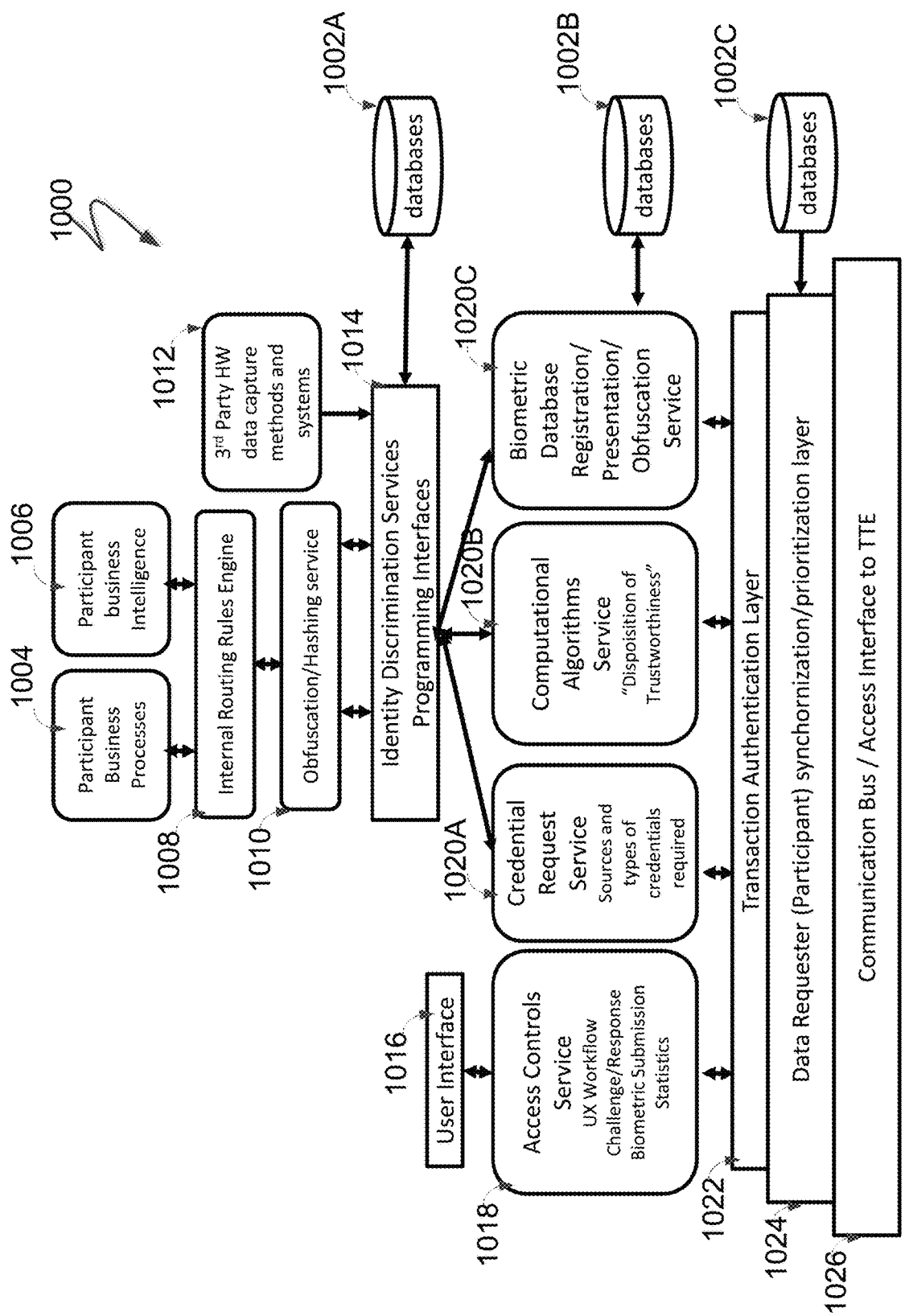
FIG. 10A is a diagram illustrating an example interface stack for a transaction authentication engine according to some implementations.

FIG. 10A illustrates another example hierarchical data flow in an identity data transaction system 1000 that leverages identity databases 1002A, 1002B, and 1002C at various levels. System 1000 includes a user interface 1016 to process and analyze identity data provided by system 1000. System 1000 also includes an identity discrimination programming interface to blend in identity data from third parties.

User interface 1006 may interact with access controls service 1018. An example access control service 1018 may refer to workflow that includes presenting challenges to an end user whose identity is being verified, and receiving responses from the end user. The work flow through user interface 1016 may include a user experience aspect, as annotated as UX. Access may be conditioned on matches (or substantial matches). In some implementations, statistics of number of matches, number of trials, complexity of challenges/responses may be recorded and retrospectively analyzed.

Internal routing rules engine 1008 may utilize participant business processes 1004 and participant business intelligence 1006. Rules engine 1008 may apply verification rules to identity data. Participant business processes 1004 may include software services and processes for identity verification for the participant business. Participant business intelligence 1006 may include statistics, rules, or analytics of the participating business. Participant business intelligence 1006 may be analyzed by participant software services and processes 1004, the result of which may be further processed by obfuscation/hashing service 1010. An example obfuscation and hashing may provide a one-way encryption not reversible by virtue of applying encryption or decryption key(s).

As illustrated, an identity discrimination programming interface 1014 may leverage identity data from database 1002A. In analyzing such identity data, identity discrimination programming interface 1004 may utilize third-party hardware data capture methods and systems to supplement additional identity data from third parties. In some instances, an enhanced identity profile 1010 may additionally provide algorithms and threshold levels for querying databases 1002A.

Identity discrimination programming interface 1014 may leverage credential request service 1020A, computational algorithms service 1020B, and biometric database registration service 1020C. Credential request service 1020A may provide sources and types of credentials required. Computational algorithms service 1020B may provide disposition of trustworthiness. Biometric database registration/presentation/obfuscation service 1020C may interface with database 1002B so that identity data transaction system 1000 may leverage identity data on database 1002B. The service may include registration of a digital identity stored on database 1002B, presentation of a digital identity, and obfuscation of a digital identity to generate, for example, an abstraction such as a hash of the digital identity for transportation over a communication layer.

The above described components may be implemented as software layers residing on transaction authentication layer 1022. The transaction authentication layer 1022 may generate software events corresponding to prescribed conditions (such as assurance determination reaching a threshold level) or detected real-world events (such as leveraging identity data arriving from a third party). The transaction authentication layer 1022 may be provided over data requester synchronization/prioritization layer, which in turn may be provided over a communication bus/access interface (1026) to trusted transaction engine (TTE).

Figure 10B:
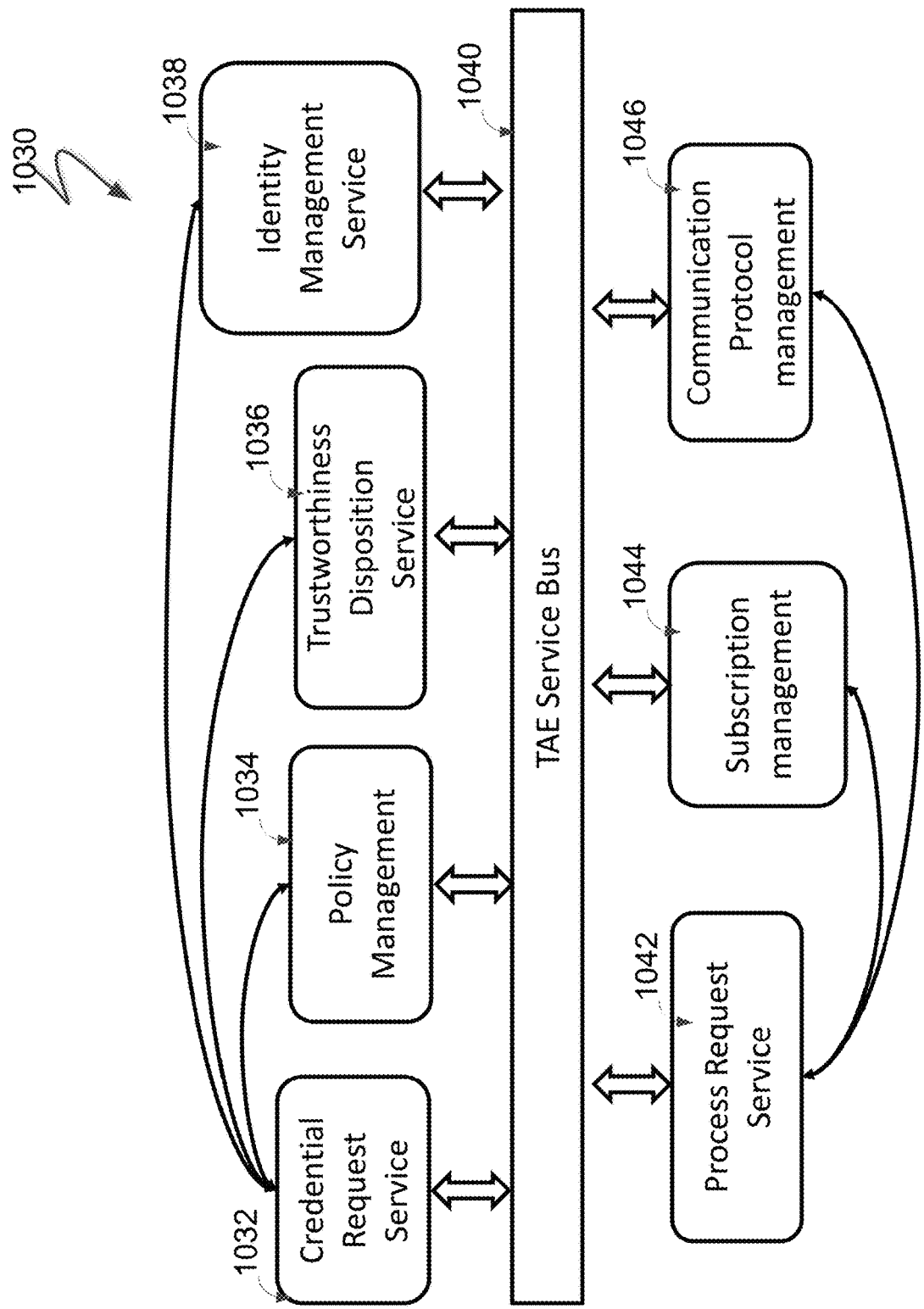
FIG. 10B is a diagram illustrating an example architecture for a transaction authentication engine according to some implementations.

FIG. 10B shows diagram 1030 illustrating the various service components of an example TAE. The various service components may interface with each other over the TAE service layer 1040. The service components may include credential request service 1032, policy management 1034, trustworthiness disposition service 1036, identity management service 1038, process request service 1042, subscription management 1044, as well as communication protocol management 1046. Credential request service 1032 may include setting the usage policy of the identity at policy management 1034, the matching criteria at trustworthiness disposition 1036, as well as managing the identity claimed by the credential request at identity management service 1038.

Meanwhile, a process request service 1042 may allow transaction requests to be queued and prioritized. The process request service 1042 may interact with subscription management 1033 as well as communication protocol management 1046.

The Authenticated Validation Engine (AVE) may include computational algorithms prescribing the electronic means and workflow rules by which the participating entity (the identity provider) is permitted to interact with the trusted transaction ecosystem and its agents of functionality. Additionally, the AVE may define and deliver a set of intermediary algorithms and results necessary to compute the "minimum level of trustworthiness" and may ensure the rules for completing the data request are completed within policy compliance among contributors within the participating entity and between the parties engaged in a transaction event in the identity data transaction ecosystem, and with the ecosystem itself.

In an example implementation, the AVE may include a combination of a single or a plurality of sessions from data providers from within their common participant subnetwork (e.g., a company or jurisdiction with a centralized policy management hierarchy, but with distributed identity data elements, a subset of which is being requested by another party in the trusted transaction ecosystem).

Upon each request instance, local policy may dictate that elements related to identity, trust, authentication, and security are being adhered to. Examples of attributes may include, for example, the software application, security environment, communications protocol, originating domain name server (DNS) and subnet, infrastructure such as transmission control protocol/internet protocol (TCP/IP), one or more security protocols such as secure sockets layer (SSL) or a virtual private network (VPN) or public key infrastructure (PKI). Additionally, the AVE would query a centralized permissions/subscription enforcement engine, one or more centralized business rules expected for the transaction, a single or a plurality of participating trusted identity databases, to extract and incrementally compute n input value for the minimum threshold of trustworthiness.

In an example implementation, commercial businesses, such as a bank, may desire to verify the identity of an individual for a trusted transaction. The requesting TAE may initiate a data query transaction. The request is transported through the trusted transaction ecosystem to the participating data provider(s). The AVE may receive the request and self-configure itself based on the provided request specifications, such as, for example, configurations for dataset, methods, expected response type, and security tokens. Based on the communications protocol, and secured with technologies known to those skilled in the art, the system may verify the subscription of the data requestor, process the request against pre-negotiated business rules, verify compliance with local policies and send the query to the trusted identity database. The trusted identity database in turn is configured to accept and reply to data query transactions based on a custom configuration that may include, for example, verifying that the data requestor is not on a black list, the requester has submitted a compliant query, and that the request is in the proper format. Once validated as a compliant transaction, the query is performed and the database response is formatted for reply and sent back through the system, in reverse, to the data requestor.

Some implementations may function as a "local" compliance engine—receives data requests from the trusted transaction ecosystem (TTE). Some implementations may function as mapping-defined "connectors" in a multi-tenancy environment, combining local rules and requirements with the gaps of knowledge in order to determine programmatically which pieces of information are missing, and which sources of data to query. Some implementations may function as a communications coding engine by receiving (e.g., in a multi-tenancy environment) the pre-negotiated protocols, security, and data parameters that may be required for the bidirectional data transaction to take place, to ensure authenticity of the transaction is trustworthy. As deployed in a multi-tenancy, multi-instance solution, some implementations may decentralize the business rules and data transaction elements of the data providing entity of the ecosystem. This decentralization may reduce impacts of negative events such as outages, while spreading the computational and data burden across other AVEs deployed by the corporate identity data provider. Some implementations may function as an access "gate"—requiring biometric (or biometrically fused data), alone, or in combination with real-time data-hashing algorithms to ensure the data request is authentic (and not hacked or spoofed).

In some implementations, the authenticated validation engine (AVE) can be deployed on a single server instance or across a federation of server instances. This engine then processes a "hash" of the request, the communication codes, and the requested target identity databases. These requests are archived for reconciliation and may provide auditing information as well as reconciliation of requests and their status. Such implementations may protect the participating identity data provider by providing a discrete hierarchy of authentication within their business to ensure that the data response is authentic and compliant with their local policies, and that the providing party is authorized to do so. Data being handled will conform to the related data handling and security policies, and the actual data may not be exposed.

By scaling the AVE deployments throughout their organizational points-of-presence, the participating data provider may also provide redundancy to protect business operations against functional outages. The AVE may be configured and deployed for a variety of network settings, including virtual private networks, closed networks, cloud environments, or hybrid server environments. The AVE may be single or multi-tenancy at both the data request originator level and the databases of identity level. A participating entity for the identity data transaction system may choose to configure (or customer/data owner) may configure the connectors and profiles on the configuration engines. Databases/engines and additional systems may be hosted in disparate, networked or single server environments. Computational logic may take place in a decentralized manner consistent with the implementation described envisioned in these embodiments.

Figure 11A:
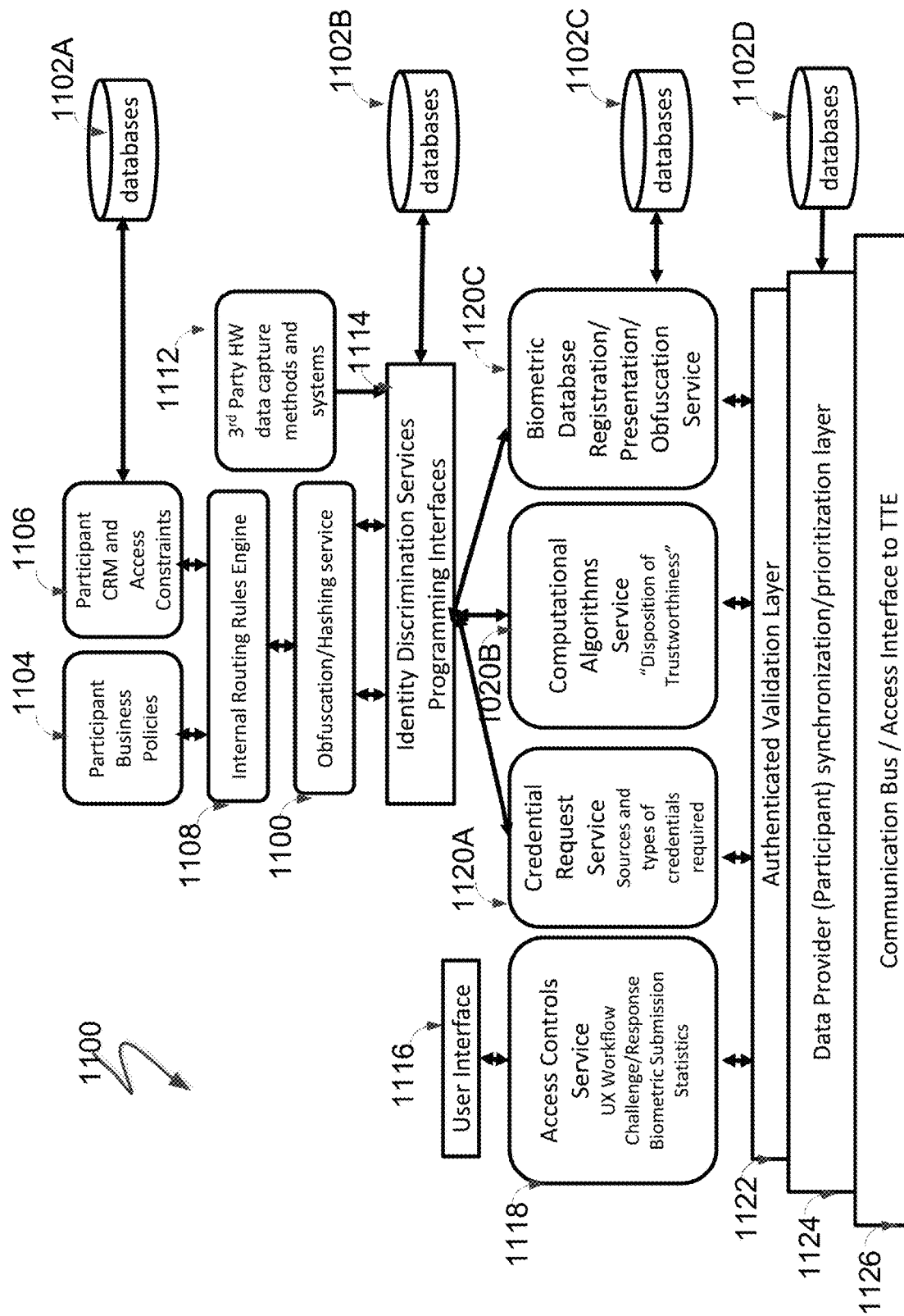
FIG. 11A is a diagram illustrating an example interface stack for an authentication verification engine according to some implementations.

FIG. 11A illustrates another example hierarchical data flow in an identity data transaction system 1100 that leverages identity databases 1102A, 1102B, 1102C, and 1102D at various levels. System 1100 includes a user interface 1116 to process and analyze identity data provided by system 1100. System 1100 also includes an identity discrimination programming interface 1114 to blend in identity data from third parties.

User interface 1106 may interact with access controls service 1118. An example access control service 1118 may refer to workflow that includes presenting challenges to an end user whose identity is being verified, and receiving responses from the end user. Access may be conditioned on matches (or substantial matches). The work flow through user interface 1116 may include a user experience aspect, as annotated as UX. Statistics of number of matches, number of trials, and complexity of challenges/responses may be recorded and analyzed.

Internal routing rules engine 1108 may utilize participant business processes 1104 and participant business intelligence 1106. Rules engine 1108 may apply verification rules to identity data. Participant business policies 1104 may include services and processes for identity verification for the participant business. Participant customer relation management (CRM) and access constraints 1106 may include statistics, rules, or analytics of the participating business. Participant CRM and access constraints 1106 may be coupled to identity database 1102A to obtain CRM and/or access constraints data. Participant CRM and access constraints 1106 may be analyzed by participant software services and processes 1104, the result of which may be further processed by obfuscation/hashing service 1110. An example obfuscation and hashing may provide a one-way encryption not reversible by virtue of applying encryption or decryption key(s).

As illustrated, an identity discrimination programming interface 1114 may leverage identity data from database 1102B. In analyzing such identity data, identity discrimination programming interface 1104 may utilize third-party hardware data capture methods and systems to supplement additional identity data from third parties. In some instances, an enhanced identity profile 1110 may additionally provide algorithms and threshold levels for querying databases 1102B.

Identity discrimination programming interface 1114 may leverage credential request service 1120A, computational algorithms service 1120B, and biometric database registration service 1120C. Credential request service 1120A may provide sources and types of credentials required. Computational algorithms service 1120B may provide disposition of trustworthiness. Biometric database registration/presentation/obfuscation service 1120C may interface with database 1102C so that identity data transaction system 1000 may leverage identity data on database 1102C. The service may include registration of a digital identity stored on database 1102C, presentation of a digital identity, and obfuscation of a digital identity to generate, for example, an abstraction such as a hash of the digital identity for transportation over a communication layer.

The above described components may be implemented as software layers residing on authentication validation layer 1122. The authentication validation layer 1122 may generate software events corresponding to prescribed conditions (such as assurance determination reaching a threshold level) or detected real-world events (such as leveraging identity data arriving from a third party). The authentication validation layer 1122 may be provided over data provider synchronization/prioritization layer, which in turn may be provided over a communication bus/access interface (1126) to TTE. Data provider synchronization/prioritization layer 1124 may also couple to database 1102D. Here, the databases may be external databases. In some cases, under a functional requirement for providing trusted identity, an operating agreement or a legislative mandate, these external databases may be kept in synchronization with the identity data ecosystem. The ability to leverage external databases can be important for real-time function of accessibility/visibility, or even for disaster recovery.

Figure 11B:
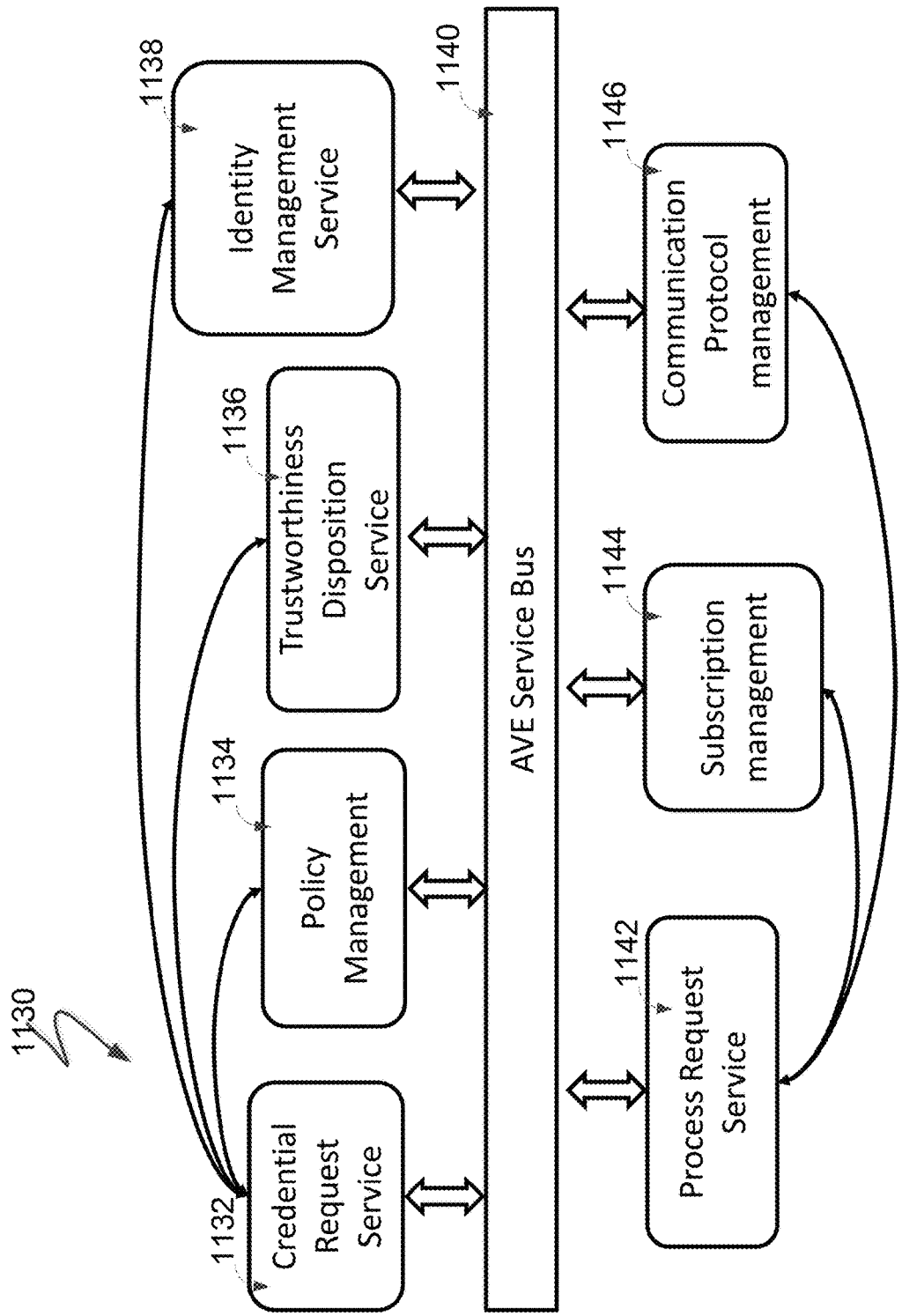
FIG. 11B is a diagram illustrating an example architecture for a an authentication verification engine according to some implementations.

FIG. 11B shows diagram 1130 illustrating the various service components of an example TAE. The various service components may interface with each other over the TAE service layer 1140. The service components may include process credential request service 1132, policy management 1134, trustworthiness disposition service 1136, identity management service 1138, process request service 1142, subscription management 1144, as well as communication protocol management 1146. Credential request service 1132 may include setting the usage policy of the identity at policy management 1134, the matching criteria at trustworthiness disposition 1136, as well as managing the identity claimed by the credential request at identity management service 1138.

Meanwhile, a process request service 1142 may allow transaction requests to be queued and prioritized. The process request service 1142 may interact with subscription management 1133 as well as communication protocol management 1146.

Credentials for individuals and entities may be issued by a certifying authority, based on the data and privileges desired at the discretion of the certifying authority or with the certifying authority acting as an agent on behalf of an organization which likewise determines the privileges. Because each certifying authority controls the aspects of each credential, credential holders may be limited in terms of the use of the credential.

Notably, credential holders in need of multiple credentials are issued multiple, discrete credentials by multiple certificate authorities, each may require independent maintenance.

Some implementations of an identity credential ecosystem may be electronic or digital, yet likewise certifying-agency-centric. In these implementations, each organization may establish or manage a credentialing process, and the credential holders may have limited roles and can only enjoy a narrow range of permissions—typically tied to one set of use cases and permission sets. For example, management of electronic credential documents, including eIDs (electronic IDs), eWallets (payment tokens) and even FID-type (e.g., standards-based) and others, typically revolve around one unifying ecosystem or master certificate authority that would manage the identity and rights/privileges of the credential holder/individuals.

Some implementations of digital IDs may include a certificate authority body providing the infrastructure of identity credential, in which a participating entity may manage the token identities of the holder. These implementations may create vetted/trusted identity tokens to enable identity related privileges and transactions. In these implementations, the tokens may be user-initiated and/or user-configured. These implementations may provide an embodiment of the identity data transaction system to enable users to manage their identities and associated permissions and transactions across multiple participants in the identity data transaction system. These implementations may facilitate the enrollment, configuration and ongoing management of a token-based identity as centrally managed by each participant/consumer. In these implementations, the paradigm may be changed from the establishment and management of a credential on behalf of central and authoritative CA (certificate authority), to a model whereby the identity transaction system brokers credential management transactions on behalf of the user, thereby enabling the user to request and obtain roles and permissions according to multiple user-specified scenarios. In these implementations, the CA interacts with the identity transaction system (e.g., according to business rules on policy engines) to determine if and how the permissions will be granted in an automated fashion without the need for human mediation (except that human mediation is possible in a system administration capacity). Specifically, some examples may incorporate a trustworthiness score based on the underlying privileges and permissions. Some examples may configure preferences for identity databases to participate in the ecosystem (such as the identity data transaction system). Some examples may configure preferences of the subscribers (enterprise participants) to the identity data transaction system.

Some implementations provide software, systems, methods and physical/digital outputs to enable the deployment and use of identity tokens on portable computing devices where the user initiates and authorizes the privileges associated with the credential. In an example implementation, such token may be first authorized by a qualified certificate authority such as, a government agency or official organization. In another example implementation, such token may be initiated by a user, and managed by an identity data transaction system. In an example implementation, physical/digital outputs (such as a physical identification document or a digital identification document) may include a token that represents a single set or plurality of sets of privileges associated with a trusted and vetted identity. In this example, such token/entities may be configured as instances that are enabled for different permissions and configurations based on individually configured relationships with different participants of the ecosystem (such as the identity data transaction system). In yet another example implementation, such tokens may be established, configured, managed, revoked (or set to expire) by the user/credential-holder at the user discretion. In this example, permissions associated with the tokens are configurable such that if one permission is revoked (or has expired), other permissions sets may remain intact until likewise managed or revoked specifically to enable the ability for a "temporary" or "one time" token artifact.

Some implementations may provide access to a central repository of identity-related credentials and documents. In these implementations, the access may be enabled and facilitated by the trusted identity token and its associated privileges. Some implementations may allow consumer users to self-generate digitally-watermarked physical credentials for machine validation. Some implementations may allow for integration into identity-related security technologies including, for example, smart card/token based security systems, public/private software key combinations, and thick client biometric software and hardware peripherals.

Some implementations may enable the creation and configuration of digital tokens that can be used to execute privileges. In one example, a user may conduct trusted transactions associated with the user's vetted/trusted identity according to the privileges established with one or a plurality of credential authorities. In this example, the configuration and control of such privileges and permissions are mastered by the user. Notably, features of some implementations may include the ability for the user to initiate and/or configure one or a plurality of instances of a credential and its associated permissions through a unified interface on a computing device.

In some implementations, the user may have established, as part of an enrollment process, a primary trusted identity meeting enrollment criteria from a qualified certificate authority such as, for example, a government agency (such as a department of motor vehicles, an immigration agency), an official organization (such as a university, hospital or financial institution), or a commercial organization (such as a provider of identity services). The token issuers may also include providers of trusted identity data.

In some implementation, a user enrolls for a credential with a trusted certificate authority, and provides sufficient proof-of-identity documents and/or data so as to establish a trusted identity with that entity. By way of illustration, that entity may initiate, according to business practice, one or more additional data queries at an identity data ecosystem for identity verification. The identity data ecosystem may include a federated system of identity databases from various sources, including, a government agency (such as the U.S. Social Security Agency or the Veterans Administration), a commercial entity (such as a financial reporting organization such as EXPERIAN), or an organization of higher learning (such as a university) in order to further vet the identity and/or increase the confidence in the identity. Notably, the user data may also be cross-correlated to additional negative-indicator databases such as a watch list, problem driver list, sex offender list, the FBI felony database or other source of data that may restrict the users permissions. These organizations may be inside and/or outside a formal ecosystem, enabling data queries with third parties that do not participate in the ecosystem as a tertiary validation check. The identity data eco-system may provide a scoring method for ranking the quality of the trusted identity on one or more dimensions including but not limited to identity surety, or risks associated with the identity. In some implementations, the identity data eco-system may incorporate multiple forms of identity data, such as biometric data elements to provide added confidence level in a given authentication as well as multi-factor authentication.

Some implementations may provide a user with a foundational credential. The foundational credential may be digitized into a digital token, including, for example, an electronic ID, or other unique identifier.

Some implementations may include a "plurality token." The plurality token may include a collection of tokens, or a token with multiple sets of discrete characteristics to serve as multiple tokens for different purposes. By way of illustration, such plurality tokens may be machine readable, machine validated, or human verifiable. Specifically, such plurality tokens are extensible to incorporate more than one set of identity data including, for example, multiple aliases. For instance, each set of identity may be associated with a particular set of roles and permissions. In these implementations, a persistent identity dataset may include a unique identifier across the identity data eco-system.

Example plurality token sets may be secured by authentication. In one instance, the unique identifier across the ecosystem may be enabled for multi-factor authentication including, for example, biometrics, password, PIN numbers, or challenge/response. Each set of identity may be authenticated by its own biometrics, password PIN numbers, or challenge/response. As noted, the plurality token may include a collection of tokens, or a token with multiple discrete characteristics serve as multiple tokens for different purposes. During the enrollment process, the token unique identifier may be established, and may then be cryptographically tied to the user with an encryption scheme that, amongst its decoding protocols, includes multi-factor authentication such as a biometric (e.g., facial recognition, fingerprint, or voice). In one example, a multi-factor authentication including, for example, a PIN number, a key phrase, or secondary biometric, may greatly reduce the chances of another human being having same combination. The authentication may further include mechanisms to thwart, for example, replay attacks. Such mechanisms may incorporate a measure of freshness or liveliness, for example, by asking the requester to provide evidence of a live session. In one instance, the requester may be asked to enter a pseudo-random verification code unique for each session. In another instance, the pseudo-random code may be dynamic to thwart further crawler/robot attacks. Such measures may also include associating fresh characteristics for each requesting session, for example, generating characteristic data unique for each session and coupling the characteristics with a password, a biometric, a PIN number, etc.

The level of authentication sophistication may vary with the underlying roles and permissions associated with each set of identity. The sophistication level for each identity set may be adjusted by the user/consumer on his/her own initiative. Some implementations may allow the user to have control over the use of their trusted identity tokens and associated privileges. Since users can have more than one credential and can combine their credentials into a unified, multi-purpose "plurality token." For example, the user may have a core or foundation token. The core or foundation token may be used to back up other identities, each with its own set of permission and privileges. Access to the core or foundation token may enable access to other tokens. The user, however, is enabled, for example, through a user device, to modify permissions and privileges for each identity (including, for example initiating, expiring, or disabling temporarily). This configuration capability can happen at each token level, and can happen even at the "core" token, within constraints defined by the identity data system. In some implementations, such configuration may be performed over a network (wired or wireless) so that the permissions and privileges for each identity at remote identity databases can be managed by the user.

In some implementations, the "plurality tokens" may be managed through a certificate authority of the identity data eco-system. This certificate authority may acts as a proxy for multiple third-party or ecosystem-based certificate authorities, and may operate under policies administered through the identity data eco-system.

Notably, the token may be installed or uploaded into a device of the user's choice, including, for example, a mobile tag, a smart phone/tablet, a portable computing device, a dongle, a NFC/RFID or other device capable of electronic communication.

Once the token is enabled, the token is activated with an underlying trusted identity. The trusted entity may be in an encrypted form and locked to the user's identity, which may present a physical identity document of the user. The enabled token can be used to authenticate to a registry service of the identity data eco-system. The use may further configure the token to define, for example, the types of transactions enabled by a successful authentication based on the token. The registry service may require authorization from the user to use the newly configured token, and may need the authentication that the token is valid. In this manner, the user may interface directly to the identity data eco-system, as well as the proxy certificate authority and associated policy engines. As an additional layer of security, a temporary PIN number assigned by the identity data eco-system may further secure the registry transaction from unauthorized access.

The registry may create a unique identifier, for example a token type ID, a hash of the token ID or serial number combined with a unique identity ID and a secondary hash of one or more of the multi-factor authentication templates, thereby creating a unique identifier string unique to that User. This unique identifier may be encrypted upon creation, and can be reduced in string size by applying a hash, a digest, a checksum, or other algorithmic shortening. Once the identity token has been defined and secured, the identity token may be tied to the physical identity of the user.

Some implementations may include a user-controlled permissions system. In this system the user can, for example, establish multiple token identities, define the entities that have permissions to access the users credential, configure those permissions, suspend (or set to expire) the permissions on an entity by entity or permission by permission basis, and revoke tokens or permissions (e.g., on an entity by entity or permission by permission basis).

To expand on the registry account further, a user may have a trusted government identity loaded as a secured token. In one illustration, the user may have used that identity token to submit his or her fingerprints to the FBI. Thereafter, the user may have been licensed to carry a concealed weapon. Such authorization may be encoded into the particular identity token. The user may, at the same time, maintain another identity token encoding an authorization to fish in particular jurisdiction. Thus, some implementations may allow one person to have multiple credentials with associated permissions and managed in a single token set, and managed by the user himself/herself.

Once installed on a user device and locked by virtue of multi-factor authentication, the identity token may be used by the user in trusted transactions where identity matters. Examples of transactions may include one-time or low incident but high risk transactions such as large-sum financial transactions, enrollment in institutions of higher learning, providing proof of identity for trusted transactions such as obtaining a concealed carry weapons permit or background checks. Example transactions may further include recurring transactions, such as using an ATM machine, using public transportation, obtaining health care, picking up children from daycare, or other recurring transactions.

In some implementations, an identity token may be used as the access control for a repository of identity-related data and document. For example, an identity database, such as an "identity vault," may be under such access control. By way of illustration, the identity token may be used for access control of a physical safety deposit at a local bank where physical items can be kept (for example, jewelry, birth certificates, or physical keys). The identity token may be used for access control of other safety premises (such as a firearm safe, or a controlled substance safe).

In some implementations, the user can generate on a portable computing device, a digitally-watermarked credential. The credential may be displayed on a portable computing device, in printed form, or other, as a means of providing a physical token that can be validated/verified with a machine/scanner configured to identify and decode digital watermarks.

Some implementations may be practiced in a variety of network settings, including virtual private networks, closed networks, cloud environments, or hybrid server environments. The network may be a single or multi-tenancy setting at both the data request originator level as well as the databases of identity level. A participating entity for the identity data transaction system may choose to configure (or customer/data owner) may configure the connectors and profiles on the configuration engines. Databases/engines and additional systems hosted in disparate, networked or single server environments. Computational logic may take place in a decentralized manner consistent with the implementation described envisioned in these embodiments.

Figure 12A:
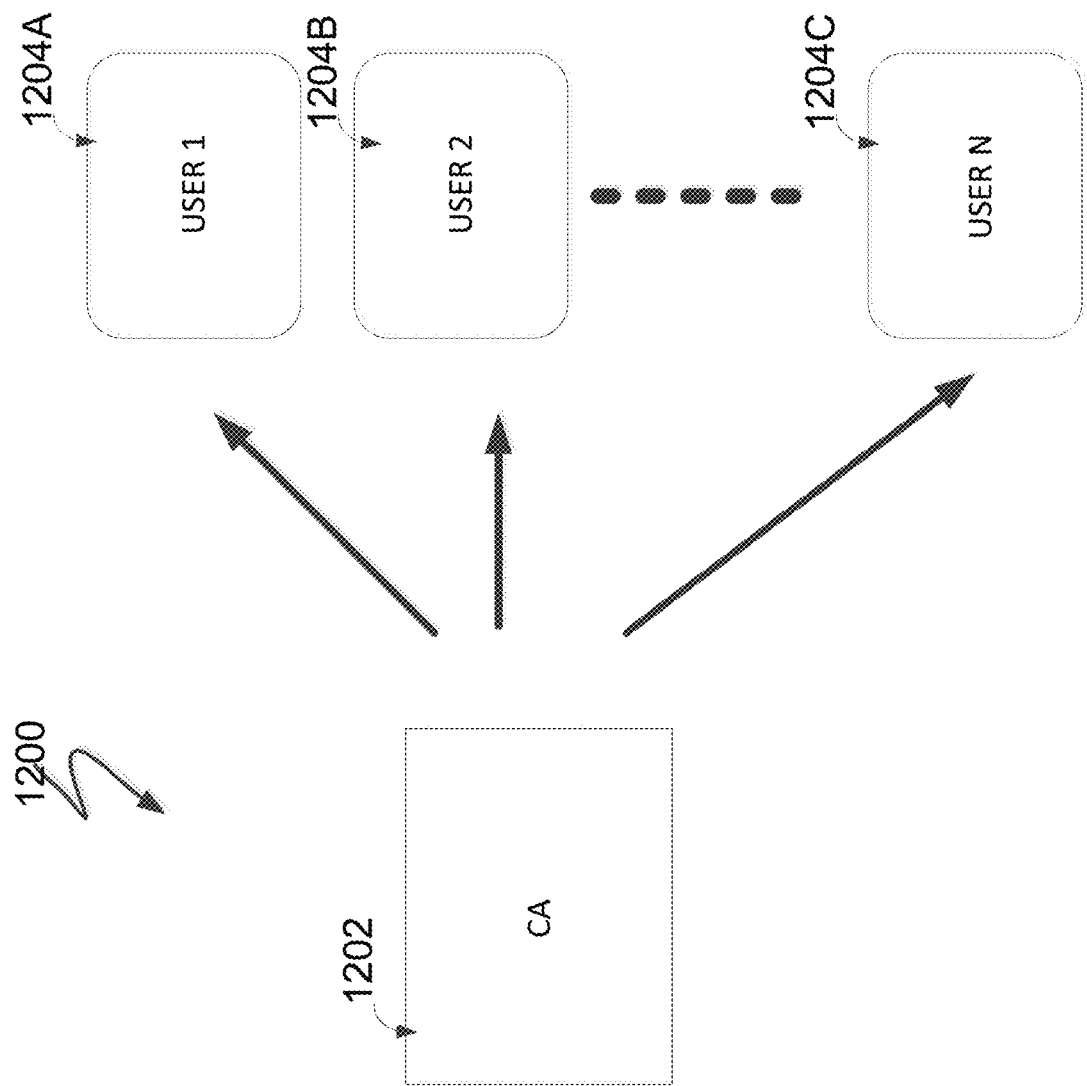
FIG. 12A illustrates a token management architecture.

FIG. 12A illustrates a token management architecture 1200. The token may generally refer to a certificate specifying a set of privileges or permissions for the carrying (or associated) party, for example, users 1204A, 1204B, and 1204C. The carrying (or associated) party of a token may use the granted token to obtain access to, for example, a user account, an application program, a bank account, a virtual vault, and/or rely upon the token for physical access control to items and locations, such as, for example, a personal car, a rental car, an enterprise, a facility, a repository, a physical vault, an asset, a facility, a subway, a ballpark, a plane, a port, a school. The token may be configured to act as a password in certain cases. A certificate authority (CA) 1202 may include an administrative agency or regulatory authority charged with granting or administering access based on a token for the benefit of a party that applied for the token. The certificate authority also may be configured to revoke or suspend the token held by a party. An example of a certificate authority may include, for example, a financial institution (e.g., a bank, a credit union, an investment company, a mutual fund company, a payment brokerage company, a credit card company), a government agency (e.g., The Social Security Administration, the Department of Health and Human Services), a facility manager, or an educational institution. In one work flow, an associated party may apply for a token at a particular certificate authority. Each certificate authority may administer a corresponding set of rules of processing the applications to determine whether an applicant is properly identified. The scope of permissions associated with an applicant may specify access and permissions to a particular online account or a physical building, and/or a duration of privileges for an applicant. The particular certificate authority may elect to screen an applicant according to a set of rules for a particular service or system. After an applicant has been authorized pursuant to the screening process, the certificate authority may issue a token. As noted above, the token may allow the carrying (or associated) party to have the access privileges and permissions as specified by the token. The tokens may be configured to be issued in a "one way" manner, from the certificate authority to, for example, individual users. As illustrated in FIG. 12A, a particular certificate authority may issue tokens to multiple users, each allowing the recipient user to have the specified privileges and permissions. In other words, the one way characteristic may form a hub and spoke pattern with the particular certificate authority at the center.

A certificate authority may employ advanced feature sets for screening applicants and/or issuing credential tokens. For example, a certificate authority may attempt to manage a subscriber community with increasingly sophisticated measures intended to more robustly verify user identity. However, an individual user, especially a less sophisticated user, may be intimidated by the number of credential tokens issued from various certification authorities, such as a user's school, bank, credit card company, employer, retirement services agency, the Social Security Administration, a health insurance provider, the user's auto insurance company, a user's mortgage company, a user's health club, a primary care physician, a user's social network account. Each of these CAs may include different measures, configurations, and risk levels for authenticating the carrying party of a credential token. The sheer number of credential tokens from these certification authorities may only grow as the society becomes increasingly a digital society.

For some users, managing such an array of tokens may become problematic. For example, an average user may forget passwords for certain accounts and may resort to resetting passwords frequently. A user may opt to use the same password for multiple accounts, which may compound the impact of a breach on one account. A user may resort to writing passwords for each account on a piece of paper, or a single file on a disk, the loss of which may lead to adverse consequences.

Moreover, users may be forced to rely upon a difficult-to-use token and the associated CA-centric control system. In order for recipient A to grant access rights to recipient B (a different user), recipient A may pass the token that recipient received from the certificate authority to recipient B. This passing of the token may increase the risk of identity theft in the digital age.

Figure 12B:
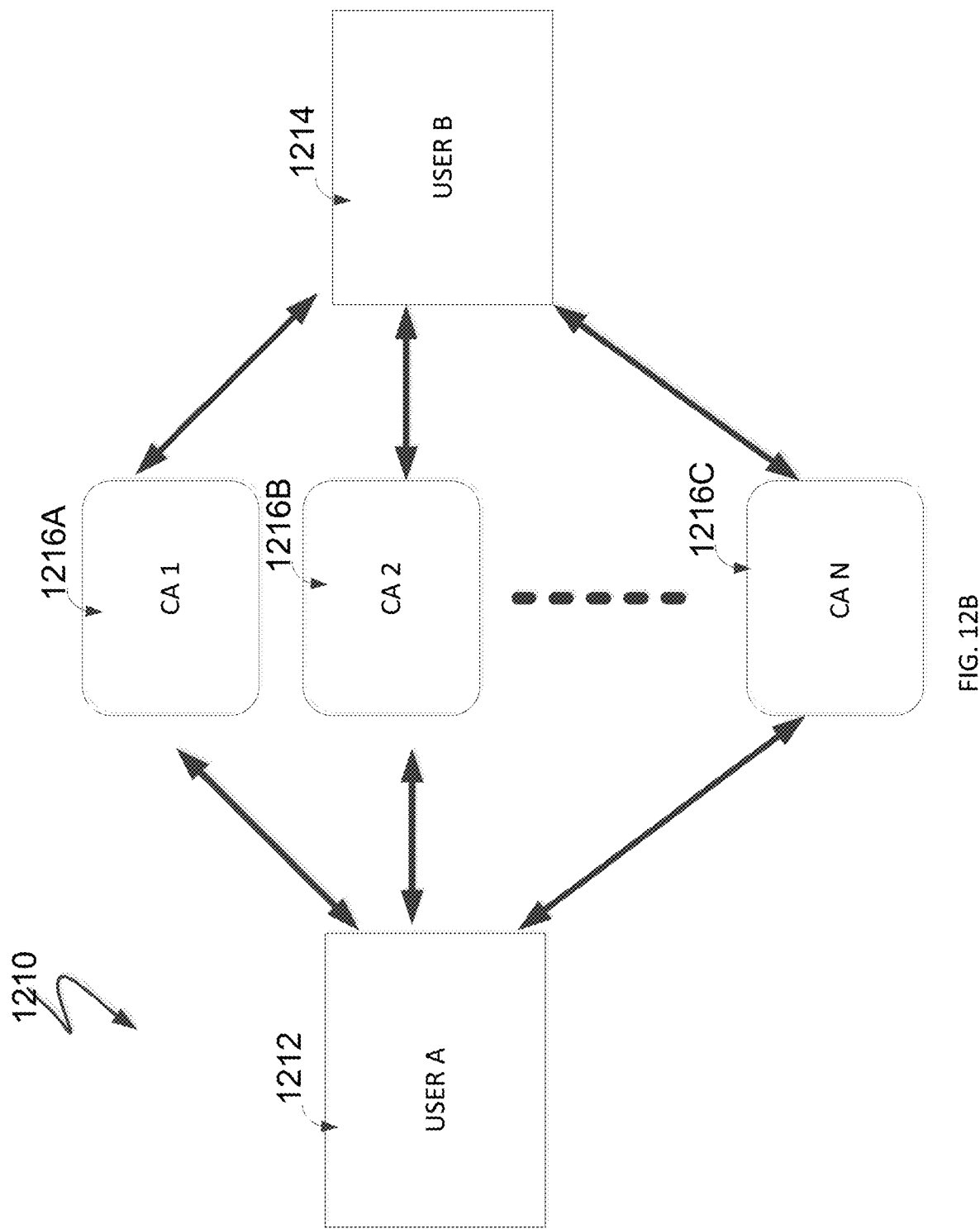
FIG. 12B illustrates another token management architecture.

FIG. 12B illustrates a system 1210 configured to address some of these challenges. As shown, a two-way user-centric pattern may enable a user, such as users 1212 and 1214, to configure privileges and permissions to the user's asset or account based on a foundation token issued to the user. Notably, some implementations may allow a user to request permissions or request artifacts or endorsements be added to the user's token set. Specifically, an individual user may submit the request for the permissions, and then the certificate authority—within the business rules of the certificate authority—may approve the request for permissions, or reject the request for permissions. In other words, just because an individual user requests a permission or privilege to be associated with the individual user, does not mean that the certificate authority is obligated to approve the request for the permission or privilege. For example, a credit card company may have internal guidelines to determine the credit limit to a request for a credit authorization. Some implementations may include screening against a negative records database. The negative records database may range from a "bad guy" identity database to a counterpart (or third-party) certificate authority that can revoke a credential token (in the traditional sense of a certificate authority). Not all "negative" decisions represent actions associated with bad intent. Some negative decisions may represent actions with respect to expired accounts, or temporarily unavailable identities.

As illustrated in FIG. 12B, a user may start with a foundation token. The foundation token also may be known as a primary identity document. A foundation token may be issued based on (or premised on) a primary identity document issued by, for example, a government agency after a rigorous vetting process. This example may allow the plurality token set to leverage the authority and trustworthiness associated with such government identification documents or the vetting process thereof. In this illustration, the foundation token may be issued by one of CAs 1216A to 1216C. Some examples of a digital foundation token may include: a digital portrait, a digital passport, a digital driver license, etc. Because a vetting process implemented by some entities (e.g., a government authority) may authenticate a person (or an entity for that matter) in a manner that provides an increased degree of confidence, the tie-in of such a record having a high degree of confidence (i.e., a "golden record" or "system of record") into the ecosystem carries with it the gravitas of that identity endorsement. For instance, the state of Massachusetts Department of Motor Vehicles (DMV) may personally authenticate using measures associated with a high degree of confidence before the DMV issues the user the foundation token (i.e., the driver license). The credential of the driver license and the associated record have more value than an identity backed by an non-traditional source such as Facebook where Facebook may take a user's word at face value. Hence, by extending the use of that foundation token into a "certified" token set, the certified token set carries with it that identity endorsement.

Some implementations may allow a user to take the initiative to extend a token set based on the foundation token. The combination of the foundation token and the user initiative can provide a level of veracity and authenticity backed by the foundation token while maintaining the ease of management through the user initiative.

Notably, extending the privileges from the foundation token may extend the confidence for proposed (pending transactions) that can be linked to a trusted entity. In particular, the link to government-issued identities, or even official commercial enterprise, may provide the missing link of veracity of the underlying foundation token. Yet, additional value may be realized to include extending the individual user's ability to manage and control their token-facilitated transactions through one token set. The token set may be scalable in size and extensible to new platforms as they are developed. Figuratively, the foundation token may serve as the ring or the key-chain to tie all credential tokens that an individual user may receive from certification authorities. In contrast to the one to many mapping from one certificate authority to many users, some implementations may provide many-to-many mappings between two individual users. Here, the plurality is in the user managing a token system tied by a foundation token versus certification authorities issuing multiple tokens which users manage separately on a token by token basis.

Through the user initiative, some implementations may allow a user to delegate portions of permissions and privileges of the user to another user. For example, the user may have, as part of the user's identity token maintained with regard to access a local gym or library, the permissions and privileges to access gym or library facilities during visits on premise between 9 am and 5 pm local time. In this example, the user may delegate such permissions and privileges to the user's child when the child is away from school in summer time. The delegation may be limited to the user's child only and may be limited to summer months. In a similar vein, delegation through token configuration may allow the principal user to assign portions of the principal's permission and privileges to another user in the capacity of an agent. In the above example, during school season, the parent may delegate, to school officials, the permission and privileges to configure access right of the child to school facilities on premise. Such delegation may also include the access right of child to use local medical facilities. In these delegation examples, the parent may issue a token to the receiving party. The token may be combined with the receiving party's foundation token so that the receiving party may use the foundation token to authenticate the receiving party's identity in order to enjoy the delegated right or perform the delegated task.

Some implementations may allow a user to impute portions of permissions and privileges of the user to another user. For example, the user may enjoy access rights to an on-line banking facility. Through token configuration, the user may impute such permissions and privileges to a spouse, or trusted family member. As a result, the spouse or trusted family member may enjoy the same access rights at the on-line banking facility. The imputation may be realized by the user issuing a token to the receiving family member. The token issued by the user may rely on the receiving user's foundation token to authenticate the receiving user at the on-line banking facility.

Figure 13:
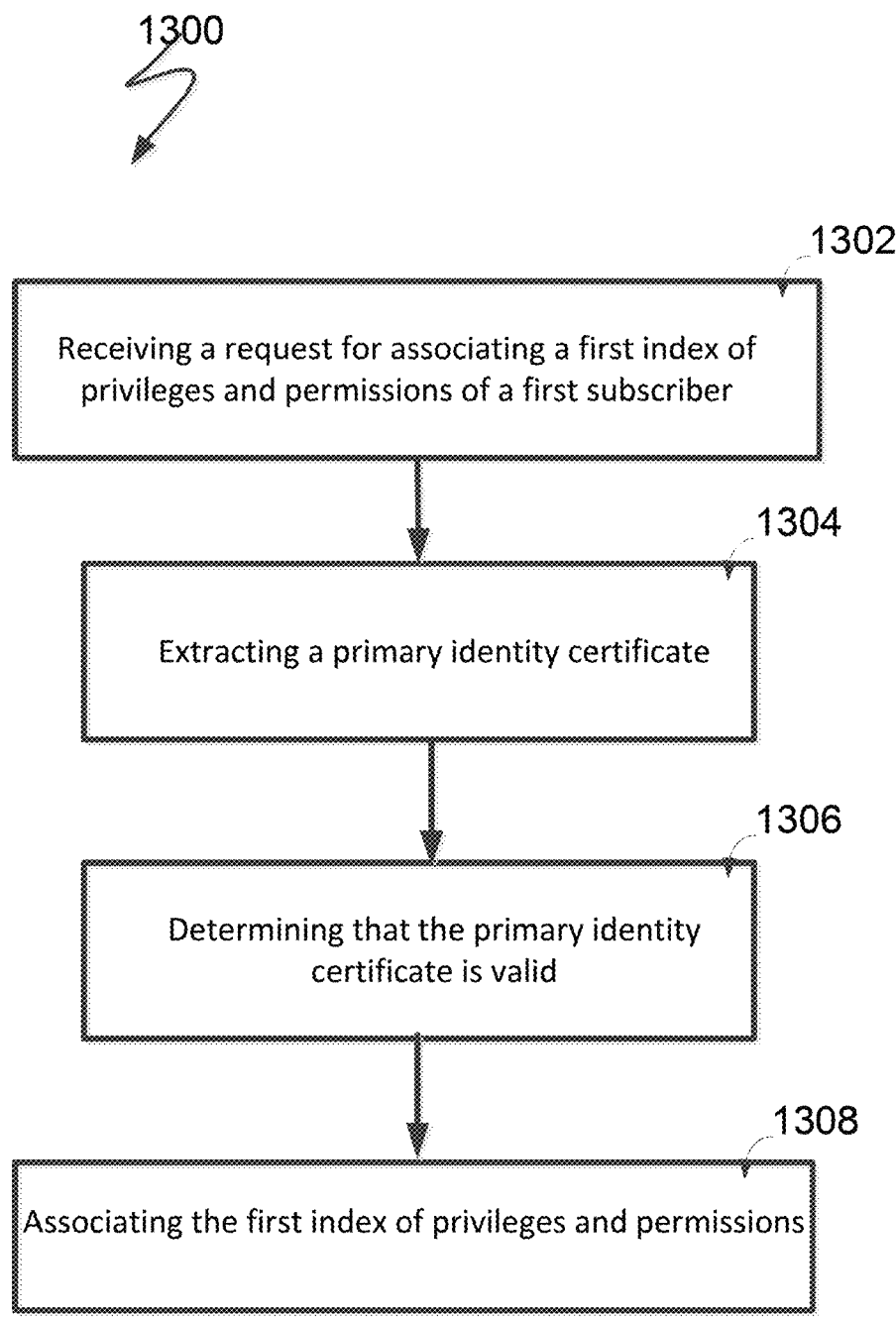
FIG. 13 shows an example process for a certificate authority to interact with a user according to some implementations.

FIG. 13 shows an example process 1300 for a server of a certificate authority to interact with a user according to some implementations. As an initial matter, the user may be in possession of an identification document issued by a trusted entity through a rigorous vetting process. The identification document may function as the foundation token. Here the trusted entity may generally include an authoritative government agency, such as, for example, the state department at the federal level, the department of motor vehicles at the state level. The trusted entity may also include other authoritative sources such as, for example, an accredited educational institution, or an employer with a rigid vetting process to authenticate employees. The identification document may include a digital passport, a digital driver license, a digital portrait, a digital permanent resident card, a digital national identity card, etc. In some implementations, the identification document may include traditional physical identification documents. The vetting process may include the process of proving that an applicant is properly identified, based on, for example, physical examination, facial recognition, inspection of birth certificate.

The user then may submit a request for associating an index of privileges and permissions to the foundation token, for example, a digital portrait issued by a trusted entity. The request may be submitted along with a foundation token of the user. The index of privileges and permissions may be known as a credential token. The index of privileges and permissions may encode the scope of permissions for the user to, for example, access transactional data managed or controlled by the certificate authority. In some implementations, the transactional data may be merely under the custody of the certificate authority. The privileges and permissions may also encode a duration during which the user may access the transactional data.

The request may be received at a server (1302). The server may be located at the certificate authority. The server may then extract the foundation token from the request (or information related to a foundation token) (1304). Thereafter, the server at the certificate authority may validate the foundation token as authentic (1306). The validation may include verifying the format of the foundation token as in conformance with jurisdictional requirements, verifying that a computed checksum from a particular segment from the foundation token match a corresponding recorded checksum for the particular area, cross-correlating information from various segments on the foundation token, confirming with the trusted entity that has issued the foundation token, or verifying with a third-party identity broker that can attest to the validity of the foundation token.

In some implementations, the validation may further include authenticating that the user submitting the request is the person identified by the foundation token. For example, the validation may include matching a biometric value of the submitting user with the corresponding biometric on the foundation token. The biometric value may include, a face, a finger-print, a palm-print, an iris scan, a retina scan, a voice, a gait analysis, etc. By way of illustration, some implementations may include automatic facial recognition to compare the face of the submitting user matches the face shown on the foundation token. To mitigate spoofing or other fraudulent measures, the submitting user may be prompted to gesture in a manner that cannot be predicted by injecting a static image as a man-in-the-middle attack.

The validation may establish that the foundation token is authentic and has not been tampered with (or at least indicate that the presented data has been analyzed using certain filtering processes that address certain fraudulent techniques). The validation also may validate that submitting user is the user identified by the foundation token. Thereafter, the server at the certificate authority may further compare the requested permission and privileges with internal business rules to determine whether the requesting user can have the requested permissions and privileges.

By way of illustration, if the requesting user is requesting access to building A, the server at the certificate authority may determine whether the requesting user is prohibited from entering building A. For example, the server at the may verify whether the requesting user has an office in building A, whether the requesting user is on a black-list to visit building A, whether the requesting user has paid commensurate fees to visit building A at a particular time, or whether the requesting user has other legitimate business reasons to visit building A at the particular time.

In another illustration, the requesting user may be requesting temporary access rights for a different user. In this case, the server at the certificate authority may verify whether the requesting party is authorized to grant access rights to a third party, for example, regarding the transactional data in question.

Once the server at the certificate authority determines that the requesting user may have the requested permission and privileges, the server at the certificate authority may add the credential token to the requesting user's token set (1308).

In yet another illustration, the server at the certificate authority may cause the requested privileges and permissions to be associated with the foundation token. In one example, the server at the certificate authority may generate an add-on credential token and transmit the same back to a computing device of the user. The credential token may include data encoding an index for the requested permissions and privileges. The data may be encrypted using a private key of the certificate authority and a public key of the user. Upon receipt, an application program on the user's computing device may decrypt the encrypted data by using the private key of the user and link the credential token to the foundation token. The user may now have a token set linking the newly received credential token to the foundation token. The user may subsequently link more credential tokens to the same foundation token and extend the token set.

In yet another example, the server at the certificate authority may attach data encoding the requested privileges and permissions directly to the foundation token. The attachment may take the form of appending, embedding, steganography, etc. The attachment portion may be encrypted using a private key of the certificate authority and a public key of the user. Upon receipt, an application program on the user's computing device may decrypt the encrypted portion of the foundation token by using the private key of the user. The user may now have the foundation token extended to include the newly obtained privileges and permissions. The user may subsequently extend the foundation token to privileges and permissions obtained from other certification authorities or link more credential tokens to the same foundation token. Hence, the user may treat the foundation token as the master ring or key chain to tie in credential tokens obtained from participating certification authorities in an eco-system.

Figure 14:
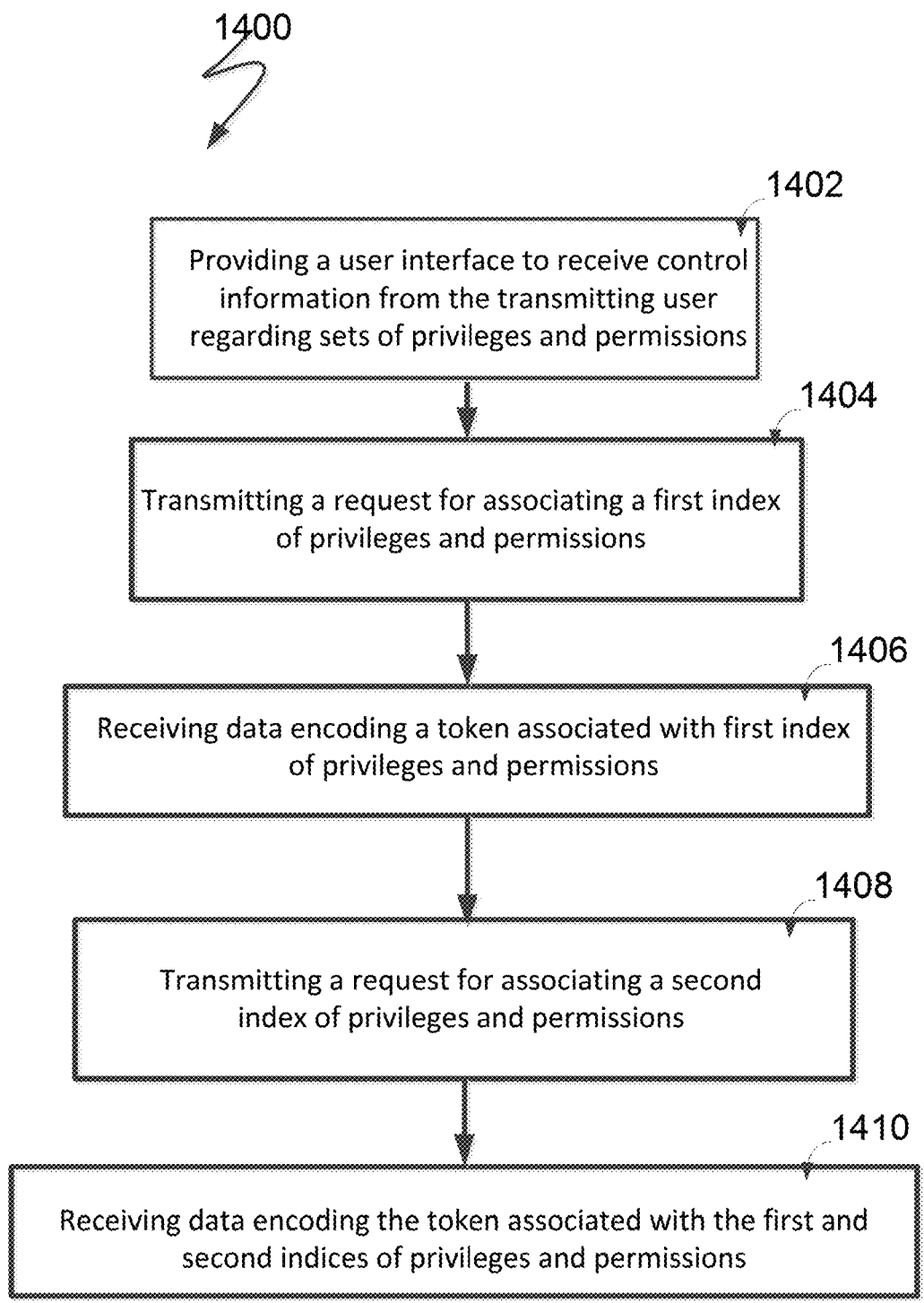
FIG. 14 shows an example process for a user to request sets of privileges and permissions to be added to a foundation token of the user, according to some implementations.

FIG. 14 highlights the process 1400 for a user to request sets of privileges and permissions to be added to a foundation token of the user according to some implementations. A consumer user may have an application program installed on a computing device of the user. The application program may provide the user with an interface to specify a set of privileges and permissions to be associated with the user in accessing transactional data (1402). The transaction data may be, for example, managed by a certificate authority. The interface may include a graphic user interface to provide more intuitive experience for a user to specify a set of desired privileges and permissions at a particular certificate authority. In one configuration, the interface may provide a batch processing capability for the user to submit multiple sets of desired privileges and permissions at various participating certification authorities. The batch processing capability may allow a user to obtain multiple sets of desired privileges and permissions at various participating certification authorities through, for example, one click, one key stroke, or one tap, on the computing device.

Thereafter, the computing device of the user may transmit a request to the certificate authority as referenced by the request (1404). The request may be accompanied by a foundation token of the user. Sometimes, the foundation token may be referred to as primary identification document. The foundation token may identify the holder of the foundation token by encoding a biometric of the holder. The foundation token may be issued by a trusted entity through a rigorous vetting process. As noted above, a server at the certificate authority may process the request by verifying that the foundation token is valid. The server may also authenticate that the requesting user is the holder of the foundation token. The server may additionally confirm that the requesting user meets the pre-requisites for requesting the desired privileges and permissions. For example, when the requesting user attempts to engage in age-restricted activities, the server may perform an age calculation to confirm that the requesting user meets the age requirements. In another example, when the requesting user attempts to have access to restricted items, such as controlled substances, guns, ammunitions, etc., the server may check the request against rules. The rules may limit the amount, duration, or time-window of accessing such restricted items. If the request complies with the rules, the server at the certificate authority may allow the request to proceed.

The computing device of the user may receive a response from the server at the certificate authority (1406). The response may indicate that the request has been approved or disapproved. In some implementations, if the request has been approved, the user computing device may computationally associate the requested set of privileges and permissions with the foundation token of the user. In some implementations, however, if the request has been approved, the user computing device may receive data encoding the foundation token that has already been computationally associated with the desired privileges and permissions. The computation may have been performed by the server at the certificate authority.

As noted above, the envisioned work-flow may enable a user to take the initiative to configure and manage a token set of privileges and permissions. For example, when the user has obtained a credential token from a certificate authority encoding the set of privileges and permissions of the user, the user may take the initiative to revoke, renew, replace, or update the credential token. By way of illustration, the user may submit the revocation, renewal, replacement, or update request through the same interface as noted above. The revocation, renewal, replacement, or update requests may be processed by the server at the certificate authority in a manner consistent with the description herein.

Similarly, the user has the initiative to add credential tokens from other certification authorities to the same token set based on the foundation token. By way of example, the user may submit additional requests for associating a new set of privileges and permissions with the foundation token (1408). The submission may be through the same interface as noted above. The submission may be accompanied by the foundation token of the user. The foundation token may already be computationally associated with privileges and permissions at certification authorities that the user has previously dealt with. The newly submitted request, however, may attempt to extend the foundation token to the new set of privileges and permissions so that the user may obtain the new set of privileges and permissions. The new set of privileges and permissions may indicate the scope of right of the user, for example, to access transactional data managed by a certificate authority that the user has not dealt with before.

The server at the new certificate authority may process the request in accordance with the descriptions herein. If the request is approved, then the server at the new certificate authority may cause the foundation token to be computationally associated with the additional set of privileges and permissions. Further, the user may receive, on the user device, data encoding a digital identity associated with the newly requested set of privileges and permissions (1410). Notably, the foundation token is also associated with that existing set (or sets) of privileges and permissions. In other words, if the request is approved, the requesting user may have the additional set of privileges and permissions attached to the foundation token that has been associated with existing sets of privileges and permissions.

The benefits may not be limited to the disclosure above. Some implementations may allow a consumer user to upgrade from a physical identification document to an electronic identification document, for example, at license renewal time. The renewal may be initiated from a mobile computer device. The renewal time could also correspond to renewal time of a physical document. The electronic identification document may be one example foundation token. A digital driver's license may be one example of an electronic identification document. By way of illustration, a digital driver's license may be stored on a smart phone or a consumer user and may be presented on the touch screen of the smart phone.

Some implementations may allow a consumer user to add new security features to the consumer user's eWallet solutions. Some implementations may a consumer user to add security features to the consumer user's social network account, such as, for example, a Facebook account, a Twitter account.

Some implementations may facilitate Single Sign-Ons. Particularly, some implementations may allow a consumer user to prove the consumer user's identity from a variety of contexts or situations.

Some implementations may allow a consumer user to incorporate a number of credentials or endorsements into a foundation token of the consumer user. The credentials and endorsements may include first responders, state employee ID, professional licenses, etc.

Some implementations may allow a consumer user to update data to an authoritative source such as the DMV at a time chosen by the consumer user. The updates may include, for example, address changes, donor status, veteran status. Some implementations may allow the consumer user to reinstate or revoke a driver license (or other endorsements) of the consumer user in a real-time manner.

Some implementations may allow a consumer user to assert an identity of the consumer user from a variety of platforms, including, for example, mobile platforms, table devices, desktop PCs, or Web browsers.

Some implementations may allow a consumer user to use facial biometrics with a digital driver license for verification.

Some implementations may extend a foundation token to include other credentials for a consumer user. In one example, a consumer user may back a credit card application by using a digital driver license of the consumer user. In another example, a consumer user may link a point-of-service (POS) digital Medicaid card to a foundation token. The linked credentials may be used in a request for proposal (RFP) response.

Some implementations may integrate the use of digital driver's license with OpenID. Some implementations may accommodate using digital driver's license to support Single Sign-On (SSO). Some implementations may use a foundation token with eWallet to support an identity of the consumer user in possession of the foundation token and the eWallet. Some implementations may verify an identity of a state employee (for example, case workers) in connection with a digital driver's license of the employee. Some implementations may verify an identity of a Medicaid beneficiary based on a digital driver license of the user holding the Medicaid beneficiary card. Some implementations may allow a consumer user to apply for benefits under a DHHS program by using a digital driver's license. Some implementations may allow a consumer to make credit card purchases by authenticating the consumer according to a digital driver license. Some implementations may include conducting background check for applicants (for example, coaches, teachers, etc,) based on digital driver's license. Some implementations may facilitate home healthcare uses with digital Medicaid card.

The systems here may be configured to support Internet, virtual, or IT-centric systems. For example, the system may be configured to link different internet connected systems so that an Internet banking system may be linked to support more elaborate operations within a social networking system (e.g., share data or purchase prints). The internetworking may rely upon public networks (e.g., the Internet) or private (e.g., a government, corporate or private financial network). In one configuration, the systems are configured to support enterprise IP networks. For example, the systems may be configured to support an enterprise financial payment system that pays outside vendors. Disbursements below a threshold amount may require that an administrator authorize a transaction using input from a driver's license (e.g., reading optical and authorization data from a driver's license reading system) with an enterprise social network (e.g., an intranet) configured to interface with a user-centric identity management system. For transactions involving disbursements above a threshold, a passport reading system may be required to interface with an identity management module that requires a first identity module for a first user to interface with a second identity management module for a second user where the second user endorses the authorization of the first user.

The system may be configured to support virtual implementations where an identity management module is managed and controlled by the user. The user may authorize other modules to interface with the virtual machine management the identity. The virtual machine may act as a certificate authority and key manager or delegate other systems to act as certificate authority or key distributor on behalf of the user.

As noted above, the systems may be configured to create tokens that reflect the authorization from multiple software and/or hardware systems (e.g., a physical token such as a printed driver's or a hybrid identification document such as a digital driver's license resident on a mobile phone). For example, the user may wish to create a configuration through their identity management module whereby high risk transactions (mortgage and credit card applications) require both presentation of a digital token that reflects a sequence of authorization using both a messaging account (e.g., Google's Gmail service), a social networking account (e.g., Facebook), and a user presenting a passport through a passport-reading application. The authorizations may be structured so that a first service acts upon information authenticated by the prior service. Thus, a messaging time stamp may be processed to create a delegated Facebook token that is received by a passport processing application. The passport processing application may optically interrogate the passport based upon the received Facebook token. The resultant token received from the passport reading application may be passed onto a banking system for approval by a user's virtual identity management agent. The resultant hybrid token may be physically presented in the form of an electronic device (electronic ID or electronic ID application resident on a smartphone) to another user (e.g., an authorizing official at the bank) who in turn presents their own digital credential. Alternatively or in addition, the transaction may be performed between software and server agents acting on behalf of the user and remote system (e.g., banking system). The user may configure the token so that the token may be accessed and relied upon by a first user (e.g., a first bank) but not a second user (e.g., a second bank). The user may specify a list of agents authorized to rely upon and access the particular token.

The resultant token may feature a drill down or hierarchical feature set. For example, in a first case, a user may create a general token that is used in a credit application for general applicability. The user may specify that a pool of banks are authorized to consider a credit application so long as the bank is participating in the accredited approval system and/or specifies parameters in terms of certain rates and parameters. One or more banking systems may accept the preliminary request and contact the user's identity management module in order to receive more information. The user then may modify their token to include a more detailed credit application and only authorize the more detailed information for specified institutions.

The user agent may be configured to act as a user-controllable key management agent and/or certificate authority that selectively distributes keys, delegates authority, and acts as a certificate authority on behalf of the user. The user may specify one or more remote systems with whom the user agent is authorized to act as a certificate authority (CA), exchange keys, and/or share delegate information. In one configuration, the user may instruct their agent, perhaps resident on or hosted on a virtual machine accessible through a mobile device, to use a first set of keys to support financial transactions less than a specified threshold for vendors willing to authenticate in a specified financial transaction network.

Various implementations of systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), the Internet, or a satellite or cellular network data carrier.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system for generating a token set that computationally associate privileges and permissions with a digital foundation identity token, the system comprising a computer device comprising at least one processor in communication with at least one memory device, the computer device in communication with at requester computer device via a communication network, wherein the computer device is associated with a certification authority, wherein the at least one processor is programmed to:
   receive, from the requester computer device via the communications network, a request for computationally associating a first index of privileges and permissions with a digital foundation identity token, the first index of privileges and permissions specifically encoding privileges and permissions of a first third-party subscriber, to access transactional data of the requester, the request including the digital foundation identity token that identifies a person and has been issued to the requester by a trusted entity through a vetting process, wherein the digital foundation identity token is associated with a second index of privileges and permissions associated with a second third-party subscriber different from the first third-party subscriber;
   validate the digital foundation identity token;
   in response to determining that the digital foundation identity token is valid, computationally associate the first index of privileges and permissions of the first third-party subscriber with the digital foundation identity token; and
   return, to the requester via the communications network, the digital foundation identity token computationally associated with the first index of privileges and permissions of the first third-party subscriber and second index of privileges and permissions of the second third-party subscriber.

2. The system of claim 1, wherein the at least on processor is further programmed to cause transactional data of the requester computer device to become accessible to the first third-party subscriber in accordance with the first index of privileges and permissions when the requester computer device issues a token—based on the digital foundation identity token computationally associated with the first index of privileges and permissions of the first third-party subscriber—to the first third-party subscriber to grant the first third-party subscriber access to transactional data of the requester computer device.

3. The system of claim 1, wherein the at least on processor is further programmed to cause transactional data of the requester computer device to become accessible to the second third-party subscriber in accordance with the second index of privileges and permissions when the requester computer device issues a token—based on the digital foundation identity token computationally associated with the second index of privileges and permissions of the second third-party subscriber—to the second third-party subscriber to grant the second third-party subscriber access to transactional data of the requester computer device.

4. The system of claim 1, wherein the first index of privileges and permissions of the first third-party subscriber becomes detachably associated with the digital foundation identity token.

5. The system of claim 1, wherein the second index of privileges and permissions of the second third-party subscriber is detachably associated with the digital foundation identity token.

6. The system of claim 1, wherein the at least one processor is further programmed to:
receive, from the requester computer device via the communications network, a second request for detaching the first index of privileges and permissions with the digital foundation identity token,
validate the digital foundation identity token;
in response to determining that the digital foundation identity token is valid, detach the first index of privileges and permissions of the first third-party subscriber from the digital foundation identity token such that the first index of privileges and permissions of the first third-party subscriber is no longer computationally associated with the digital foundation identity token; and
return, to the requester computer device via the communications network, the digital foundation identity token that is detached from the first index of privileges and permissions of the first third-party subscriber.

7. The system of claim 6, wherein the at least one processor is further programmed to cause transactional data of the requester computer device to become inaccessible to the first third-party subscriber in accordance with the first index of privileges and permissions when the first third-party subscriber subsequently attempts to access to transactional data of the requester computer device.

8. The system of claim 1, wherein to validate the digital foundation identity token the at least one processor is further programmed to verify that the digital foundation identity token is issued by the trusted entity based on a digital characteristic of the digital foundation identity token uniquely identifying the trusted entity.

9. The system of claim 8, wherein to validate the digital foundation identity token the at least one processor is further programmed to verify that the person identified by the digital foundation identity token is not listed in a negative-indicator database.

10. The system of claim 8, where the at least one processor is further programmed to confirm that the requester computer device is the person identified by the digital foundation identity token by inquiring at a third-party certification authority, different from the trusted entity, that the requester computer device is the person identified by the digital foundation identity token.

11. A computer-implemented method for generating a token set that computationally associate privileges and permissions with a digital foundation identity token, the method comprising:
receiving, from a requester via a communications network and at a computing device of a certification authority, a request for computationally associating a first index of privileges and permissions with a digital foundation identity token, the first index of privileges and permissions specifically encoding privileges and permissions of a first third-party subscriber, to access transactional data of the requester, the request including the digital foundation identity token that identifies a person and has been issued to the requester by a trusted entity through a vetting process, wherein the digital foundation identity token is associated with a second index of privileges and permissions associated with a second third-party subscriber different from the first third-party subscriber;
validating the digital foundation identity token;
in response to determining that the digital foundation identity token is valid, computationally associating the first index of privileges and permissions of the first third-party subscriber with the digital foundation identity token; and
returning, to the requester via the communications network, the digital foundation identity token computationally associated with the first index of privileges and permissions of the first third-party subscriber and second index of privileges and permissions of the second third-party subscriber.

12. The method of claim 11 further comprising causing transactional data of the requester to become accessible to the first third-party subscriber in accordance with the first index of privileges and permissions when the requester issues a token—based on the digital foundation identity token computationally associated with the first index of privileges and permissions of the first third-party subscriber—to the first third-party subscriber to grant the first third-party subscriber access to transactional data of the requester.

13. The method of claim 11 further comprising causing transactional data of the requester to become accessible to the second third-party subscriber in accordance with the second index of privileges and permissions when the requester issues a token—based on the digital foundation identity token computationally associated with the second index of privileges and permissions of the second third-party subscriber—to the second third-party subscriber to grant the second third-party subscriber access to transactional data of the requester.

14. The method of claim 11, wherein the first index of privileges and permissions of the first third-party subscriber becomes detachably associated with the digital foundation identity token.

15. The method of claim 11, wherein the second index of privileges and permissions of the second third-party subscriber is detachably associated with the digital foundation identity token.

16. The method of claim 11 further comprising:
receiving, from the requester via a communications network and at a computing device of a certification authority, a third request for detaching the first index of privileges and permissions with the digital foundation identity token,
validating the digital foundation identity token;
in response to determining that the digital foundation identity token is valid, detaching the first index of privileges and permissions of the first third-party subscriber from the digital foundation identity token such that the first index of privileges and permissions of the first third-party subscriber is no longer computationally associated with the digital foundation identity token; and returning, to the requester via the communications network, the digital foundation identity token that is detached from the first index of privileges and permissions of the first third-party subscriber.

17. The method of claim 16 further comprising causing transactional data of the requester to become inaccessible to the first third-party subscriber in accordance with the first index of privileges and permissions when the first third-party subscriber subsequently attempts to access to transactional data of the requester.

18. The method of claim 11, wherein validating the digital foundation identity token further comprises verifying that the digital foundation identity token is issued by the trusted entity based on a digital characteristic of the digital foundation identity token uniquely identifying the trusted entity.

19. The method of claim 18, wherein validating the digital foundation identity token further comprises verifying that the person identified by the digital foundation identity token is not listed in a negative-indicator database.

20. The method of claim 18 further comprising confirming that the requester is the person identified by the digital foundation identity token by inquiring at a third-party certification authority, different from the trusted entity, that the requester is the person identified by the digital foundation identity token.

\* \* \* \* \*